(12) United States Patent
Ji et al.

(10) Patent No.: US 12,100,803 B2
(45) Date of Patent: Sep. 24, 2024

(54) AQUEOUS ZINC-METAL BATTERIES COMPRISING "WATER-IN-SALT" ELECTROLYTE

(71) Applicant: Oregon State University, Corvallis, OR (US)

(72) Inventors: Xiulei Ji, Happy Valley, OR (US); Chong Zhang, Corvallis, OR (US)

(73) Assignee: Oregon State University, Corvallis, OR (US)

( * ) Notice: Subject to any disclaimer, the term of this patent is extended or adjusted under 35 U.S.C. 154(b) by 661 days.

(21) Appl. No.: 17/283,184

(22) PCT Filed: Oct. 9, 2019

(86) PCT No.: PCT/US2019/055446
§ 371 (c)(1),
(2) Date: Apr. 6, 2021

(87) PCT Pub. No.: WO2020/076985
PCT Pub. Date: Apr. 16, 2020

(65) Prior Publication Data
US 2021/0336293 A1 Oct. 28, 2021

Related U.S. Application Data

(60) Provisional application No. 62/743,788, filed on Oct. 10, 2018.

(51) Int. Cl.
*H01M 10/00* (2006.01)
*H01M 4/42* (2006.01)
(Continued)

(52) U.S. Cl.
CPC ......... *H01M 10/0563* (2013.01); *H01M 4/42* (2013.01); *H01M 4/505* (2013.01);
(Continued)

(58) Field of Classification Search
CPC .. H01M 10/42; H01M 8/184; H01M 8/04276; H01M 12/085; H01M 8/22;
(Continued)

(56) References Cited

U.S. PATENT DOCUMENTS

| 4,473,625 A | 9/1984 | Watakabe et al. |
| 9,780,412 B2 | 10/2017 | Adams et al. |

(Continued)

FOREIGN PATENT DOCUMENTS

| CN | 1627554 A | 6/2005 |
| GB | 1 598 834 A | 9/1981 |
| WO | WO 2017/070340 A1 | 4/2017 |

OTHER PUBLICATIONS

International Search Report and Written Opinion, dated Jan. 30, 2021, issued in corresponding International Application No. PCT/US2019/055446, 11 pages.

(Continued)

*Primary Examiner* — Cynthia H Kelly
*Assistant Examiner* — Monique M Wills
(74) *Attorney, Agent, or Firm* — Klarquist Sparkman, LLP

(57) ABSTRACT

Water-in-salt electrolytes for zinc metal batteries are disclosed. The electrolyte includes a zinc halide. The electrolyte may be a hybrid water-in-salt electrolyte further including an additional metal halide or nonmetal halide. Batteries including the electrolytes are disclosed, as well as devices including the batteries and methods of making the batteries.

20 Claims, 30 Drawing Sheets

(51) Int. Cl.
*H01M 4/505* (2010.01)
*H01M 4/60* (2006.01)
*H01M 10/0563* (2010.01)
*H01M 10/36* (2010.01)
*H01M 4/02* (2006.01)

(52) U.S. Cl.
CPC ......... *H01M 4/604* (2013.01); *H01M 10/365* (2013.01); *H01M 2004/027* (2013.01); *H01M 2004/028* (2013.01); *H01M 2300/0002* (2013.01)

(58) Field of Classification Search
CPC ...... H01M 4/38; H01M 10/282; H01M 4/382; H01M 4/244; Y02E 60/10
See application file for complete search history.

(56) References Cited

U.S. PATENT DOCUMENTS

| | | | |
|---|---|---|---|
| 2009/0162736 A1 | 6/2009 | Vallance et al. | |
| 2012/0244427 A1* | 9/2012 | Hashimoto | C08K 5/55 429/200 |
| 2014/0093804 A1* | 4/2014 | Kreiner | H01M 10/42 429/458 |
| 2015/0010833 A1* | 1/2015 | Amendola | H01M 4/38 429/405 |
| 2018/0013185 A1 | 1/2018 | Adamson et al. | |

OTHER PUBLICATIONS

Wang et al., "Highly reversible zinc metal anode for aqueous batteries," *Nature Materials*, Apr. 16, 2018, 17:543-549, 8 pages.

\* cited by examiner

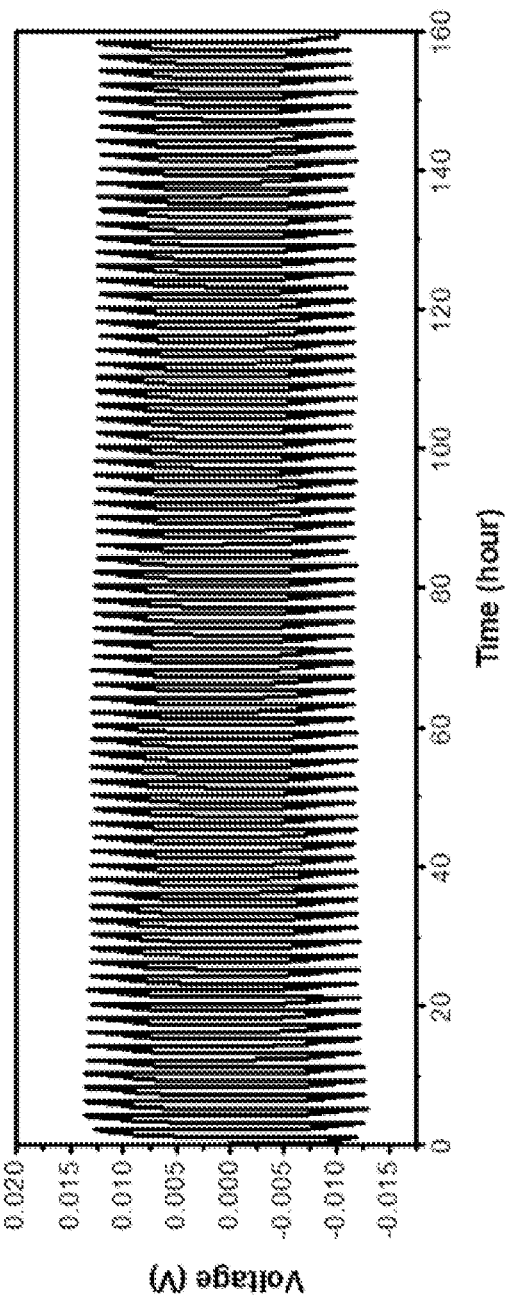
FIG. 20
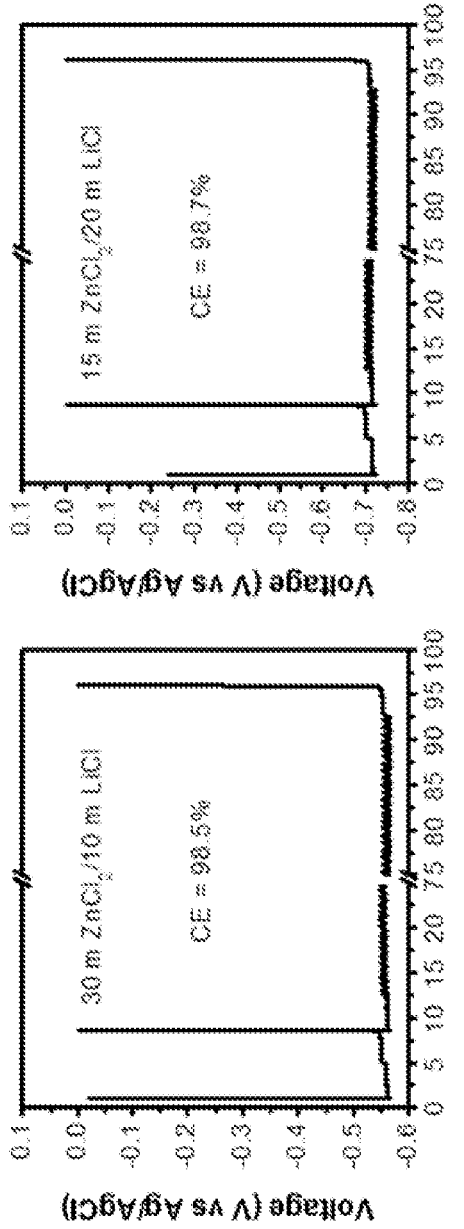
FIG. 21A
FIG. 21B

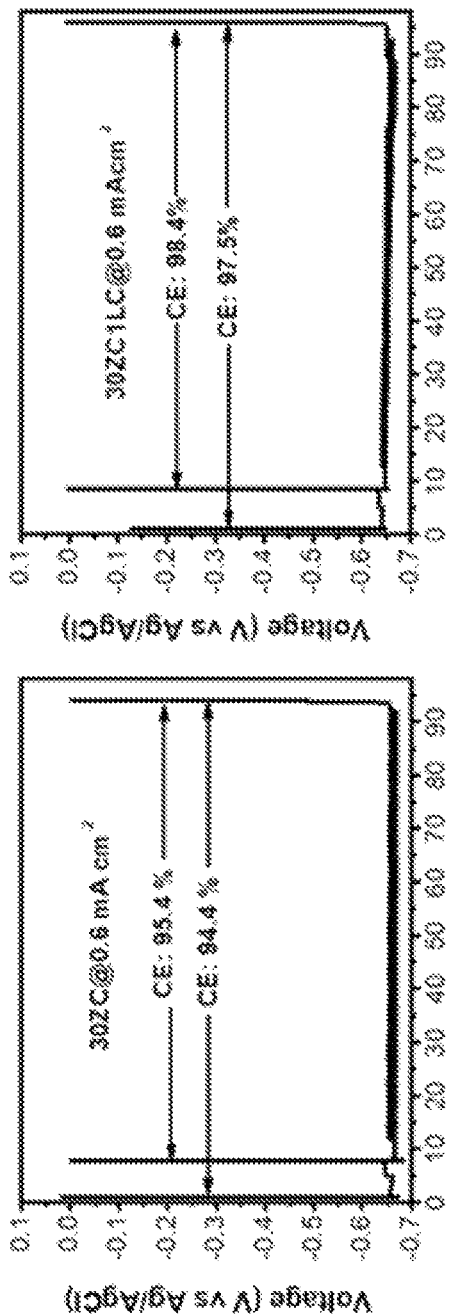
FIG. 23B
FIG. 23A
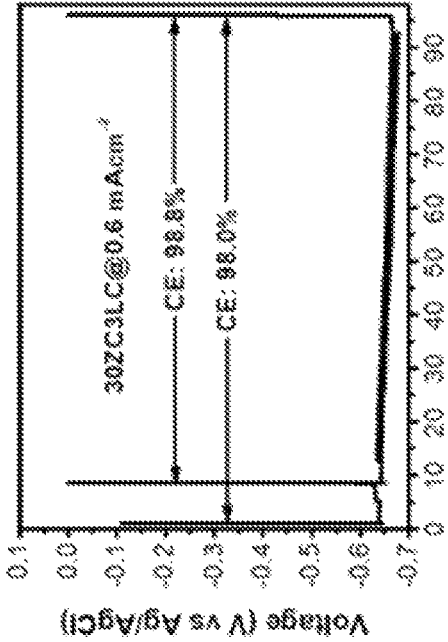
FIG. 23D
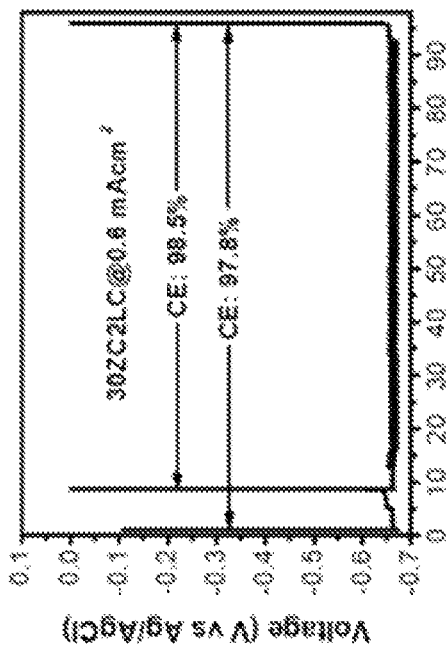
FIG. 23C

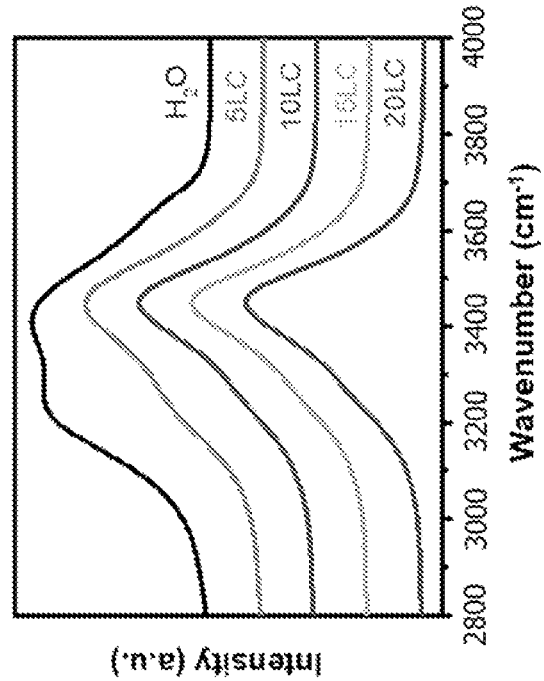
FIG. 27A
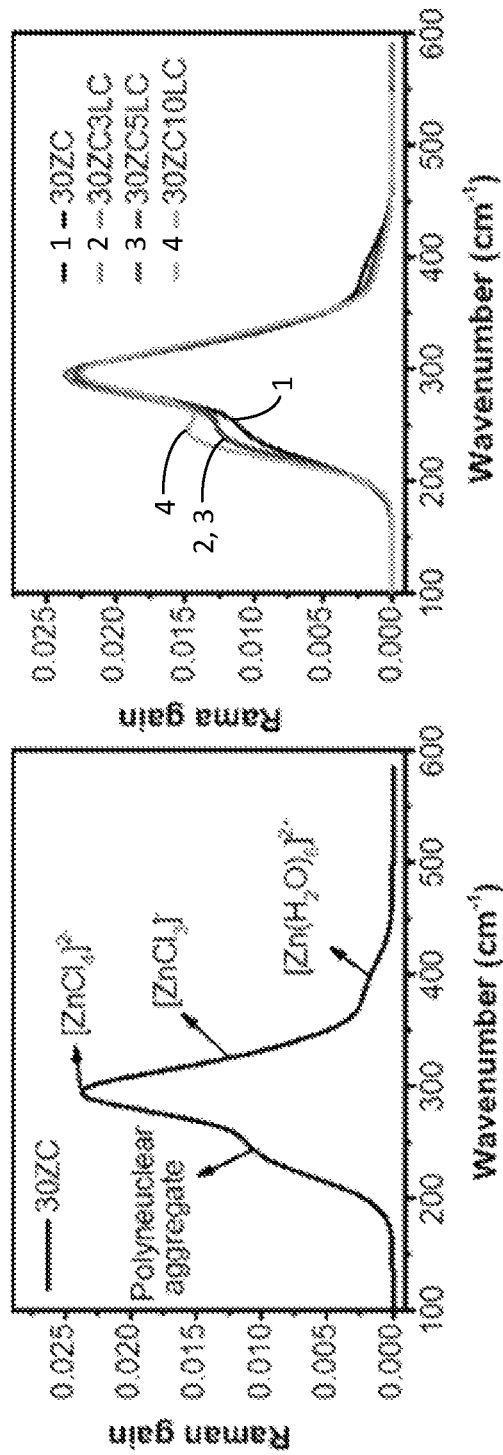
FIG. 27B
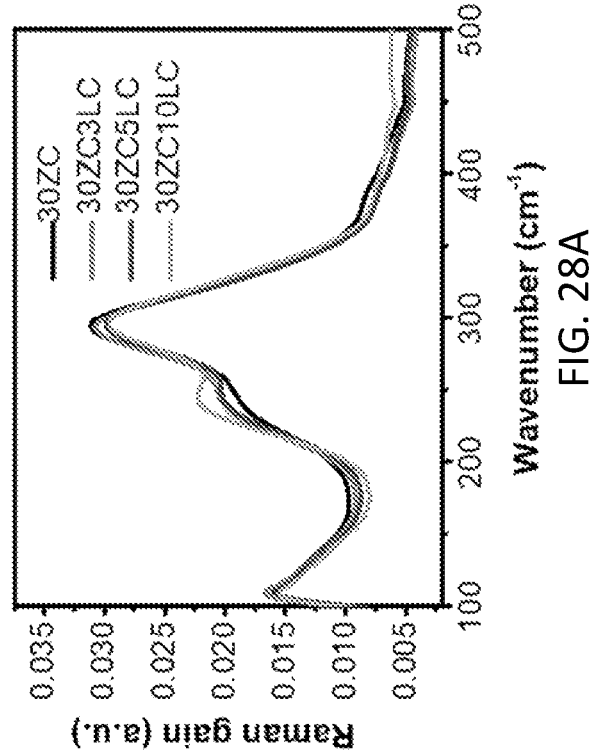
FIG. 28A
FIG. 28B

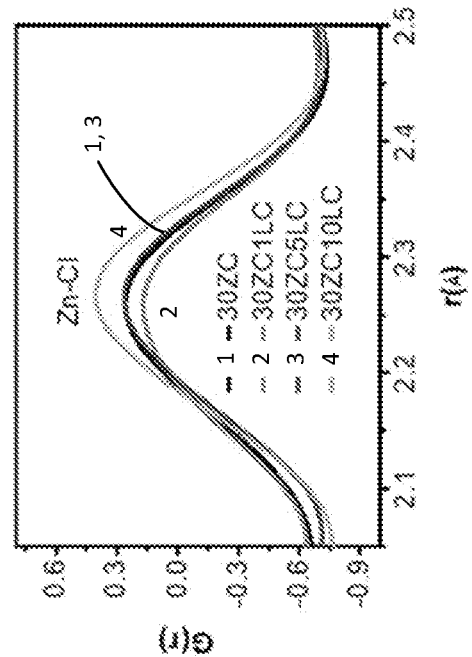
FIG. 33A
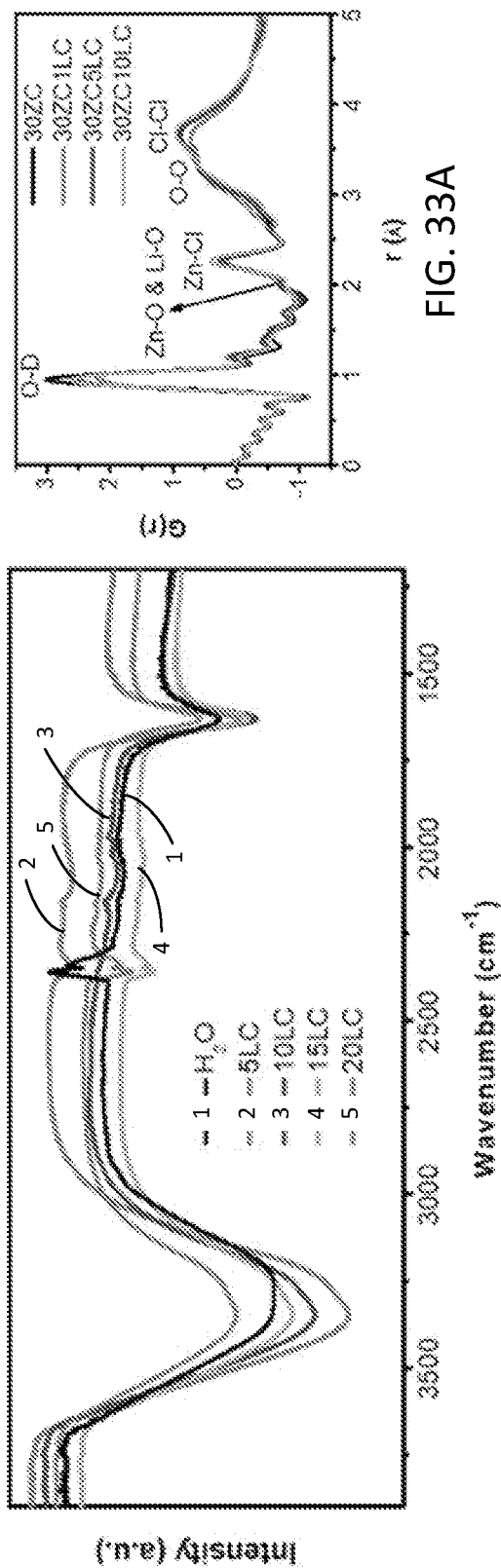
FIG. 32
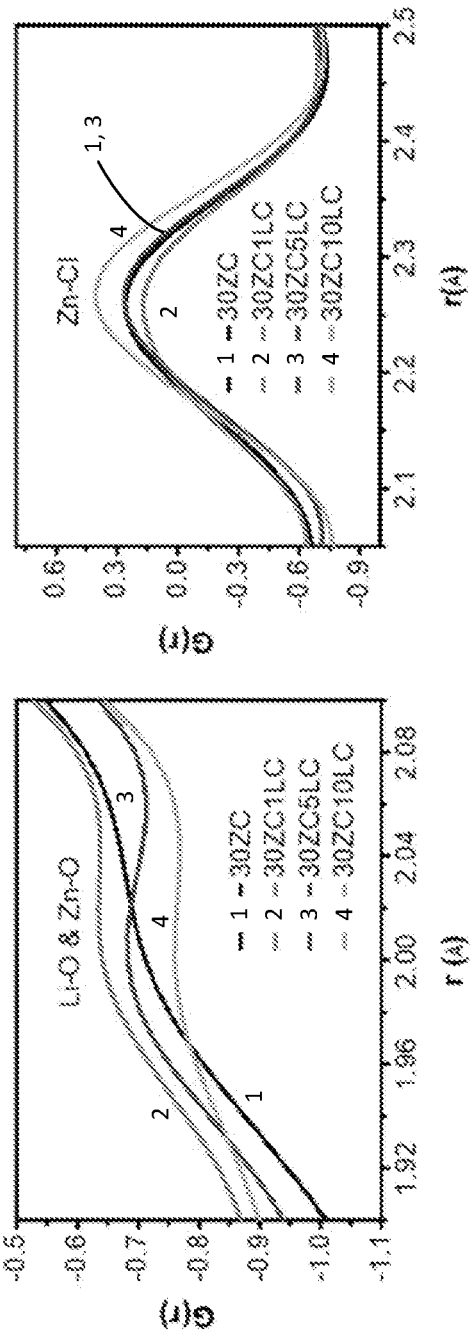
FIG. 33C
FIG. 33B

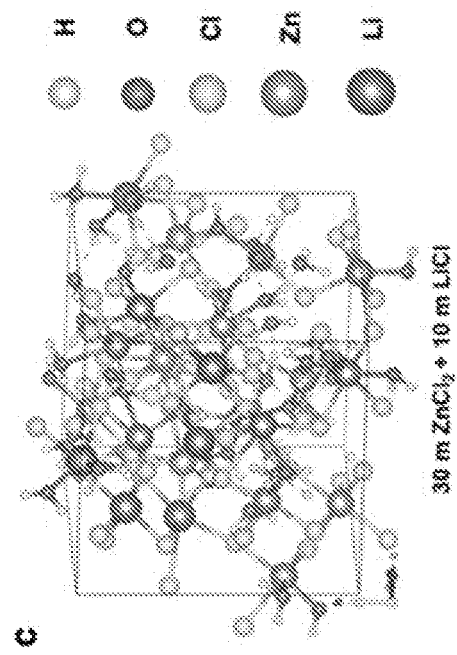
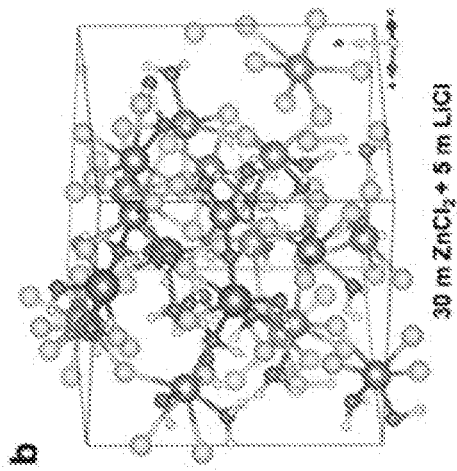
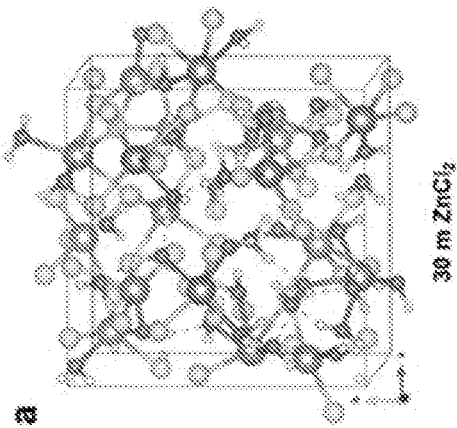
FIG. 34A  FIG. 34B  FIG. 34C
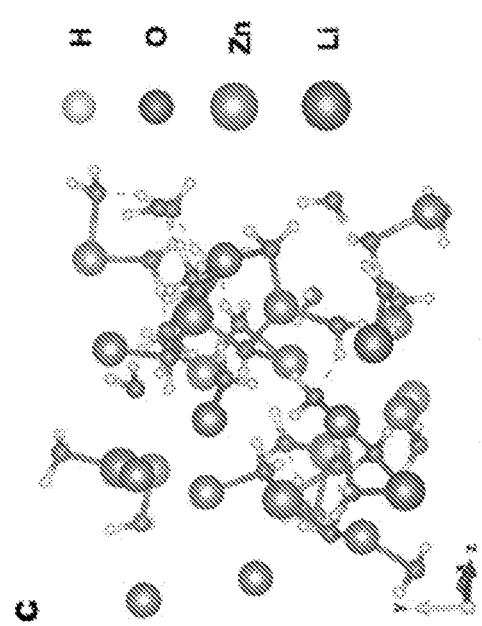
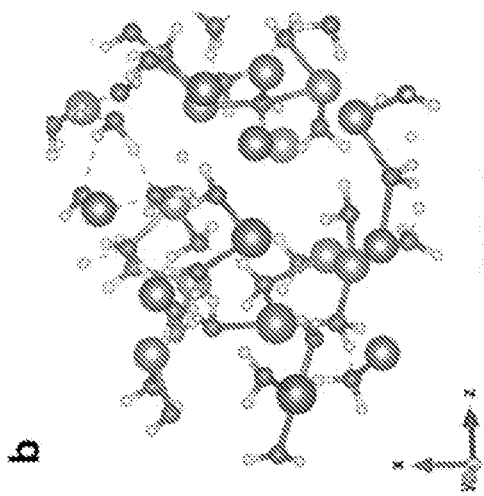
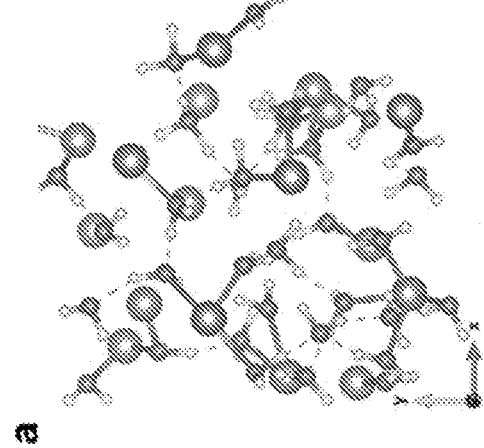
FIG. 35A  FIG. 35B  FIG. 35C 10 m ZnCl₂

30 m ZnCl₂

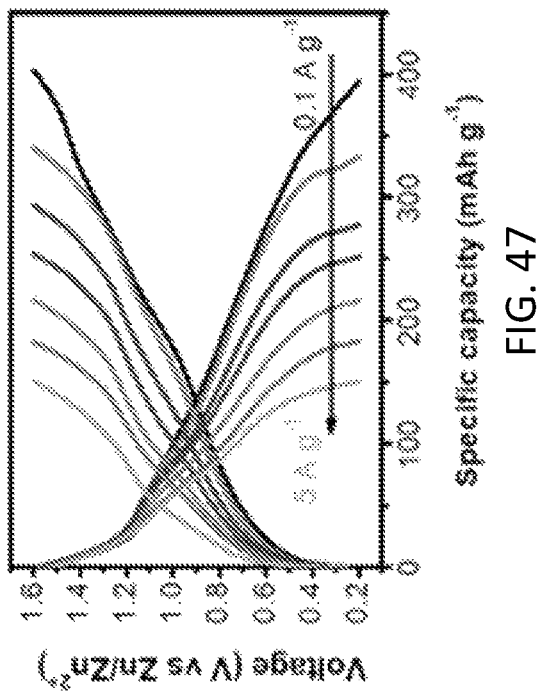
FIG. 47
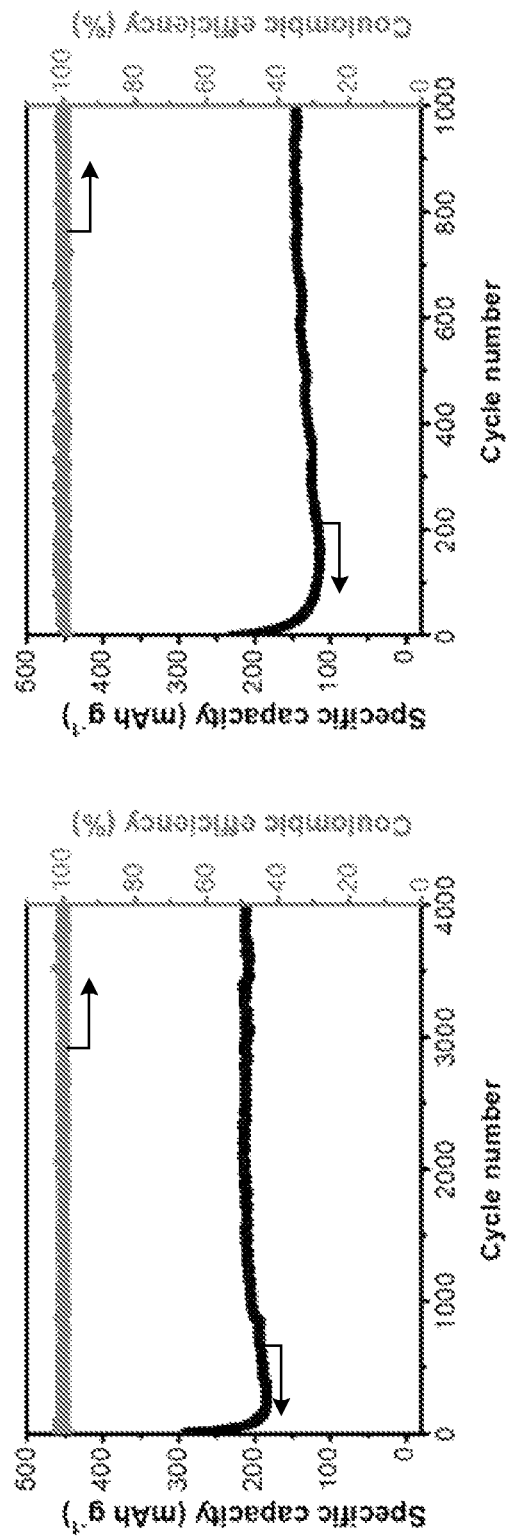
FIG. 48A
FIG. 48B

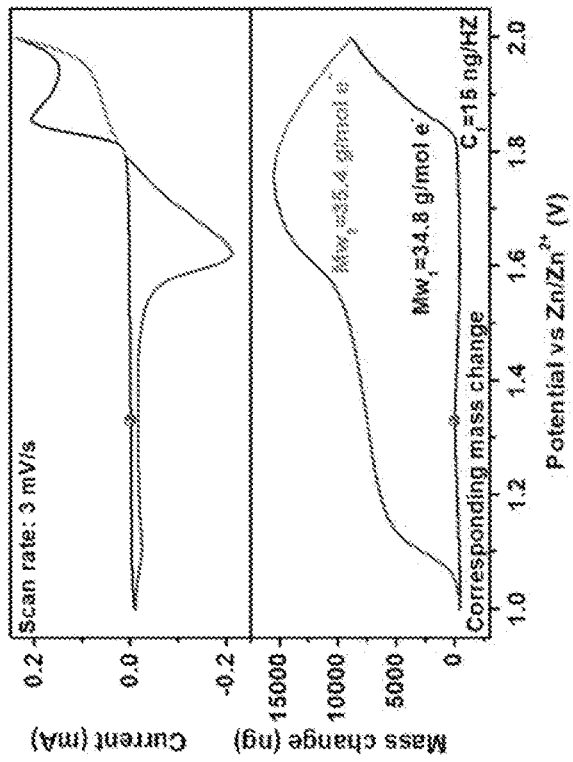
FIG. 53C
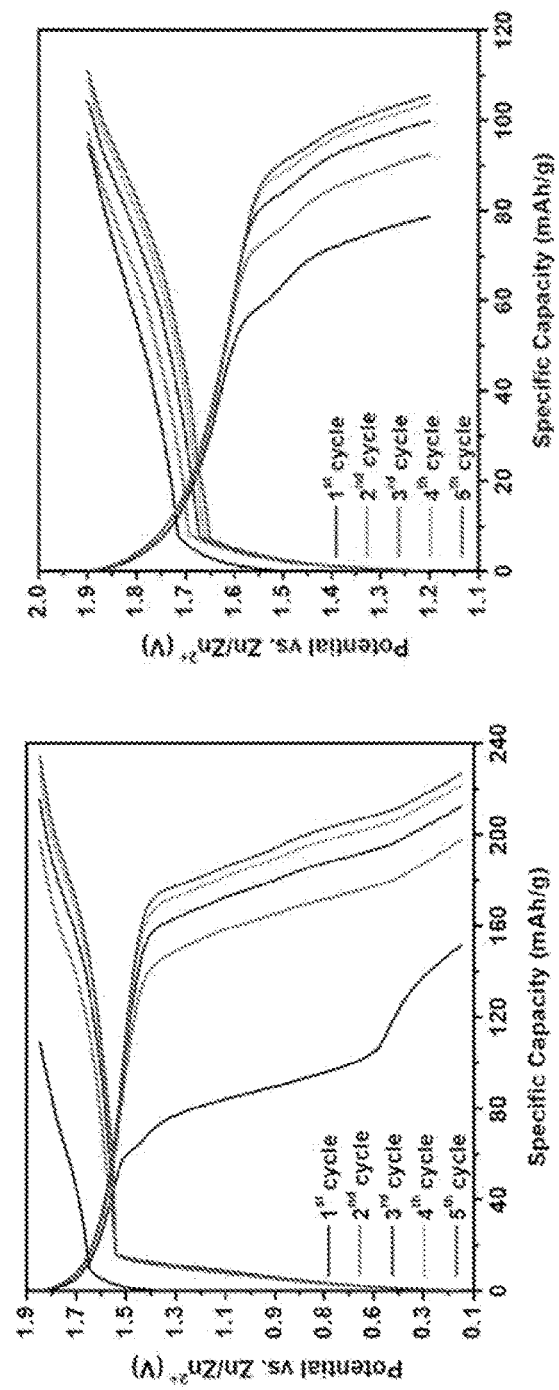
FIG. 53D
FIG. 53E

AQUEOUS ZINC-METAL BATTERIES COMPRISING "WATER-IN-SALT" ELECTROLYTE

CROSS-REFERENCE TO RELATED APPLICATIONS

This is the U.S. National Stage of International Application No. PCT/US2019/055446, filed Oct. 9, 2019, which was published in English under PCT Article 21(2), which in turn claims the benefit of the earlier filing date of U.S. Provisional Application No. 62/743,788, filed Oct. 10, 2018, which is incorporated by reference herein in its entirety.

FIELD

Concentrated aqueous electrolytes for use in zinc-metal batteries are disclosed. Batteries including the electrolytes, devices including the batteries, and methods of making the batteries, also are disclosed.

BACKGROUND

Nonflammable aqueous electrolytes are safer than flammable organic electrolytes. Among aqueous batteries, zinc-metal batteries have attracted great attention due to zinc's water compatibility and stability, high specific capacity (820 mAh g$^{-1}$), low cost, and industrial mass production of Zn metal. The low Coulombic efficiency (CE) of Zn plating/stripping is the primary challenge that hinders the applications of aqueous Zn-metal batteries. The low CE for Zn plating/stripping requires an excess of Zn metal used as anode, resulting in low energy density of the battery full cells. A need exists for a high-concentration aqueous electrolyte that provides a higher CE for zinc-metal batteries.

SUMMARY

Electrolytes for zinc metal batteries are disclosed. In some embodiments, an electrolyte for a zinc metal battery includes a zinc halide; a metal halide or a nonmetal halide comprising a metal or a nonmetal cation $Q^{x+}$ where x is an integer from 1 to 4, and Q is an alkali metal, an alkaline earth metal, a Group IIIA metal, a transition metal other than Zn, a nonmetal cation (e.g., ammonium, alkyl ammonium, choline ion, or H), or a combination thereof; and water, the electrolyte having a $[ZnX_2] \geq 10$ m and $[ZnX_2]+[Q^{x+}] \geq 10.5$ m, where X is Cl, F, Br, I, or any combination thereof. In certain examples, the zinc halide is $ZnCl_2$. In any or all embodiments, $[ZnX_2]$ may be within the range of 10-60 m and $[Q^{x+}]$ may be within a range of 0.5-150 m.

In any or all embodiments, the metal halide may be a metal chloride. In some embodiments, Q is Li, Na, K, Rb, Cs, Mg, Ca, Sr, Ba, Sc, Al, Mn, Ce, Cr, ammonium, alkyl ammonium ion, choline ion, or a combination thereof. In any or all embodiments, a molal concentration ratio of Zn to Q may be within a range of from 120:1 to 1:5.

In some embodiments, a zinc metal battery includes an electrolyte, a cathode comprising a zinc-ion-insertion or an anion-insertion material or a $Q^{x+}$ ion insertion material, and (i) a zinc metal anode or (ii) a non-zinc current collector in the absence of an anode prior to a first charge process of the battery after assembly. The electrolyte comprises (a) water and a zinc halide, the zinc halide having a concentration >10 m, or (b) water, a zinc halide, and a metal or nonmetal halide comprising a cation $Q^{x+}$ where x is an integer from 1 to 4, and Q is an alkali metal, an alkaline earth metal, a Group IIIA metal, a transition metal other than Zn, an ammonium, an alkyl ammonium, choline ion, or a combination thereof, where $[ZnX_2] \geq 10$ m and $[ZnX_2]+[Q^{x+}] > 10.5$ m. In some embodiments, the zinc halide is $ZnCl_2$. In any or all embodiments, the cathode may comprise a manganese-containing oxide, a vanadium-containing oxide, a transition-metal-containing phosphate, a transition-metal-containing fluorophosphate, Prussian blue, a Prussian blue analog, a carbonyl-containing compound, iodine, a carbon/iodine composite, a polymer, a conductive polymer, or an organosulfur compound.

In some embodiments of the battery, the electrolyte comprises $ZnCl_2$ and a metal chloride comprising a metal cation $Q^{x+}$ where $[ZnCl_2] \geq 10$ m and $[ZnCl_2]+[Q^{x+}] \geq 10.5$ m; and the cathode comprises a $Q^{x+}$ ion insertion material. In some embodiments of the battery, the electrolyte comprises water and $ZnCl_2$ having a concentration $\geq 18.5$ m; and the cathode comprises a radical polymer or a conductive polymer capable of reversibly hosting $[ZnCl_4]^{2-}$ ions and other Zn—Cl superhalides. In some embodiments of the battery, the electrolyte comprises water and $ZnCl_2$ having a concentration $\geq 18.5$ m; and the cathode comprises a metal oxide capable of reversibly hosting fluoride, chloride, bromide and/or iodide. In some embodiments of the battery, the electrolyte comprises water and $ZnCl_2$ having a concentration $\geq 18.5$ m; and the cathode comprises iodine capable of reversibly hosting fluoride, chloride, bromide and/or iodide.

In some embodiments of the battery, the electrolyte comprises superhalide ions, including $[ZnCl_y]^{2-y}$, $[ZnI_y]^{2-y}$, $[ZnBr_y]^{2-y}$, $[ZnF_y]^{2-y}$, $[ZnBr_mCl_n]^{2-m-n}$, $[ZnCl_mI_n]^{2-m-n}$, $[ZnBr_mI_n]^{2-m-n}$, $[ZnCl_mF_n]^{2-m-n}$, $[ZnBr_mF_n]^{2-m-n}$, and $[ZnF_mI_n]^{2-m-n}$, where y is >2 and m+n>2.

In some embodiments, the battery does not comprise an anode prior to a first charge process of the battery after assembly, and the non-zinc current collector comprises carbon paper, carbon cloth, carbon foam, graphite, glassy carbon, or a metal foil, mesh or foam, where the metal is other than aluminum. In other embodiments, the battery comprises a limited Zn anode including an initial amount of zinc prior to an initial charge process of the battery, where the initial amount is less than a zinc amount stripped during a full discharge process of the battery. In still other embodiments, the battery comprises an excess Zn anode including an initial amount of zinc prior to an initial charge process of the battery, where the initial amount is at least 1.5× a zinc amount of stripped during a full discharge process of the battery.

The disclosure also encompasses devices comprising a zinc metal battery as disclosed and methods of making the disclosed zinc metal batteries.

The foregoing and other objects, features, and advantages of the invention will become more apparent from the following detailed description, which proceeds with reference to the accompanying figures.

BRIEF DESCRIPTION OF THE DRAWINGS

FIG. 20 shows the GCD curves for a Zn∥30 m $ZnCl_2$/10 m LiCl∥Zn cell at 1 mA/cm$^2$ with a one-hour sweep duration.

FIGS. 21A and 21B show the Coulombic efficiency of Zn plating/stripping in a three-electrode cell including a titanium foil working electrode, zinc anode, and Ag/AgCl reference electrode with 30 m $ZnCl_2$/10 m LiCl and 15 m $ZnCl_2$/20 m LiCl hybrid WiSEs, respectively.

FIGS. 23A-23H show the GCD curves for Ti∥Zn cells with 30 m $ZnCl_2$ electrolytes including varying amounts of LiCl at 0.6 mA/cm$^2$ with a one-hour sweep duration.

FIGS. 27A and 27B are femtosecond stimulated Raman spectroscopy (FSRS) spectra of $ZnCl_2$/LiCl electrolytes in the low-frequency region.

FIGS. 28A and 28B are Raman spectra of $ZnCl_2$/LiCl WiSEs in the low-frequency region (28A) and LiCl aqueous solutions in the high-frequency region (28B).

FIG. 32 shows FTIR spectra of LiCl aqueous solutions.

FIGS. 33A-33C show pair distribution function (PDF) profiles for $ZnCl_2$—LiCl hybrid WiSEs with different LiCl concentrations.

FIGS. 34A-34C show molecular dynamics (MD) simulation boxes after 20 ps with Cl$^-$ ions in 30 m $ZnCl_2$ (34A), 30 m $ZnCl_2$/5 m LiCl (34B), and 30 m $ZnCl_2$/10 m LiCl (34B).

FIGS. 35A-35C show ab initio molecular dynamics simulation studies of 30 m $ZnCl_2$ (35A), 30 m $ZnCl_2$/5 m LiCl (35B), and 30 m $ZnCl_2$/10 m LiCl (35B); Cl atoms are omitted to clarify the surrounding environment of the Zn atoms.

FIG. 47 shows the GCD profiles of $V_2O_5 \cdot H_2O$∥Zn with 30 m $ZnCl_2$+5 m LiCl electrolyte at current rates from 0.1 to 5 A $g^{-1}$.

FIGS. 48A-48B show the cycling performance of a $V_2O_5 \cdot H_2O$ cathode in 30 m $ZnCl_2$+5 m LiCl (48A) and 30 m $ZnCl_2$ (48B) electrolytes with excess Zn as the anodes at 2 A $g^{-1}$.

FIGS. 53A-53E show the GCD curves of $Mn_3O_4$∥Zn with 30 m $ZnCl_2$+7 m $NH_4Cl$ electrolyte at 100 mA $g^{-1}$, and electrochemical quartz crystal microbalance (EQCM) results. FIG. 53A shows potential versus specific capacity for the first three cycles; FIG. 53B shows the specific capacity and Coulombic efficiency of the battery over 40 cycles; FIG. 53C shows a cyclic voltammogram at 3 mV/s (upper panel) and the ECQM results (lower panel); FIG. 53D shows potential versus specific capacity for the first 5 cycles when the $Mn_3O_4$ electrode is charged (oxidized) first where WiSE anions are inserted into the $Mn_3O_4$; FIG. 53E shows potential versus specific capacity for the first 5 cycles when the first discharge does not drop below 0.6 V vs. $Zn^{2+}$/Zn. For FIGS. 53A-53D, cells were evaluated with cutoff potentials of 0.15 to 1.85 V vs. $Zn^{2+}$/Zn; For FIG. 53E, cells were evaluated with cutoff potentials of 1.2 to 1.8 V vs. $Zn^{2+}$/Zn.

DETAILED DESCRIPTION

Figures 1A, 1B:
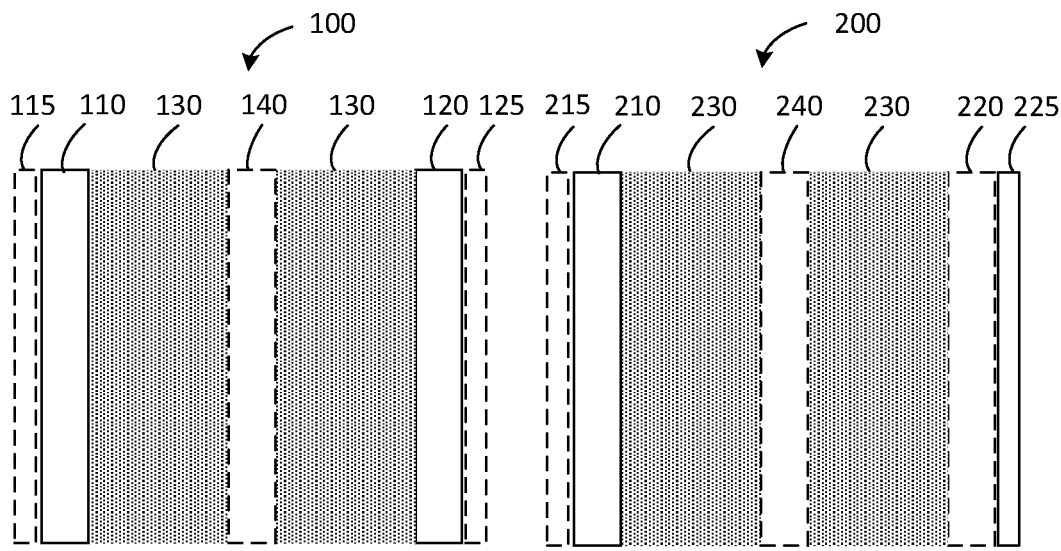
FIG. 1A is a schematic diagram of a zinc metal battery.
FIG. 1B is a schematic diagram of an anode-free zinc metal battery.

Embodiments of water-in-salt electrolytes (WiSEs) for zinc metal batteries are disclosed. Batteries including a WiSE are also disclosed. A WiSE is a highly concentrated electrolyte. In some embodiments, the disclosed electrolytes have a $H_2O/Zn^{2+}$ molar ratio<5.5.

I. DEFINITIONS AND ABBREVIATIONS

The following explanations of terms and abbreviations are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

The disclosure of numerical ranges should be understood as referring to each discrete point within the range, inclusive of endpoints, unless otherwise noted. Unless otherwise indicated, all numbers expressing quantities of components, molecular weights, percentages, temperatures, times, and so forth, as used in the specification or claims are to be understood as being modified by the term "about." Accordingly, unless otherwise implicitly or explicitly indicated, or unless the context is properly understood by a person of ordinary skill in the art to have a more definitive construction, the numerical parameters set forth are approximations that may depend on the desired properties sought and/or limits of detection under standard test conditions/methods as known to those of ordinary skill in the art. When directly and explicitly distinguishing embodiments from discussed prior art, the embodiment numbers are not approximates unless the word "about" is recited.

Although there are alternatives for various components, parameters, operating conditions, etc. set forth herein, that does not mean that those alternatives are necessarily equivalent and/or perform equally well. Nor does it mean that the alternatives are listed in a preferred order unless stated otherwise.

Definitions of common terms in chemistry may be found in Richard J. Lewis, Sr. (ed.), *Hawley's Condensed Chemical Dictionary*, published by John Wiley & Sons, Inc., 1997 (ISBN 0-471-29205-2). Definitions of common terms in molecular biology may be found in Benjamin Lewin, *Genes VII*, published by Oxford University Press, 2000 (ISBN 019879276X); Kendrew et al. (eds.), *The Encyclopedia of Molecular Biology*, published by Blackwell Publishers, 1994 (ISBN 0632021829); and Robert A. Meyers (ed.), *Molecular Biology and Biotechnology: a Comprehensive Desk Reference*, published by Wiley, John & Sons, Inc., 1995 (ISBN 0471186341); and other similar references.

In order to facilitate review of the various embodiments of the disclosure, the following explanations of specific terms are provided:

Alkyl: A hydrocarbon group having a saturated carbon chain. The chain may be cyclic, branched or unbranched. Examples, without limitation, of alkyl groups include methyl, ethyl, propyl, butyl, pentyl, hexyl, heptyl, octyl, nonyl and decyl.

Alkylammonium: A cation having a formula $[N(R')_4]^+$ where each R' independently is H or alkyl.

Anode: An electrode through which electric charge flows into a polarized electrical device. From an electrochemical point of view, negatively-charged anions move toward the anode and/or positively-charged cations move away from it to balance the electrons leaving via external circuitry. In a discharging battery or galvanic cell, the anode is the negative terminal where electrons flow out. If the anode is composed of a metal, electrons that it gives up to the external circuit are accompanied by metal cations moving away from the electrode and into the electrolyte. When the battery is recharged, the anode becomes the positive terminal where electrons flow in and metal cations are reduced.

Capacity: The capacity of a battery is the amount of electrical charge a battery can deliver. The capacity is typically expressed in units of mAh, or Ah, and indicates the maximum constant current a battery can produce over a period of one hour. For example, a battery with a capacity of 100 mAh can deliver a current of 100 mA for one hour or a current of 5 mA for 20 hours.

Cathode: An electrode through which electric charge flows out of a polarized electrical device. From an electrochemical point of view, positively charged cations invariably move toward the cathode and/or negatively charged anions move away from it to balance the electrons arriving from external circuitry. In a discharging battery or galvanic cell, the cathode is the positive terminal, toward the direction of conventional current. This outward charge is carried internally by positive ions moving from the electrolyte to the positive cathode, where they may be reduced. When the battery is recharged, the cathode becomes the negative terminal where electrons flow out and metal atoms (or cations) are oxidized.

Cell: As used herein, a cell refers to an electrochemical device used for generating a voltage or current from a chemical reaction, or the reverse in which a chemical reaction is induced by a current. Examples include voltaic cells, electrolytic cells, and fuel cells, among others. A battery includes one or more cells. The terms "cell" and "battery" are used interchangeably when referring to a battery containing only one cell.

Coulombic efficiency (CE): The efficiency with which charges are transferred in a system facilitating an electrochemical reaction. CE may be defined as the amount of charge exiting the electrode during the discharge process divided by the amount of charge entering the electrode during the charging process.

Current collector: A battery component that conducts the flow of electrons between an electrode and a battery terminal. The current collector also may provide mechanical support for the electrode's active material.

Dual-ion battery (DIB): A battery in which both positive and negative ions participate in the charging and discharging processes. In some embodiments of the present disclosure, negatively charged zinc halide (e.g., $[ZnCl_4]^{2-}$) ions are inserted into or extracted out of the cathode while $Zn^{2+}$ ions are reduced or Zn metal is oxidized at the anode or anode current collector.

Electrochemically active component: A component (an element, an ion, or a compound) that is capable of forming redox pairs having different oxidation and reduction states, e.g., ionic species with differing oxidation states or a metal cation and its corresponding neutral metal atom. In a flow battery, an electrochemically active component refers to the chemical species that participate in the redox reaction during the charge and discharge processes, significantly contributing to the energy conversions that ultimately enable the battery to deliver/store energy. By "significantly contributing" is meant that a redox pair including the electrochemically active component contributes at least 10% of the energy conversions that ultimately enable the battery to deliver/store energy. In some embodiments, the redox pair including the electrochemically active component contributes at least 50%, at least 75%, at least 90%, or at least 95% of the energy conversions in a catholyte or anolyte comprising the electrochemically active component.

Electrolyte: A substance containing free (mobile) ions that behaves as an electrically conductive medium via conducting ions but is electronically insulating. Electrolytes generally comprise ions in a solution, but molten-salt electrolytes and solid electrolytes also are known. An electrolyte in contact with the anode, or negative half-cell, may be referred to as an anolyte, and an electrolyte in contact with the cathode, or positive half-cell, may be referred to as a catholyte. The anolyte and catholyte are often referred to as the negative electrolyte and positive electrolyte, respectively, and these terms can be used interchangeably. As used herein, the terms anolyte and catholyte refer to electrolytes composed of electrochemically active components and a supporting solution.

Energy density (specific energy): A term that refers to energy per unit of mass. Energy density is commonly expressed in units of Wh $kg^{-1}$ or J $kg^{-1}$. Unless otherwise specified, when referring to the energy density of a battery as disclosed herein, the mass is the combined mass of the anode and cathode. In some instances, as indicated, the mass further includes the electrolyte mass.

Insertion: A term referring to the incorporation of a material (species) (e.g., an ion or molecule) into the microstructure, the phase, the lattice of another material. For example, $[ZnCl_4]^{2-}$ ions can be inserted into a polypyrene cathode.

Ion insertion material: A material capable of reversibly hosting ions that are inserted and extracted without significant irreversible change in its microstructure. Significant irreversible change includes pulverizing or exfoliation of the ion insertion material. For example, polypyrene is capable of reversibly hosting $[ZnCl_4]^{2-}$ ions and $LiMn_2O_4$ is capable of reversibly hosting $Li^+$ ions.

Molality (m): A measure of concentration defined as moles of solute per kilogram of solvent. Thus, a 1 m solution is one mole solute in 1 kg of solvent.

Molarity (M): A measure of concentration defined as moles of solute dissolved in enough solvent to provide one liter of solution. Thus, a 1 M solution is one mole of solute per liter of solution.

Polymer: A molecule of repeating structural units (e.g., monomers) formed via a chemical reaction, i.e., polymerization.

Polypyrene: An electrically conducting polymer formed from pyrene.

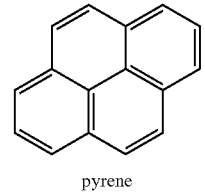 [SMILES: c1cc2ccc3cccc4ccc(c1)c2c34]

pyrene

Separator: A battery separator is a porous sheet or film that is electronically insulating and is placed between the anode and cathode. It prevents physical contact between the anode and cathode while facilitating ionic transport.

Specific capacity: A term that refers to capacity per unit of mass. Specific capacity may be expressed in units of mAh/g.

Specific areal capacity: A term that refers to capacity per unit of area of the electrode (or active material). Specific areal capacity may be expressed in units of mAh $cm^{-2}$.

Superhalogen/superhalide: A superhalogen comprises a metal atom surrounded by halogen atoms. A superhalogen can form a superhalide anion with chemical properties similar to those of halide ions but with a greater electron affinity than the corresponding halides.

Water-in-Salt Electrolyte (WiSE): As used herein, the term water-in-salt electrolyte refers to a concentrated aqueous electrolyte having a water to metal ion molar ratio of less than 5.5 (or a metal ion to water molar ratio of greater than 0.18).

xZCyLC: As used herein, the notation xZCyLC refers to an electrolyte having a $ZnCl_2$ concentration of x m and a LiCl concentration of y m. For example, 30ZC5LC is an electrolyte comprises 30 m $ZnCl_2$ and 5 m LiCl. When the electrolyte includes only $ZnCl_2$, it may be represented as xZC, e.g., 30ZC is 30 m $ZnCl_2$.

II. WATER-IN-SALT ELECTROLYTES

Disclosed embodiments of a water-in-salt electrolyte comprise a zinc halide and water. The WiSE may have a $H_2O/Zn^{2+}$ molar ratio<5.5. In some embodiments, the zinc halide is $ZnCl_2$. Without wishing to be bound by a particular theory operation, the low molar ratio between water molecules and cations can lead to an incomplete hydration shell for $Zn^{2+}$, suppressing the formation of electrochemically non-active $Zn(OH)_2$ and ZnO.

A $H_2O/Zn^{2+}$ molar ratio<5.5 is achieved when $[ZnX_2] \geq 10$ m ($\geq 7.11$ M), where X is a halogen, e.g., F, Cl, Br, I, or any combination thereof. As used herein, $[ZnX_2]$ refers to the concentration of $ZnX_2$ salt used to prepare the electrolyte. A person of ordinary skill in the art understands that when the concentration of $ZnX_2$ is high in water, e.g., >10 m, a large majority of the anions are no longer $X^-$ (or very few) but $[ZnX_4]^{2-}$, which consumes half of the Zn-ions. In some embodiments, X is Cl. In other embodiments, X is I, Br, or F, or a combination of Br+Cl, Cl+I, Br+I, Cl+F, Br+F, or F+I. The $[ZnX_2]$ may be as high as saturation. When the zinc halide is $ZnCl_2$, the dissolved $[ZnCl_2]$ may be as high as 31 m (12.5 M) at ambient temperature (e.g., 20-25° C.). Thus, in some embodiments when a WiSE comprises $ZnCl_2$, 10 m$\leq [ZnCl_2] \leq$ 31 m. In some embodiments, $[ZnCl_2]$ is 10-30 m (7.1-12.4 M), such as 15-30 m (8.6-12.4 M), 20-30 m (9.9-12.4 M), or 25-30 m (10.95-12.4 M). Exemplary water-in-salt electrolytes may include, for example, 10 m (7.1 M), 15 m (8.6 M), 20 m (9.6 M), 25 m (11 M), or 30 m (12.4 M) $[ZnCl_2]$. When the electrolyte comprises 30 m $ZnCl_2$, the mass and molar ratios of water to $ZnCl_2$ are 0.24 and 1.85, respectively, and the average hydrated $Zn^{2+}$ complex ions are $[Zn(OH_2)_{3.7}]^{2+}$. In some embodiments, the $[Zn^{2+}]$ is sufficiently high that there are no, or substantially no (e.g., less than 2%), free water molecules in the WiSE. In other words, all, or substantially all (e.g., at least 98%) of water molecules are associated with ions in the WiSE. When $[ZnCl_2] \geq 18.5$ m, there are no, or substantially no, free water molecules in the WiSE. In certain embodiments, $[ZnCl_2]$>10 M, such as 10.1-12.4 M, 10.5-12.4 M, or 11-12.4 M.

When the temperature is greater than ambient temperature (e.g., greater than 25° C.) or when the electrolyte comprises a "deep eutectic solvent," $[ZnX_2]$ may be greater than 31 m. A deep eutectic solvent includes a eutectic mixture of Lewis or Brønsted acids and bases. Deep eutectic solvents include, for example, solvents comprising a quaternary ammonium salt (e.g., choline chloride ((2-hydroxyethyl)trimethylammonium chloride)) and a metal chloride. In some cases, $[ZnX_2]$ may be as high as 60 m.

The WiSE may consist essentially of, or consist of, $ZnCl_2$ and water. By "consists essentially of" is meant that the WiSE does not include any other electrochemically active component besides the zinc halide. In these embodiments, additional metal halides are excluded by the term "consists essentially of." However, the electrolyte may include trace amounts (e.g., <2 wt %) of electrochemically inert components.

In some embodiments, the electrolyte is a hybrid WiSE. As used herein, the term "hybrid WiSE" refers to an electrolyte that further includes one or more additional metal halides, nonmetal halides, or a combination thereof. The additional metal halide or nonmetal halide is not a zinc halide. Thus, the hybrid WiSE comprises water, a zinc halide, and one or more additional metal halides, nonmetal halides, or a combination thereof. The metal halide or nonmetal halide may be a metal chloride or nonmetal chloride. The metal halide or nonmetal halide comprises a cation $Q^{x+}$ where x is an integer from 1 to 4, and Q is an alkali metal, an alkaline earth metal, a Group IIIA metal, a transition metal other than Zn, a nonmetal cation (for example, ammonium, alkyl ammonium, choline ion (HO$(CH_2)_2N(CH_3)_3^+$), or H), or any combination thereof. Exemplary metals include Li, Na, K, Rb, Cs, Mg, Ca, Sr, Ba, Sc, Al, Mn, Ce, Cr, or any combination thereof. In some embodiments, the metal is Li, Na, K, Mg, Ca, Al, Mn, or any combination thereof. Exemplary nonmetal cations include $H^+$, $NH_4^+$, $CH_3NH_3^+$, $(CH_3)_2NH_2^+$, $(CH_3)_3N^+$, $(CH_3)_4N^+$, $HO(CH_2)_2N(CH_3)_3^+$, or any combination thereof. In some embodiments, Q is Li, Na, K, $NH_4$, $HO(CH_2)_2N(CH_3)_3$, or a combination thereof. In certain embodiments, Q is Li, Na, K, $NH_4$, or a combination thereof.

A hybrid WiSE may be particularly useful when used in a battery including a cathode that comprises an ion insertion material capable of reversibly hosting Q cations. "Capable of reversibly hosting" means that Q cations can be reversibly inserted into and extracted from the ion insertion material without significant irreversible damage to the cathode, such as exfoliation or cracking. The addition of $Q^{x+}$ ions further reduces the hydration shells of the $Zn^{2+}$ ions. In some embodiments, the metal halide or nonmetal halide also reduces viscosity and/or lowers the melting temperature of the hybrid WiSE compared to a WiSE, thereby increasing electrolyte conductivity.

In some embodiments, a hybrid WiSE comprises 10-30 m $ZnX_2$ and 0.5-20 m $Q^{x+}$, such as 10-30 m $ZnCl_2$ and 0.5-20 m QCl, where $Q^{x+}$ is $Li^+$, $Na^+$, $K^+$, $NH_4^+$, or a combination thereof. In certain embodiments, the hybrid WiSE comprises 15-30 m $ZnCl_2$ and 5-15 m LiCl, such as 15-30 m $ZnCl_2$ and 10-15 m LiCl. In some examples, $[ZnX_2] \geq 15$ m. In any or all embodiments, a combined concentration of $[ZnX_2]+[Q^{x+}]$ may be at least 10.5 m, at least 15 m, at least 20 m, or at least 25 m, such as 10.5-40 m, 15-40 m, 20-40 m, 25-40 m, or 30-40 m. In any or all of these embodiments, $ZnX_2$ may be $ZnCl_2$. In any or all embodiments, the hybrid electrolyte may have a molar ratio of Zn to Q within a range of from 60:1 to 1:5 such as a molar ratio within a range of from 30:1 to 0.5:1, 15:1 to 0.5:1, 10:1 to 0.5:1, 6:1 to 0.5:1, 5:1 to 0.5:1, 4:1 to 0.6:1, or 3:1 to 0.75:1, or 1:1 to 1:2. In one example, the Zn:Q molar ratio is 3:1, e.g., 30 m $ZnCl_2$ and 10 m $QCl_x$ where x is an integer from 1 to 4 such $QCl_x$ has a neutral charge. In another example, the Zn:Q molar ratio is 0.75:1, e.g., 15 m $ZnCl_2$ and 20 m $QCl_x$. In still another example, the Zn:Q molar ratio is 6:1, e.g., 30 m $ZnCl_2$ and 5 m $QCl_x$.

The hybrid WiSE may consist essentially of, or consist of, the zinc halide, the metal and/or nonmetal halide, and water. By "consists essentially of" is meant that the hybrid WiSE does not include any other electrochemically active components besides the zinc halide and the metal and/or nonmetal halide(s). However, the hybrid WiSE may include trace amounts (e.g., <2 wt %) electrochemically inert components.

In some embodiments, a hybrid WiSE may provide the battery with a greater Coulombic efficiency (CE), greater capacity, and/or greater cycle life than a battery with a WiSE having a [$Zn^{2+}$] of the same concentration. Without wishing to be bound by a particular theory of operation, some metal and/or nonmetal ions $Q^{x+}$ have a high charge density, such as a charge density greater than a charge density of $Zn^{2+}$, which allows the $Q^{x+}$ ions to tightly bind water molecules and weaken the interaction between water molecules and $Zn^{2+}$. Advantageously, the $Q^{x+}$ ions may have a reduction potential sufficiently different from the reduction potential of $Zn^{2+}$ ions such that only the $Zn^{2+}$ ions are reduced at the applied voltage. Coordination of water molecules to $Q^{x+}$ ions reduces the number of water molecules available to coordinate with $Zn^{2+}$ ions, resulting in an incomplete hydration shell for $Zn^{2+}$. The incomplete hydration shell suppresses side reactions arising from water decomposition and/or formation of electrochemically non-active $Zn(OH)_2$ and ZnO, leading to a greater CE than a comparable WiSE electrolyte that does not include the additional metal halide. Additionally, the increased ion density provided by the inclusion of $Q^{x+}$ ions further breaks hydrogen-bond networks within the electrolyte and decreases the number of free water molecules by competing against $Zn^{2+}$ ions for water molecules. As another rationale, the added $Q^{x+}$ cations cannot be plated on the Zn metal anode during the charge process of Zn metal batteries at the applied voltage. For instance, when $Q^{x+}$ is a metal cation, the metal cations cannot be plated as metal on the Zn metal anode at the applied voltage. The $Q^{x+}$ ions concentrate near the surface of the Zn metal anode, which prevents the formation of an "ion-depletion" zone near the surface of Zn metal anode, and consequently mitigates the tendency of forming Zn dendrites and irreversible reactions. The high $Zn^{2+}$ concentration and electrostatic shielding of $Q^{x+}$ ions synergistically enable a Zn battery including a hybrid WiSE to achieve excellent cycling stability and a small overpotential as discussed in more detail further below.

The identity and cation size of Q may influence a CE provided by the hybrid WiSE. In some embodiments, as the size of the Q cation decreases, the CE increases. The radii of $Li^+$, $Na^+$, $K^+$ and $NH_4^+$ ions are 0.76 Å, 1.02 Å, 1.38 Å, and 1.48 Å, respectively. Without wishing to be bound by a particular theory of operation, alkali metal ions have a high charge density, which allows the alkali metal ion to tightly bind water molecules. Thus, a hybrid WiSE including a lithium halide may provide a greater CE than a comparable hybrid WiSE including a sodium halide, potassium halide, or ammonium halide.

Some embodiments of the disclosed electrolytes provide an electrochemical stability window up to 2.5 V, up to 2.3 V, or up to 2.0 V versus a standard hydrogen electrode, such as an electrochemical stability window of from 1.6-2.5 V or 2.0-2.3 V. Advantageously zinc anodes are stable in the disclosed electrolytes. For example, a symmetric cell including a Zn anode, a Zn cathode, and 30 m $ZnCl_2$ WiSE, when subjected galvanostatic charge/discharge curves at 0.2 mA/$cm^2$ with a duration of 10 minutes, exhibited a low and stable overpotential of 12 mV without obvious voltage fluctuation over 600 hours (see, Example 3, FIG. 12). The Zn anode was shown to have an XRD pattern substantially the same as pristine zinc and to have a dense, dendrite-free surface (see, Example 3, FIGS. 14, 16).

In some embodiments, the ZnX-based WiSE or hybrid WiSE comprises concentrated superhalides of [$ZnX_y$]$^{2-x}$, where y is >2, e.g., [$ZnCl_4$]$^{2-}$. In some embodiments, y is an integer within a range of from 2-6, such as 2-6, 3-5, 3-4, 4-6, 4-5, 3, 4, 5, or 6. When y is other than an integer, the WiSE comprises a combination of ZnX-based ions. For instance, when y is 3.5, the WiSE may be a mixture of [$ZnX_3$]$^-$ and [$ZnX_4$]$^{2-}$. These superhalides interact with water molecules and strengthen the O—H bonds of water molecules, where such water molecules are more stable and more difficult to be reduced by plated Zn metal anode. In some embodiments, the WiSE comprises [$ZnCl_y$]$^{2-y}$, [$ZnI_y$]$^{2-y}$, [$ZnBr_y$]$^{2-y}$, [$ZnF_y$]$^{2-y}$, [$ZnBr_mCl_n$]$^{2-m-n}$, [$ZnCl_mI_n$]$^{2-m-n}$, [$ZnBr_mI_n$]$^{2-m-n}$, [$ZnCl_mF_n$]$^{2-m-n}$, [$ZnBr_mF_n$]$^{2-m-n}$, [$ZnF_mI_n$]$^{2-m-n}$, or any combination thereof. In the foregoing embodiments, y is >2, and m and n are each >0 where a sum of m+n>2.

III. BATTERIES AND DEVICES

FIG. 1A is a schematic diagram of one embodiment of a zinc metal battery 100. The battery 100 includes a cathode 110, an anode 120, and an electrolyte 130 as disclosed herein. The battery 100 may further comprise a cathode current collector 115, an anode collector 125, a separator 140, or any combination thereof.

FIG. 1B is a schematic diagram of another embodiment of a zinc metal battery 200. The battery 200 when assembled is anode free, i.e., no anode is present in the battery prior to an initial charge process. The battery 200 includes a cathode 210, an anode current collector 225, and an electrolyte 130 as disclosed herein. The battery 200 may further comprise a cathode current collector 215, a separator 240, or both. An anode 220 is formed in situ on the anode current collector 225 during an initial charge process of the battery 200. Thus, in a charged state, the battery 200 includes a zinc anode 220 formed on the anode current collector 225. During a subsequent discharge process, the anode 220 is consumed as plated Zn is oxidized to $Zn^{2+}$ and stripped from the anode current collector 225. When the battery 200 is completely discharged, the anode may be completely consumed. In some embodiments, no active zinc (i.e., zinc capable of being oxidized) remains on the anode current collector 225. However, some "dead" or passivated zinc may remain, e.g., in a solid electrolyte interphase (SEI) layer.

In some embodiments, the electrolyte is a WiSE comprising, consisting essentially of, or consisting of water and a zinc halide, the zinc halide having a concentration>18.5 m or >10 M. In certain embodiments, the zinc halide is $ZnCl_2$.

In some embodiments, the electrolyte is a hybrid WiSE comprising, consisting essentially of, or consisting of water, a zinc halide, and a metal or a nonmetal halide comprising a cation $Q^{x+}$, where x is an integer from 1 to 4, and Q is an alkali metal, an alkaline earth metal, a Group IIIA metal, a transition metal other than Zn, ammonium, alkyl ammonium, choline ion, H, or a combination thereof, where [$ZnX_2$]≥10 m and [$ZnX_2$]+[$Q^{x+}$]≥10.5 m. In some examples, [$ZnX_2$]≥10 m and [$ZnX_2$]+[$Q^{x+}$]≥15 m. The zinc halide may be $ZnCl_2$. In certain embodiments, the zinc halide is $ZnCl_2$ and the metal or nonmetal halide is LiCl, NaCl, KCl, $NH_4Cl$, alkyl ammonium chloride, choline chloride, or any combination thereof. In some examples, the zinc halide is $ZnCl_2$ and the metal halide is LiCl. In one embodiment, the electrolyte is a hybrid WiSE comprising, consisting essentially of, or consisting of (i) water, (ii) $ZnCl_2$, and (iii) choline chloride, where the WiSE contains 30 m $ZnCl_2$ and 120 m choline chloride.

Cathode materials for the disclosed zinc metal batteries include inorganic compounds and organic materials. The cathode is not a cathode suitable for a metal halogen battery. The cathode may comprise an ion insertion material. In some embodiments, the cathode comprises a material capable of reversibly hosting zinc-containing anions (e.g., [$ZnCl_4$]$^{2-}$ ions) or $Q^{x+}$ ions. Suitable inorganic compounds include, but are not limited to, manganese-containing oxides, vanadium-containing oxides, transition-metal-containing phosphates (e.g., iron-containing phosphates), transition-metal-containing fluorophosphates, iron fluorides, iron oxyfluorides, hexacyanoferrates (HCFs), Prussian blue and its analogs, carbonyl-containing compounds, iodine, and carbon/iodine composites. Exemplary inorganic cathode materials include $LiMn_2O_4$, $LiFePO_4$, $MnO_2$, $V_2O_5$, $Na_3V_2(PO_4)_2F_3$, $Na_3V_2(PO_4)_3$ and ZnHCF (e.g., $Zn_3[Fe(CN)_6]_2$). Suitable organic materials include, but are not limited to, carbonyl-containing compounds, radical polymers, conductive polymers (mainly conjugated polymers), organosulfur compounds, and other redox active organic compounds. In certain examples, the organic material-based cathode is polypyrene.

In some embodiments, the battery is a dual-ion battery, the electrolyte is a WiSE and the cathode comprises a manganese oxide (e.g., $Mn_3O_4$), zinc hexacyanoferrate, a radical polymer or conductive polymer capable of reversibly hosting zinc-containing anions, iodine, or an iodine/carbon composite. For example, the electrolyte may comprise, consist essentially of, or consist of water and $ZnCl_2$ and the cathode is capable of reversibly hosting $[ZnCl_4]^{2-}$ ions or atomic halide ions, e.g., chloride. In certain embodiments, the $ZnCl_2$ has a concentration≥18.5 m or >10 M, such as 18.5-30 m, 20-30 m, 25-30 m, 10.1-12.4 M, 10.5-12.4 M, or 11-12.4 M. In some examples, the cathode comprises a radical polymer or conductive polymer. One exemplary polymer is polypyrene.

In other embodiments, the electrolyte is a hybrid WiSE comprising, consisting essentially of, or consisting of water, a zinc halide and a metal halide or nonmetal halide comprising a cation $Q^{x+}$, and the cathode comprises a $Q^{x+}$ insertion material. The zinc halide may be $ZnCl_2$ and the metal halide or nonmetal halide may be a metal chloride or nonmetal chloride. In some embodiments, $[ZnCl_2] \geq 10$ m and $[ZnCl_2]+[Q^{x+}] \geq 10.5$ m, such as ≥15 m. In certain examples, 15 m≤$[ZnCl_2]+[Q^{x+}]$≤40 m. A molal concentration ratio of Zn to M may be within a range of from 60:1 to 1:5. In some examples, the hybrid WiSE includes 10-25 m $ZnCl_2$ and 0.5-20 m QCl where Q is Li, Na, K, $NH_4$, methyl ammonium, choline ion, or any combination thereof. In one embodiment, the electrolyte comprises, consists essentially of, or consists of water, $ZnCl_2$, and LiCl, and the cathode comprises $LiMn_2O_4$ or $LiFePO_4$. In another embodiment, the electrolyte comprises, consists essentially of, or consists of (i) water, (ii) $ZnCl_2$, and (iii) NaCl or KCl or $NH_4Cl$ or alkyl ammonium chloride (e.g., methyl ammonium chloride), or choline chloride, or any combination thereof, and the cathode comprises Prussian blue, a Prussian blue analog, $Na_3V_2(PO_4)_2F_3$ or $Na_3V_2(PO_4)_3$. In one embodiment, the electrolyte is a hybrid WiSE comprising (i) water, (ii) $ZnCl_2$, and (iii) choline chloride, where the WiSE contains 30 m $ZnCl_2$ and 120 m choline chloride.

In some embodiments, the battery includes a zinc anode. In other embodiments, the battery as assembled is "anode-free," i.e., the battery does not include a zinc anode when initially assembled, and a zinc anode is formed in situ during a first charge process of the battery. In anode-free batteries, a non-zinc anode current collector is present.

When a zinc anode is present, the anode may be an "excess Zn" anode or a "limited Zn" anode. An excess Zn anode has an initial mass of Zn greater than the amount of zinc stripped during a full discharge process of the battery. The excess Zn anode may include, for example, an initial amount of at least 1.5×, at least 2×, at least 3×, at least 5×, or even at least 10× an amount of zinc stripped during a full discharge process of the battery. In some examples, the excess Zn anode may include an amount of Zn at least 1.5×, at least 2×, at least 3×, at least 5× or at least 10× the capacity of the cathode where the cathode's theoretical capacity is calculated as C=xF where x is the moles of electrons exchanged and F is the Faraday constant (26.801 Ah/mol, 26801 mAh/mol). The theoretical specific capacity of the cathode in mAh/g is calculated as $C_{sp}$=xF/(MW) where MW is the molecular weight (g/mol) of the cathode active material. In certain embodiments, the anode may be a limited zinc anode. In some embodiments, an excess Zn anode may improve battery cycle life in embodiments where CE is less than 100%.

A limited Zn anode includes an amount of zinc less than the amount of zinc stripped during a full discharge process of the battery or an amount of zinc less than the capacity of the cathode. A limited Zn anode may improve battery cycle life, as compared to an anode-free configuration, when CE is less than 100%. A limited zinc anode may be useful, for example, in a dual-ion battery. In some examples, the limited Zn anode may include an initial amount of from 0.05× to 0.95× an amount of zinc stripped during a full discharge process of the battery, such as from 0.1× to 0.9×, 0.2× to 0.7×, or 0.2× to 0.5× the amount of zinc stripped during a full discharge process of the battery.

Embodiments of the disclosed batteries may include an anode current collector, a cathode current collector, or both. The current collector(s) may suppress the polarization between the Zn anode plating and stripping. Suitable current collectors include, but are not limited to, carbon paper, carbon cloth, carbon foam, graphite (e.g., graphite paper), glassy carbon, metal foil/mesh/foam (e.g., Zn, Ti, Fe, Cu, Ni, and the like), and ceramic conductors, e.g., ITO. In some embodiments, the current collector is carbon paper, carbon cloth, carbon foam, graphite (e.g., graphite paper), or glassy carbon. In some embodiments, the battery includes an anode current collector, a cathode current collector, or both. In certain embodiments, the assembled battery, prior to a first charge process, does not include an anode and comprises a non-zinc anode current collector. In some examples, the non-zinc anode current collector is carbon-based, e.g., carbon paper, carbon cloth, carbon foam, graphite (e.g., graphite paper), or glassy carbon.

In any or all embodiments, the zinc metal battery may further include a separator. Suitable separator materials include, but are not limited to glass-fiber membrane, specialty paper, cellulose membrane, polyolefin film, rayon film, nylon film, rubber, and rubber/silica film.

Advantageously, the low molecular weight of the zinc halide salts and optional metal halides and the high salt solubilities significantly increase the energy density of devices including a WiSE or hybrid WiSE relative to electrolytes that include higher molecular weight salts. For example, in a full battery of $LiMn_2O_4$|20 O LiTFSI+1 m $Zn(TFSI)_2$||Zn, a z molar $LiMn_2O_4$ cathode needs at least 0.5z molar $Zn(TFSI)_2$ to deliver the highest capacity for $LiMn_2O_4$. As a result, 10z molar LiTFSI and 0.5z L water are required due to the fixed molar ratio between LiTFSI and $Zn(TFSI)_2$ and the 1 m concentration of $Zn(TFSI)_2$, respectively. The higher molecular masses of LiTFSI (287.1 g/mol) and $Zn(TFSI)_2$ (625.7 g/mol) than that of $LiMn_2O_4$ (180.8 g/mol) and the high amount of water caused by the low concentration of $Zn(TFSI)_2$ make the necessary minimal mass of electrolyte 20.4 times that of the cathode mass. Even though the mass of Zn anode is not considered, the theoretical capacity of the full cell based on the mass of cathode and electrolyte will be lower than 6 mAh/g. Therefore, the low energy density of the hybrid battery disclosed in the prior art mainly arises from the low concentration of the Zn-containing electrolyte salt that introduces large amounts of inactive components (Zn-free salt and water).

$ZnCl_2$ can achieve a high concentration of 31 m in aqueous solution. In a $LiMn_2O_4$||30 m $ZnCl_2$||Zn battery, an x molar $LiMn_2O_4$ cathode needs 0.5z molar $ZnCl_2$ and 0.017z L water to deliver the highest capacity for $LiMn_2O_4$. The mass of electrolyte is only 0.47 times of that of $LiMn_2O_4$ cathode. If the mass of Zn anode is not considered, the theoretical capacity of the full cell based on the mass of cathode and electrolyte can be as high as 81.6 mAh/g, which is more than 10 times of that of the $LiMn_2O_4$||20 m LiTFSI+1 m $Zn(TFSI)_2$||Zn battery.

In some embodiments, a zinc metal battery comprising a WiSE as disclosed herein and a $LiMn_2O_4$ cathode has a theoretical capacity within a range of from 10-81.6 mAh/g (based on the mass of the cathode and electrolyte), such as from 15-75 mAh/g. A zinc||$ZnCl_2$||Polypyrene battery exhibits a specific capacity within a range of from 50-140 mAh/g varying inversely with current rates from 1000 mA/g to 50 mA/g (see Example 1), and the battery demonstrates stable cycling over 70 cycles with an energy density of 130-150 Wh/kg based on the polypyrene cathode mass.

In any or all embodiments, a battery comprising a WiSE or hybrid WiSE may have a specific energy, or energy density, within a range of 50-325 Wh $kg^{-1}$, such as an energy density within a range of 50-300, 50-250, 50-200, or 75-200 Wh $kg^{-1}$, based on the mass of both electrodes.

A zinc metal battery comprising a hybrid WiSE as disclosed herein and a $LiMn_2O_4$ or $V_2O_5.H_2O$ cathode may exhibit an initial specific capacity of 100 mAh/g or more and have an energy density of at least 65 Wh $kg^{-1}$, such as 65-200 Wh $kg^{-1}$, based on the mass of electrolyte and electrodes (see Examples 2 and 8). A zinc metal battery comprising a hybrid WiSE as disclosed herein and a $V_2O_5$ cathode may exhibit an initial specific capacity of 300 mAh/g or more and have an energy density of at least 50 Wh $kg^{-1}$, such as 50-100 Wh $kg^{-1}$.

In another example, a battery includes a zinc anode, a manganese oxide ($Mn_3O_4$) cathode, and a hybrid WiSE comprising 25 m $ZnCl_2$ plus a certain concentration of $QCl_x$ (see Example 9 where the WiSE included 25 m $ZnCl_2$-7 m $NH_4Cl$, FIGS. 53A-53E). In a first discharge process, $Mn_3O_4$ is converted to $Zn_yMn_3O_4$, where Zn ions are irreversibly trapped. In a subsequent charge process (the first charge), the electrode operates on chloride insertion inside $Zn_yMn_3O_4$, which delivers a capacity of 200 mAh $g^{-1}$ or more. The cell exhibited stable cycling over at least 40 cycles.

Some embodiments of the disclosed zinc metal batteries including a WiSE or hybrid WiSE also exhibit stable cycling for at least 50 cycles, at least 100 cycles, at least 300 cycles, at least 500 cycles, at least 1000 cycles, at least 1500 cycles, at least 2500 cycles, or even at least 5000 cycles at current rates of from 50-1000 mA/g as evidenced by an overpotential, an average CE, and/or a capacity that varies by less than 10% or by less than 5% over the cycles. Certain embodiments of the disclosed zinc metal batteries including a WiSE or hybrid WiSE exhibit stable cycling for at least 200 hours, at least 500 hours, at least 1000 hours, at least 2000 hours, or even at least 4000 hours at an areal capacity from 1-5 mAh $cm^{-2}$ as evidenced by an overpotential, an average CE, and/or a capacity that varies by less than 10% or by less than 5% over the cycles. In any or all embodiments, the disclosed zinc metal batteries including a WiSE or hybrid WiSE may have a high average CE of at least 95%, at least 97%, at least 98%, or even at least 99%, such as a CE of 95-99.99%, 97-99.9%, 98-99.8%, or 98.5-99.8%.

In some embodiments, a battery comprising a WiSE has an average CE of at least 95% over 100 cycles. In certain embodiments, the battery has an average CE of at least 98%, at least 99%, at least 99.2%, at least 99.5%, or at least 99.7% over at least 100 cycles, at least 200 cycles, at least 500 cycles, or at least 1000 cycles.

In some embodiments, a battery comprising a hybrid WiSE has an average CE of at least 98% over 100 cycles. In certain embodiments, the battery has an average CE of at least 99%, at least 99.2%, at least 99.5%, at least 99.7%, or at least 99.8% over at least 100 cycles, at least 200 cycles, at least 500 cycles, or at least 1000 cycles.

Figure 49A:
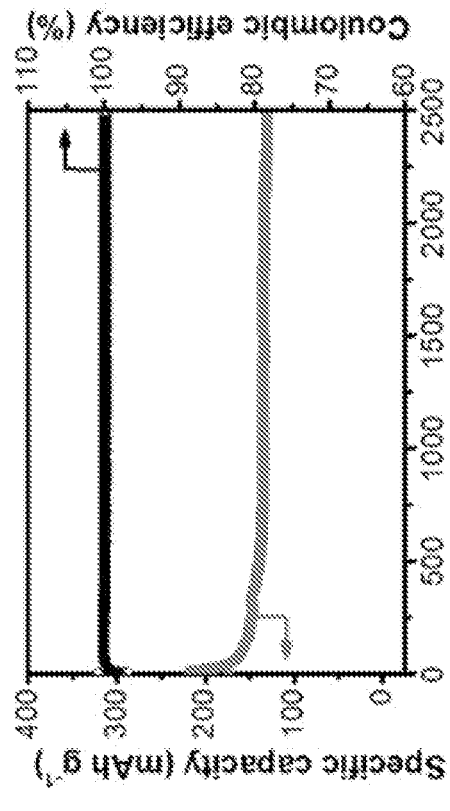
FIGS. 49A-49B show the cycling performance of $V_2O_5 \cdot H_2O$∥Zn with 30 m $ZnCl_2$+5 m LiCl electrolyte at 2 A $g^{-1}$ (49A) and (c) 5 A $g^{-1}$ (49B), where the mass ratio of $V_2O_5 \cdot H_2O$ to Zn metal anode (ZMA) is set to 1:1.2.
Figure 49B:
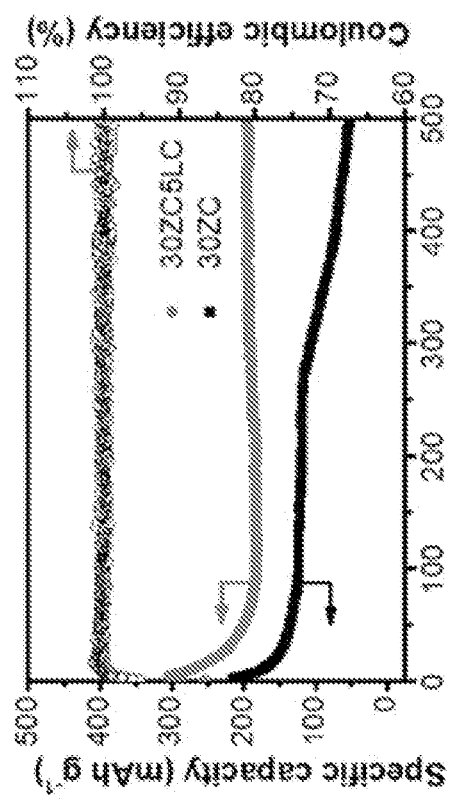

In one example, a cell including a Zn anode, a $V_2O_5.H_2O$ cathode, and 30 m $ZnCl_2$-5 m LiCl hybrid WiSE exhibited a stable capacity of around 200 mAh/g at 2 A $g^{-1}$ with a CE near 100% for more than 500 cycles and stable cycling for 2500 cycles with a Coulombic efficiency (CE) near 100% at 5 A $g^{-1}$; the cell had a $Zn:V_2O_5.H_2O$ mas ratio of 1.2 (Example 8, FIGS. 49A, 49B). The cell delivered an energy density of 304 Wh $kg^{-1}$ based on the mass of cathode only. In another example, a cell including a Zn anode, a $LiMn_2O_4$ cathode, and 30 m $ZnCl_2$-10 m LiCl hybrid WiSE exhibited stable cycling for at least 4000 cycles with a CE near 100% (Example 8, FIG. 50). The cell had an energy density of 125 Wh $kg^{-1}$ based on the mass of both electrodes. In still another example, a cell including a Zn anode, a $LiMn_2O_4$ cathode, and 30 m $ZnCl_2$-10 m LiCl hybrid WiSE exhibited stable cycling for 180 cycles at 60 mA $g^{-1}$ with a CE around 95% and 1500 cycles with a CE near 100% at 480 mA $g^{-1}$; the cell had a $Zn:LiMn_2O_4$ mass ratio of 0.6 (Example 8, FIGS. 52A, 52B). The cell delivered an energy density of 200 Wh $kg^{-1}$ based on the mass of the cathode.

Embodiments of the disclosed batteries are suitable for use in many applications. Exemplary applications include, but are not limited to, electronics, electric vehicles and energy storage systems, such as home, public/private facility, community, and electric grid energy storage systems.

IV. METHOD OF MAKING BATTERIES

A method for making a zinc metal battery as disclosed herein includes providing a WiSE or hybrid WiSE as disclosed, and assembling a battery comprising the electrolyte, a cathode and (i) a zinc anode or (ii) a non-zinc current collector in the absence of an anode. The cathode may comprise a zinc-containing anion insertion material, or a halide insertion material, or a $Q^{x+}$ insertion material. In some embodiments, the method further includes providing a separator between the cathode and zinc anode or non-zinc current collector. The method also may include providing a cathode current collector. When the battery includes a zinc anode, an anode current collector optionally may be provided. The battery components may be sealed within a housing that is compatible with the battery components.

In one embodiment, making the zinc metal battery includes (i) providing an electrolyte comprising, consisting essentially of, or consisting of water and a zinc halide having a concentration>10 M or >18.5 m, and (ii) assembling a battery comprising the electrolyte, a cathode comprising a zinc-containing anion insertion material, and a zinc anode or non-zinc anode current collector. In one embodiment, the electrolyte comprises, consists essentially of, or consists of water and $ZnCl_2$, and the cathode comprises polypyrene or $Mn_3O_4$.

In some embodiments, making the zinc metal battery includes (i) providing an electrolyte comprising, consisting essentially of, or consisting of water, a zinc halide, and a metal or nonmetal halide comprising a metal or nonmetal cation $Q^{x+}$ where x is an integer from 1 to 4, and Q is an alkali metal, an alkaline earth metal, a Group IIIA metal, a transition metal other than Zn, a nonmetal cation (e.g., ammonium or alkyl ammonium) or a combination thereof, where $[ZnX_2] \geq 10$ m and $[ZnX_2]+[Q^{x+}] \geq 10.5$ m, and (ii) assembling a battery comprising the electrolyte, a cathode comprising a $Q^{x+}$ insertion material, and a zinc anode or non-zinc current collector. In some embodiments, $[ZnX_2]+[Q^{x+}] \geq 15$ m. In certain embodiments, X is Cl. In one embodiment, the electrolyte comprises, consists essentially of, or consists of $ZnCl_2$, LiCl, and water, and the cathode comprises $LiMn_2O_4$ or $LiFePO_4$. In another embodiment, the electrolyte comprises, consists essentially of, or consists of (i) water, (ii) $ZnCl_2$, and (iii) NaCl or KCl or $NH_4Cl$ or alkyl ammonium chloride, or choline chloride, or a combination thereof, and the cathode comprises Prussian blue, a Prussian blue analog, $Na_3V_2(PO_4)_2F_3$ or $Na_3V_2(PO_4)_3$. In an independent embodiment, the electrolyte comprises, consists essentially of, or consists of (i) water, (ii) $ZnCl_2$, and (iii) $NH_4Cl$, and the cathode comprises $Mn_3O_4$.

V. OVERVIEW OF REPRESENTATIVE EMBODIMENTS

Certain non-limiting representative embodiments are illustrated in the numbered clauses below.

1. An electrolyte for a zinc metal battery including a cathode comprising a metal ion insertion material, the electrolyte comprising: a zinc halide; a metal or nonmetal halide comprising a metal or a nonmetal cation $Q^{x+}$ where x is an integer from 1 to 4, and Q is an alkali metal, an alkaline earth metal, a Group IIIA metal, a transition metal other than Zn, a nonmetal cation or a combination thereof; and water, the electrolyte having a $[Zn^{2+}] \geq 10$ m and $[Zn^{2+}]+[Q^{x+}] \geq 10.5$ m.

2. The electrolyte of clause 1 where the zinc halide is $ZnCl_2$.

3. The electrolyte of clause 1 or clause 2 where: 10 m≤$[Zn^{2+}]$≤30 m; and 0.5 m≤$[Q^{x+}]$≥20 m.

4. The electrolyte of any one of clauses 1-3 where $[Zn^{2+}] \geq 15$ m.

5. The electrolyte of any one of clauses 1-4 where the metal or nonmetal halide is a metal or nonmetal chloride.

6. The electrolyte of any one of clauses 1-5 where Q is Li, Na, K, Rb, Cs, Mg, Ca, Sr, Ba, Sc, Al, Mn, Ce, Cr, ammonium, alkyl ammonium, or a combination thereof.

7. The electrolyte of clause 6 where Q is Li and the metal halide is LiCl.

8. The electrolyte of any one of clauses 1-7 where 15 m≤$[Zn^{2+}]+[Q^{x+}]$≤40 m.

9. The electrolyte of any one of clauses 1-8 where a molal concentration ratio of Zn to Q is within a range of from 60:1 to 0.5:1.

10. The electrolyte of clause 1, comprising: 10-30 m $ZnCl_2$; 0.5-20 m LiCl; and water.

11. The electrolyte of any one of clauses 1-10, consisting essentially of: the zinc halide; the metal or nonmetal halide; and water.

12. A zinc metal battery, comprising: an electrolyte comprising (a) water and a zinc halide, the zinc halide having a concentration>10 m, or (b) water, a zinc halide, and a metal or nonmetal halide comprising a metal or nonmetal cation $Q^{x+}$ where x is an integer from 1 to 4, and Q is an alkali metal, an alkaline earth metal, a Group IIIA metal, a transition metal other than Zn, a nonmetal cation, or a combination thereof, where $[Zn^{2+}] \geq 10$ m and $[Zn^{2+}]+[Q^{x+}] \geq 10.5$ m; a cathode comprising a zinc-containing anion insertion material or a $Q^{x+}$ ion insertion material; and (i) a zinc anode or (ii) a non-zinc current collector in the absence of an anode prior to a first charge process of the battery after assembly.

13. The zinc metal battery of clause 12 where the zinc halide is $ZnCl_2$.

14. The zinc metal battery of clause 12 or clause 13 where the cathode comprises a manganese-containing oxide, a vanadium-containing oxide, an iron-containing phosphate, an iron fluoride, an iron oxyfluoride, Prussian blue, a Prussian blue analog, a carbonyl-containing compound, a radical polymer, a conductive polymer, or an organosulfur compound.

15. The zinc metal battery of clause 14 where the cathode comprises $LiMn_2O_4$, $LiFePO_4$, $MnO_2$, $V_2O_5$, $Na_3V_2(PO_4)_2F_3$, $Na_3V_2(PO_4)_3$, zinc hexacyanoferrate, or polypyrene.

16. The zinc metal battery of any one of clauses 12-15 where: the electrolyte comprises $ZnCl_2$ and a metal or nonmetal chloride comprising a metal or nonmetal cation $Q^{x+}$ where $[Zn^{2+}] \geq 10$ m and $[Zn^{2+}]+[Q^{x+}] \geq 10.5$ m; and the cathode comprises a $Q^{x+}$ ion insertion material.

17. The zinc mal battery of clause 16 where: the electrolyte comprises water, $ZnCl_2$, and LiCl; and the cathode comprises $LiMn_2O_4$ or $LiFePO_4$.

18. The zinc metal battery of clause 16 where: the electrolyte comprises (i) water, (ii) $ZnCl_2$, and (iii) NaCl, KCl, $NH_4Cl$, or a combination thereof; and the cathode comprises Prussian blue, a Prussian blue analog, $Na_3V_2(PO_4)_2F_3$ or $Na_3V_2(PO_4)_3$.

19. The zinc metal battery of any one of clauses 16-18 where the battery has an average Coulombic efficiency of at least 98% over 100 cycles.

20. The zinc metal battery of any one of clauses 16-18 where the battery has an average Coulombic efficiency of at least 99% over 100 cycles.

21. The zinc metal battery of clause 12 where: the electrolyte comprises water and $ZnCl_2$ having a concentration≥18.5 m; and the cathode comprises a radical polymer or a conductive polymer capable of reversibly hosting $[ZnCl_4]^{2-}$ ions.

22. The zinc metal battery of clause 21 where the cathode comprises polypyrene.

23. The zinc metal battery of clause 21 or clause 22 where the battery has an average Coulombic efficiency of at least 95% over 100 cycles.

24. The zinc metal battery of clause 21 or clause 22 where the battery has an average Coulombic efficiency of at least 99% over 100 cycles.

25. The zinc metal battery of any one of clauses 12-24 where the battery has an overpotential that changes by less than 10% relative to the average overpotential over a time period of at least 500 hours.

26. The zinc metal battery of any one of clauses 12-25 where the battery does not comprise an anode prior to a first charge process of the battery after assembly, and the non-zinc current collector comprises carbon paper, carbon cloth, carbon foam, graphite, glassy carbon, or a metal foil, mesh or foam, where the metal is other than aluminum.

27. The zinc metal battery of any one of clauses 12-25 where the battery comprises a limited Zn anode including an initial amount of zinc prior to an initial charge process of the battery, where the initial amount is less than a zinc amount stripped during a full discharge process of the battery.

28. The zinc metal battery of any one of clauses 12-25 where the battery comprises an excess Zn anode including an initial amount of zinc prior to an initial charge process of the battery, where the initial amount is at least 1.5× a zinc amount of stripped during a full discharge process of the battery.

29. A device, comprising a zinc metal battery according to any one of clauses 12-28.

30. The device of clause 29 where the device is an electric vehicle or an electrical energy storage system.

31. A method of making a zinc metal battery according to any one of clauses 12-28, comprising: providing an electrolyte comprising (a) water and a zinc halide having a concentration>10 M, or (b) water, a zinc halide, and a metal or nonmetal halide comprising a cation $Q^{x+}$ where x is an integer from 1 to 4, and Q is an alkali metal, an alkaline earth metal, a Group IIIA metal, a transition metal other than Zn, a nonmetal cation, or a combination thereof, where $[Zn^{2+}] \geq 10$ m and $[Zn^{2+}]+[Q^{x+}] \geq 10.5$ m; assembling a battery comprising the electrolyte, a cathode comprising a zinc-containing anion insertion material or a $Q^{x+}$ ion insertion material, and (i) a zinc anode or (ii) a non-zinc current collector in the absence of an anode.

32. The method of clause 31 where: the electrolyte comprises $ZnCl_2$, LiCl, and water; and the cathode comprises $LiMn_2O_4$ or $LiFePO_4$.

33. The method of clause 31 where: the electrolyte consists essentially of $ZnCl_2$ and water; and the cathode comprises polypyrene.

34. The method of clause 31 where: the electrolyte comprises (i) water, (ii) $ZnCl_2$, and (iii) NaCl, KCl, $NH_4Cl$, or a combination thereof; and the cathode comprises Prussian blue, a Prussian blue analog, $Na_3V_2(PO_4)_2F_3$ or $Na_3V_2(PO_4)_3$.

35. An electrolyte for a zinc metal battery including a cathode comprising a metal ion insertion material, the electrolyte comprising: a zinc halide; a metal halide or nonmetal halide comprising a metal or a nonmetal cation $Q^{x+}$ where x is an integer from 1 to 4, and Q is an alkali metal, an alkaline earth metal, a Group IIIA metal, a transition metal other than Zn, a nonmetal cation, or any combination thereof; and water, the electrolyte having a $[ZnX_2] \geq 10$ m and $[ZnX_2]+[Q^{x+}] \geq 10.5$ m, where X is Cl, F, I, Br, or any combination thereof.

36. The electrolyte of clause 35 where the zinc halide is $ZnCl_2$.

37. The electrolyte of clause 35 or clause 36 where: 10 m$\leq[ZnX_2]\leq 30$ m; and 0.5 m$\leq[Q^{x+}]\leq 150$ m.

38. The electrolyte of any one of clauses 35-37 where $[ZnX_2] \geq 15$ m.

39. The electrolyte of any one of clauses 35-38 where the metal halide or nonmetal halide is a metal chloride or nonmetal chloride.

40. The electrolyte of any one of clauses 35-39 where Q is Li, Na, K, Rb, Cs, Mg, Ca, Sr, Ba, Sc, Al, Mn, Ce, Cr, ammonium, alkyl ammonium, choline ion, or a combination thereof.

41. The electrolyte of clause 40 where Q is Li and the metal halide is LiCl.

42. The electrolyte of any one of clauses 35-41 where 15 m$\leq[ZnX_2]+[Q^{x+}]\leq 40$ m.

43. The electrolyte of any one of clauses 35-42 where a molal concentration ratio of Zn to Q is within a range of from 60:1 to 1:5.

44. The electrolyte of clause 35, comprising: 10-30 m $ZnCl_2$; 0.5-20 m LiCl; and water.

45. The electrolyte of any one of clauses 35-44, consisting essentially of: the zinc halide; the metal halide or nonmetal halide; and water.

46. A zinc metal battery, comprising: an electrolyte comprising (a) water and a zinc halide, the zinc halide having a concentration>10 m, or (b) water, a zinc halide, and a metal halide or nonmetal halide comprising a metal or nonmetal cation $Q^{x+}$ where x is an integer from 1 to 4, and Q is an alkali metal, an alkaline earth metal, a Group IIIA metal, a transition metal other than Zn, a nonmetal cation, or a combination thereof, where $[ZnX_2]\leq 10$ m and $[ZnX_2]+[Q^{x+}] \leq 10.5$ m, where X is a halogen; a cathode comprising a zinc-containing anion insertion material or a $Q^{x+}$ ion insertion material; and (i) a zinc anode or (ii) a non-zinc current collector in the absence of an anode prior to a first charge process of the battery after assembly.

47. The zinc metal battery of clause 46 where the zinc halide is $ZnCl_2$.

48. The zinc metal battery of clause 46 or clause 47 where the cathode comprises a manganese-containing oxide, a vanadium-containing oxide, a transition-metal-containing phosphate, a transition-metal-containing fluorophosphate, an iron fluoride, an iron oxyfluoride, Prussian blue, a Prussian blue analog, a carbonyl-containing compound, a radical polymer, a conductive polymer, an organosulfur compound, iodine, or a carbon/iodine composite.

49. The zinc metal battery of clause 48 where the cathode comprises $LiMn_2O_4$, $LiFePO_4$, $MnO_2$, $V_2O_5$, $Na_3V_2(PO_4)_2F_3$, $Na_3V_2(PO_4)_3$, zinc hexacyanoferrate, polypyrene, $Mn_3O_4$, or iodine.

50. The zinc metal battery of any one of clauses 46-49 where: the electrolyte comprises $ZnCl_2$ and a metal or nonmetal chloride comprising a metal or nonmetal cation $Q^{x+}$ where $[ZnCl_2] \geq 10$ m and $[ZnCl_2]+[Q^{x+}] \geq 10.5$ m; and the cathode comprises a $Q^{x+}$ ion insertion material.

51. The zinc metal battery of clause 50 where: the electrolyte comprises water, $ZnCl_2$, and LiCl; and the cathode comprises $LiMn_2O_4$ or $LiFePO_4$.

52. The zinc metal battery of clause 50 where: the electrolyte comprises (i) water, (ii) $ZnCl_2$, and (iii) NaCl or KCl or $NH_4Cl$ or alkyl ammonium chloride, or choline chloride, or any combination thereof; and the cathode comprises Prussian blue, a Prussian blue analog, $Na_3V_2(PO_4)_2F_3$, $Na_3V_2(PO_4)_3$, or $Mn_3O_4$.

53. The zinc metal battery of any one of clauses 50-52 where the battery has an average Coulombic efficiency of at least 98% over 100 cycles.

54. The zinc metal battery of any one of clauses 50-52 where the battery has an average Coulombic efficiency of at least 99% over 100 cycles.

55. The zinc metal battery of clause 46 where: the electrolyte comprises water and $ZnCl_2$ having a concentration$\geq 18.5$ m; and the cathode comprises a radical polymer or a conductive polymer capable of reversibly hosting $[ZnCl_4]^{2-}$ ions.

56. The zinc metal battery of clause 55 where the cathode comprises polypyrene.

57. The zinc metal battery of clause 55 or 56 where the battery has an average Coulombic efficiency of at least 95% over 100 cycles.

58. The zinc metal battery of clause 55 or 56 where the battery has an average Coulombic efficiency of at least 99% over 100 cycles.

59. The zinc metal battery of any one of clauses 46-58 where the battery has an overpotential that changes by less than 10% relative to the average overpotential over a time period of at least 500 hours.

60. The zinc metal battery of any one of clauses 46-59 where the battery does not comprise an anode prior to a first charge process of the battery after assembly, and the non-zinc current collector comprises carbon paper, carbon cloth, carbon foam, graphite, glassy carbon, or a metal foil, mesh or foam, where the metal is other than aluminum.

61. The zinc metal battery of any one of clauses 46-59 where the battery comprises a limited Zn anode including an initial amount of zinc prior to an initial charge process of the battery, where the initial amount is less than a zinc amount stripped during a full discharge process of the battery.

62. The zinc metal battery of any one of clauses 46-59 where the battery comprises an excess Zn anode including an initial amount of zinc prior to an initial charge process of the battery, where the initial amount is at least 1.5× a zinc amount of stripped during a full discharge process of the battery.

63. A device, comprising a zinc metal battery according to any one of any one of clauses 46-62.

64. The device of clause 60 where the device is an electric vehicle or an electrical energy storage system.

65. A method of making a zinc metal battery according to any one of any one of clauses 46-62, comprising: providing an electrolyte comprising (a) water and a zinc halide having a concentration>10 M, or (b) water, a zinc halide, and a metal halide or nonmetal halide comprising a cation $Q^{x+}$ where x is an integer from 1 to 4, and Q is an alkali metal, an alkaline earth metal, a Group IIIA metal, a transition metal other than Zn, a nonmetal cation, or a combination thereof, where $[ZnX_2] \geq 10$ m and $[ZnX_2]+[Q^{x+}] \geq 10.5$ m, where X is a halogen; assembling a battery comprising the electrolyte, a cathode comprising a zinc-containing anion insertion material or a $Q^{x+}$ ion insertion material, and (i) a zinc anode or (ii) a non-zinc current collector in the absence of an anode.

66. The method of clause 65 where: the electrolyte comprises $ZnCl_2$, LiCl, and water; and the cathode comprises $LiMn_2O_4$ or $LiFePO_4$.

67. The method of clause 65 where: the electrolyte consists essentially of $ZnCl_2$ and water; and the cathode comprises polypyrene.

68. The method of clause 65 where: the electrolyte consists essentially of $ZnCl_2$ and water; and the cathode comprises $Mn_3O_4$.

69. The method of clause 65 where: the electrolyte consists essentially of (i) water, (ii) $ZnCl_2$, and (iii) NaCl or KCl or $NH_4Cl$ or alkyl ammonium chloride or choline chloride, or a combination thereof; and the cathode comprises $Mn_3O_4$.

70. The method of clause 65 where: the electrolyte comprises (i) water, (ii) $ZnCl_2$, and (iii) NaCl or KCl or $NH_4Cl$ or alkyl ammonium chloride or choline chloride, or a combination thereof; and the cathode comprises Prussian blue, a Prussian blue analog, $Na_3V_2(PO_4)_2F_3$ or $Na_3V_2(PO_4)_3$.

VI. WORKING EXAMPLES

Materials $ZnCl_2$ (99.95%), Ti foil, Zn foil (0.1 mm thick, 99.98%), N-methyl pyrrolidone (NMP), $V_2O_5$, LiCl (99.7%) and $LiMn_2O_4$ were purchased from Alfa, TCI, Fisher chemical and MTI. Glass fiber (GF/D borosilicate) was purchased from Whatman. Carbon paper was purchased from Fuel Cell Store. Ethanol, hydrogen peroxide (85%) were purchased from Sinopharm Chemical Reagent Co. Ltd. All chemicals were used as received. The $V_2O_5.H_2O$ was synthesized according to the method of Dong et al. (*Chem* 2019, 5:1537-1551).

Characterization of Zn Anodes and Electrolytes

The morphology characterization of Zn anode was carried out on a field-emission scanning electron microscopy (SU8020, Hitachi). FT-IR spectra were collected on a NICO-LET® 5397 AVATAR® 360 Fourier Transform Infrared Spectrometer. Femtosecond stimulated Raman spectroscopy (FSRS) measurements were performed according to the previously reported method (Zhu et al., *Appl. Phys. Lett.* 2014, 105:041106). The transference number for the $ZnCl_2$-based electrolytes was measured based on the following equation (Evans et al., *Polymer* 1987, 28:2324-2328):

$$T = \frac{I^S(\Delta V - I^0 R_1^0)}{I^0(\Delta V - I^S R_1^S)} \quad (1)$$

where T is the transference number, $I^0$ is the initial current, $I^0$ is the steady-state current, $\Delta V$ is the applied potential, $R_1^0$ is the initial resistance and $R_1^S$ is the steady-state resistance.

Electrochemical Measurements

The measurements of Coulombic efficiency of Zn plating/striping. The measurements of the reversibility of Zn anode was conducted on an Arbin® SCTS battery tester with asymmetric Zn‖Zn cells by following the reported method (Adams et al., *Adv. Energy Mater.* 2018, 8:1702097). Briefly, a cycle at capacity of 4 mAh cm$^{-2}$ was conducted to precondition the current collector of Ti foil to eliminate the uncertain effects on the substrate surface. Then a given amount of charge ($Q_T$, 4 mAh cm$^{-2}$) was employed to deposit Zn on Ti foil. Next, a smaller capacity ($Q_C$, 0.4 mAh cm$^{-2}$) was used to cycle Zn between Ti foil working electrode and Zn counter electrode for 100 cycles. Finally, the remaining Zn reservoir was exhaustively stripped to the cut-off potential, obtaining the final stripping charge capacity of $Q_S$. Thus, the average CE can be calculated by:

$$CE_{avg} = (100Q_C + Q_S)/(100Q_C + Q_T) \quad (2)$$

The measurements of stability of Zn anode. The stability of Zn anodes was measured on Lanhe® (BT2001A) battery tester by employing Zn metal as both working electrode and counter electrode with glass fiber separator in Swagelok-type symmetric cells. The areal capacity of 1 and 4 mAh cm$^{-2}$ was applied on the Zn electrodes in 30ZC and 30ZC5LC electrolytes at 1 mA cm$^{-2}$ with a duration time of 1 hour and 2 mA cm$^{-2}$ with a duration time of 2 hours, respectively.

The measurements of electrochemical performance for $V_2O_5.H_2O$‖Zn and $LiMn_2O_4Z$‖Zn full cells. Two-electrode Swagelok® cells with $V_2O_5.H_2O$ or $LiMn_2O_4$ as the cathode, a given amount of Zn as the anode and glass fiber as the separator were employed to estimate the performance of full cells. 30ZC, 30ZC5LC, 30ZC10LC were utilized as the aqueous electrolytes. The mass ratios of Zn to $V_2O_5.H_2O$ and $LiMn_2O_4$ were set to 1.2 and 0.6, respectively. The $V_2O_5.H_2O$ cathode was prepared by mixing $V_2O_5.H_2O$, Ketjenblack® carbon (Akzo Nobel Chemicals) and polyvinylidene difluoride (PVDF) at a mass ratio of 7:2:1 in N-methyl-2-pyrrolidone (NMP) solvent. The resulting slurry was casted on a carbon paper current collector before drying at 80° C. for 10 hours. The mass loading for $V_2O_5 \cdot H_2O$ was in the range of 1.5-2 mg cm$^{-2}$. The above procedure was also utilized to prepare $LiMn_2O_4$ cathode other than the mass ratio of $LiMn_2O_4$, Ketjenblack® carbon and PVDF was set to 8:1:1. The mass loading for $LiMn_2O_4$ was in the range of 6-7 mg cm$^{-2}$. The electrochemical performance of full cells was estimated on an Arbin® SCTS battery tester.

Theoretical Calculations

Ab initio molecular dynamics (AIMD) were performed using the Vienna ab initio simulation Package (VASP) (Kresse et al., *Phys. Rev. B* 1993, 47:558-561; Kresse et al., *Phys Rev. B* 1994, 49:14251-14269) with projector augmented wave (PAW) pseudopotentials (Blöch, *Phys. Rev. B* 1994, 50:17953-17979) and using the generalized gradient approximation (GGA) of Perdew-Burke-Ernzerhof (PBE) (Perdew et al., *Phys. Rev. Lett.* 1996, 77:3865-3868) for the exchange-correlation function. Energy cutoff was 600 eV using a 1×1×1 Monkhorst-Pack reciprocal space grid of k-points for a single unit cell (Monkhorst et al., *Phys. Rev. B* 1976, 13:5188-5192). All systems were monitored for 20 ps with a step size of 1.0 fs. All initial structures were generated using a free software Packmol (Martinez et al., *J. Comput. Chem.* 2009, 30:2157-2164) to homogeneously mix the water and $ZnCl_2$ (and LiCl) molecules in a desired ratio ($ZnCl_2:H_2O=1:1.8$) with a minimum intermolecular distance of 2.2 Å to not pre-form agglomerated $ZnCl_2$ clusters. Box size was determined from the experimental density, and number of total atoms was controlled to be less than 200 atoms to compensate the computational cost.

Example 1

Zinc||$ZnCl_2$||Polypyrene Dual-Ion Battery

Figure 2:
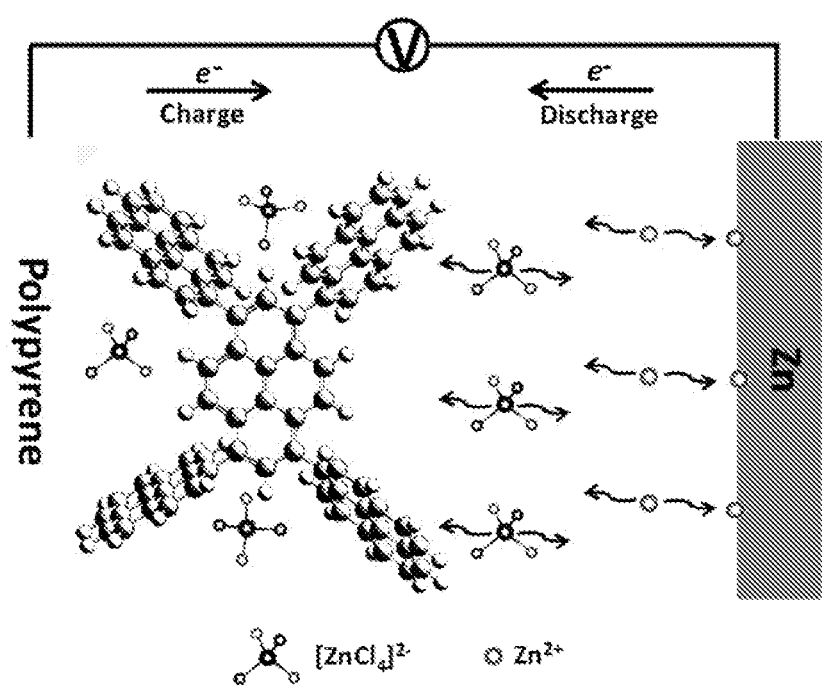
FIG. 2 is a schematic diagram showing the reaction mechanism of a zinc||$ZnCl_2$||polypyrene dual-ion battery.

A two-electrode, dual-ion battery (DIB) comprising a polypyrene cathode, a zinc anode (preassembled or formed in situ), and a 30 m $ZnCl_2$ WiSE was prepared. FIG. 2 illustrates the reaction mechanism of the DIB. During the charge process, the positively polarized polypyrene cathode incorporates anions ($[ZnCl_4]^{2-}$) and $Zn^{2+}$ cations are reduced and then plated on the anode side. In the discharge process, both anions and cations are released to the electrolyte.

Figure 3:
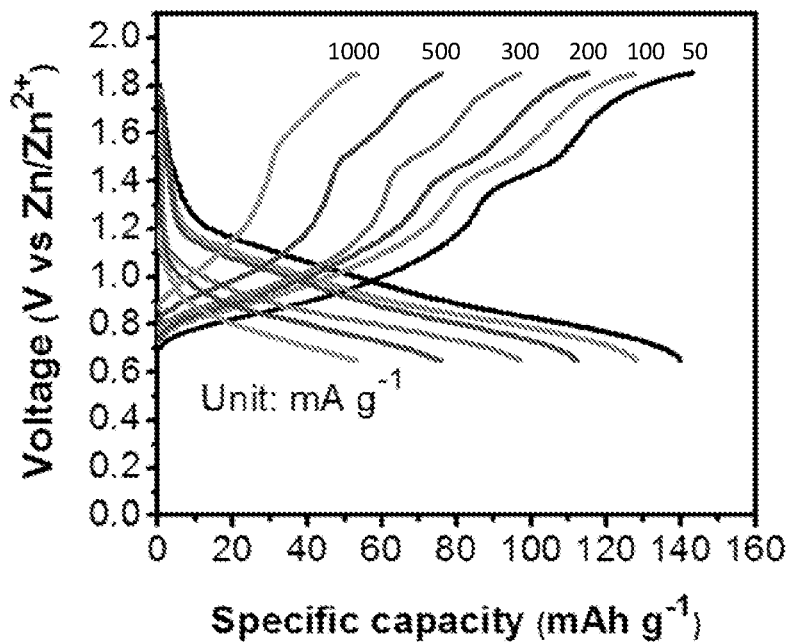
FIG. 3 shows the specific capacities of a polypyrene cathode of a zinc||$ZnCl_2$||polypyrene battery at current rates of from 50-1000 mA/g.
Figure 4:
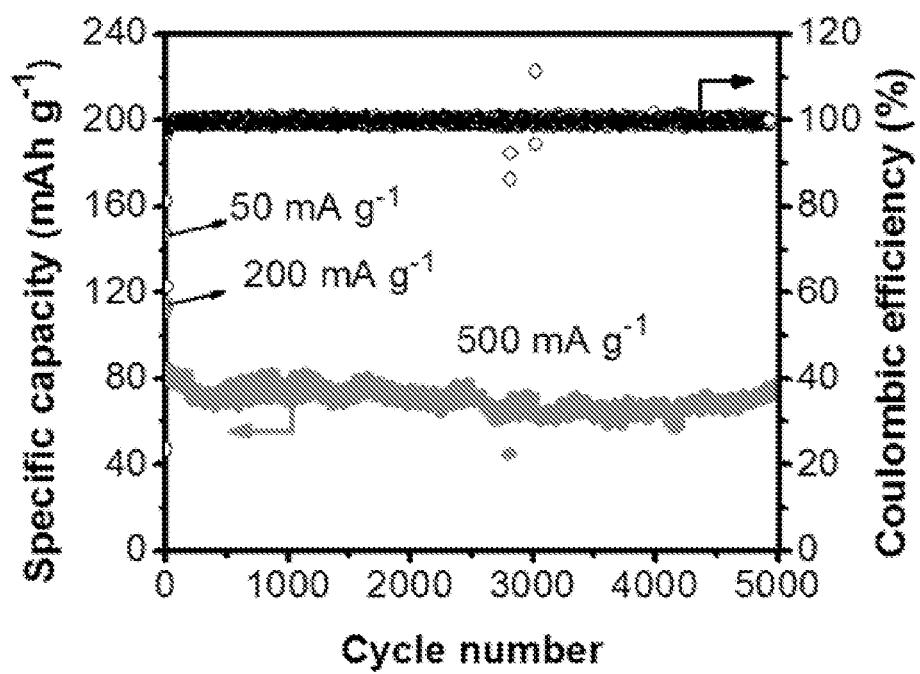
FIG. 4 shows the cycling performance of a zinc∥30 m $ZnCl_2$∥polypyrene battery constructed with a zinc anode; the battery was cycled at 500 mA/g.
Figure 5:
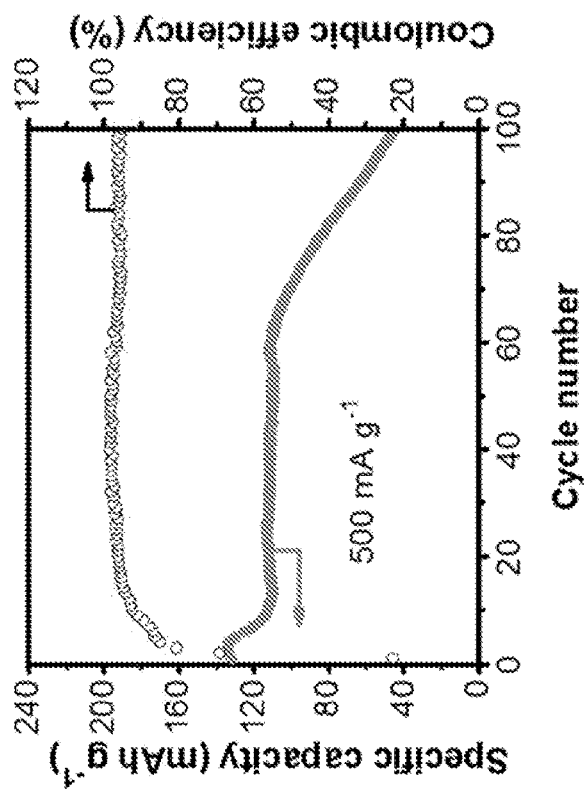
FIG. 5 shows the cycling performance of a zinc∥30 m $ZnCl_2$∥polypyrene battery constructed without a zinc anode; a zinc anode was formed in situ during the charging process; the battery was cycled at 500 mA/g.

As shown in FIG. 3, the polypyrene cathode exhibited specific capacities of 140, 128, 113, 97, 76 and 54 mAh/g at current rates of 50, 100, 200, 300, 500 and 1000 mA/g (based on the polypyrene mass), respectively. When the assembled battery included an excess zinc anode, the DIB showed stable cycling for more than 5000 cycles at 500 mA/g (FIG. 4). When the assembled battery did not include a zinc anode prior to the initial charge process (a carbon fiber current collector was present), the battery demonstrated stable cycling over 70 cycles with an energy density of 132 Wh/kg at 500 mA/g based on the mass of the polypyrene cathode (FIG. 5).

Figure 6:
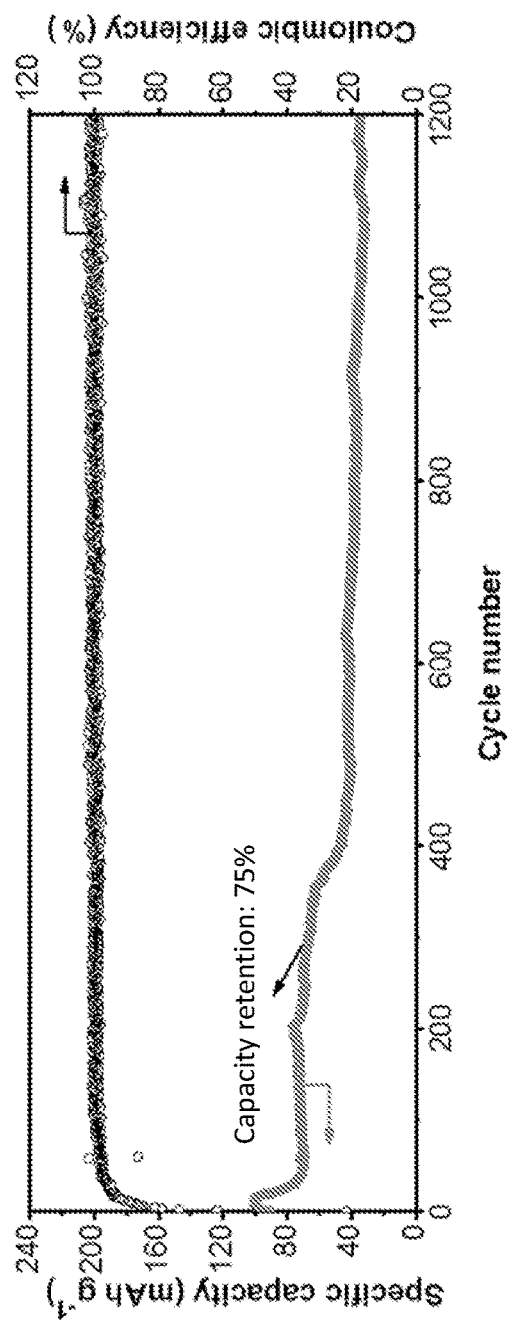
FIG. 6 shows the cycling performance of a zinc∥30 m $ZnCl_2$∥polypyrene battery having a polypyrene to zinc mass ratio of 1:1; the battery was cycled at 1000 mA/g.

A zinc||30 m $ZnCl_2$||Polypyrene full cell with a mass ratio between the polypyrene cathode and zinc anode of 1:1 was prepared. When cycled at 1000 mA/g, the battery was stable for more than 300 cycles and retained a discharge capacity of 35 mAh/g after 1200 cycles (FIG. 6). Excess Zn with 12.5 times of the capacity of polypyrene was plated on the anode side over the course of 1200 cycles because the Coulombic efficiency (CE) for each cycle is less than 100%. Considering that the initial Zn mass was 6 times the capacity of the polypyrene cathode, the total amount of Zn on the anode side was 18.5 times the capacity of the polypyrene. Therefore, the capacity fading from an initial 94 mAh/g to 35 mAh/g corresponds to a capacity retention of 2% based on the total amount of Zn on the anode side. This capacity retention fading from 100% to 2% over 1200 cycles demonstrates a CE as high as 99.7% for Zn plating/stripping.

Figure 7:
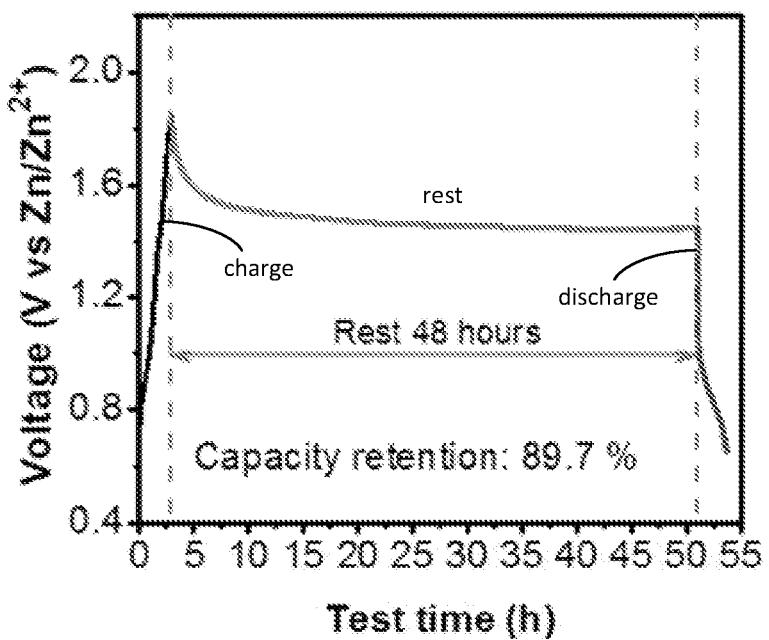
FIG. 7 illustrates the self-discharge of a zinc∥30 m $ZnCl_2$∥polypyrene battery with a rest time of 48 hours.

Self-discharge is a big challenge for both conducting polymer electrodes and aqueous batteries. The self-discharge of a zinc||30 m $ZnCl_2$||Polypyrene battery with a rest time of 48 hours is shown in FIG. 7. The battery exhibited a high capacity retention of 89.7% after 48 hours of rest at open circuit voltage. The excellent self-discharge performance is attributed to the high concentration of the $ZnCl_2$ WiSE that suppresses side reactions between the Zn anode and the $ZnCl_2$ WiSE.

Example 2

Zn||30 m $ZnCl_2$/10 m LiCl||$LiMn_2O_4$ Battery

Figure 8:
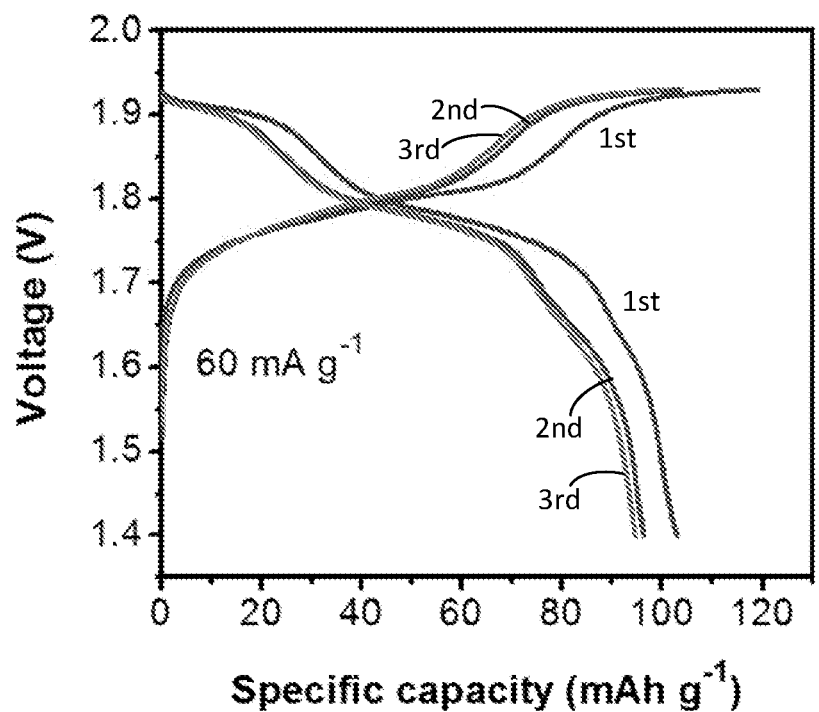
FIG. 8 shows the specific capacity of the first, second and third cycles of a Zn∥30 m $ZnCl_2$/10 m LiCl∥$LiMn_2O_4$ battery cycled at 60 mA/g; the battery had a Zn:$LiMn_2O_4$ mass ratio of 0.4:1.
Figure 9:
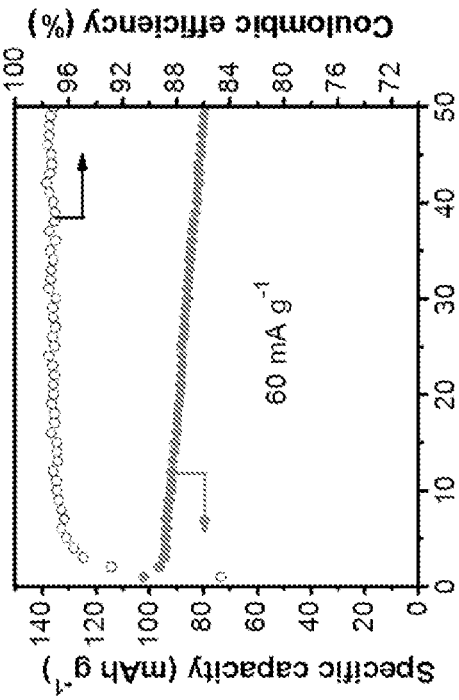
FIG. 9 shows the cycling performance of a Zn∥30 m $ZnCl_2$/10 m LiCl∥$LiMn_2O_4$ battery cycled at 60 mA/g; the battery had a Zn:$LiMn_2O_4$ mass ratio of 0.4:1.

Aqueous Zn-metal batteries using a hybrid 30 m $ZnCl_2$/10 m LiCl WiSE, a $LiMn_2O_4$ cathode, and a Zn metal anode were prepared. With a limited Zn anode (the mass ratio between the Zn anode and the $LiMn_2O_4$ cathode was 0.4:1), the $LiMn_2O_4$ cathode delivered a high initial specific capacity of 110 mAh/g with discharge voltage of 1.8 V at 60 mA/g, corresponding to an energy density of 125 Wh/kg based on the mass of the electrodes. FIG. 8 shows the specific capacities of the first, second, and third cycles. FIG. 9 shows the cycling performance over 50 cycles. Assuming that the mass of electrodes and electrolyte is 70% of the total mass of the whole device, an energy density of 67.5 Wh/kg was obtained for the whole battery, which is higher than that of the nickel metal hydride (Ni-MH) battery (40-60 Wh/kg) and most hybrid aqueous Zn metal batteries.

Figure 10:
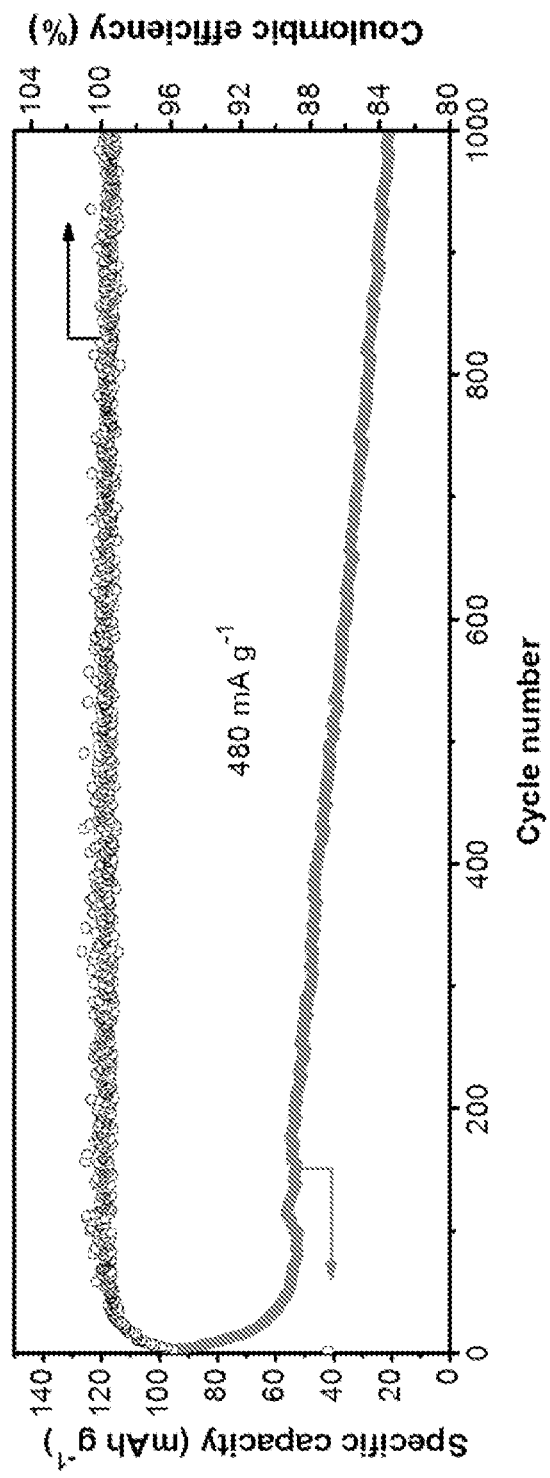
FIG. 10 shows the cycling performance of a Zn∥30 m $ZnCl_2$/10 m LiCl∥$LiMn_2O_4$ battery cycled at 480 mA/g; the battery had an anode:cathode mass ratio of 0.6.

The cycling performance of a $LiMn_2O_4$||30 m $ZnCl_2$/10 m LiCl||Zn battery with a mass ratio between cathode and anode of 1:0.18 was evaluated by GCD cycling at 480 mA/g, delivering a long cycle life over 1000 cycles (FIG. 10); capacity was calculated based on the mass of $LiMn_2O_4$. Excessive Zn with 1.5 times the capacity of $LiMn_2O_4$ was plated on the anode side during the 1000 cycles. Following the calculation described in Example 1 a high average CE of 99.8% for Zn plating/stripping in this hybrid battery system was obtained.

Example 3

Electrolyte and Anode Stability

Figure 11:
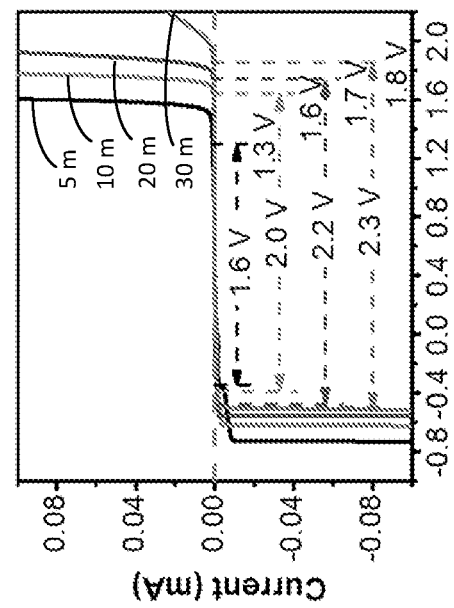
FIG. 11 shows the electrochemical stability window of $ZnCl_2$ electrolytes with concentrations ranging from 5 m to 30 m.

The electrochemical stability window of $ZnCl_2$ electrolytes with concentrations ranging from 5 m to 30 m was measured with linear sweep voltammetry on titanium foil working electrodes in three-electrode cells at a scan rate of 0.2 mV s$^{-1}$ (FIG. 11). In the three-electrode cells, the titanium (Ti) foil served as the working electrode; an excess mass of activated carbon (AC) was the counter electrode; Ag/AgCl (saturated KCl) functioned as the reference electrode. Because Zn plating dominates the cathodic event on the AC electrode, there is no way to observe whether the lower potential edge can be pushed to a more negative value. However, the 30 m $ZnCl_2$ solution displayed a high anodic stability up to 1.8 V vs standard hydrogen electrode (SHE). The 30 m $ZnCl_2$ WiSE showed a high electrochemical window up to 2.3 V.

For the hybrid electrolyte of $ZnCl_2$/LiCl WiSE, the molar ratio between $ZnCl_2$ and LiCl can be finely tuned for different battery systems. As above mentioned, QCl$_x$ (x is an integer>0) can be extended from LiCl to other metal chlorides, such as NaCl, KCl, RbCl, CsCl, MgCl$_2$, CaCl$_2$ SrCl$_2$, BaCl$_2$, ScCl$_3$, MnCl$_2$, AlCl$_3$, CeCl$_3$, CrCl$_3$, and so on as well as nonmetal ions, including but not limited to ammonium ions.

Figure 12:
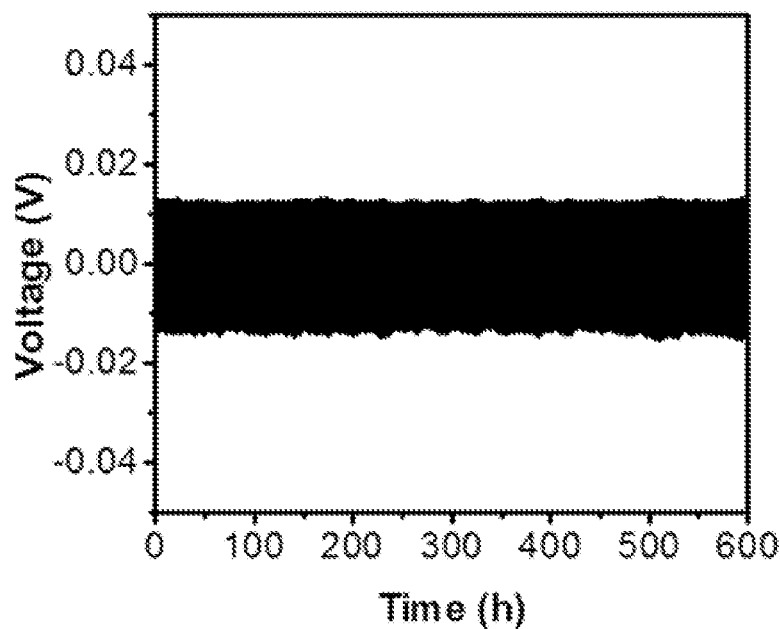
FIG. 12 shows galvanostatic charge/discharge (GCD) curves for a Zn∥30 m $ZnCl_2$∥Zn cell at 0.2 mA/cm$^2$ with a sweep duration of 10 minutes over 600 hours.
Figure 13:
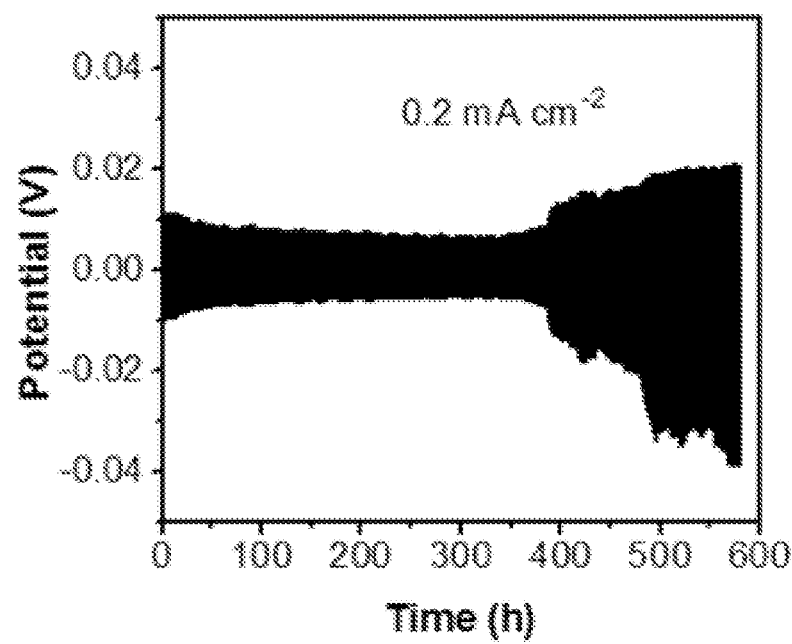
FIG. 13 shows GCD curves for a Zn∥5 m $ZnCl_2$∥Zn cell at 0.2 mA/cm$^2$ with a sweep duration of 10 minutes over 600 hours.

To demonstrate the stability of Zn metal in 30 m ZnCl$_2$ WiSE, a symmetric cell was assembled using Zn metal as both anode and cathode—Zn‖30 m ZnCl$_2$‖Zn. For comparison, a Zn‖5 m ZnCl$_2$‖Zn cell was also evaluated. As shown in FIG. 12, the GCD curves at 0.2 mA/cm$^2$ with a duration of 10 minutes for each charge or discharge process displayed a low and stable overpotential of 12 mV without obvious voltage fluctuation over 600 hours, indicating the high stability of Zn anode in 30 m ZnCl$_2$ WiSE. In contrast, the cell with 5 m ZnCl$_2$ shows poor stability with the overpotential increasing from 10 to 40 mV over 580 hours (FIG. 13).

Figure 14:
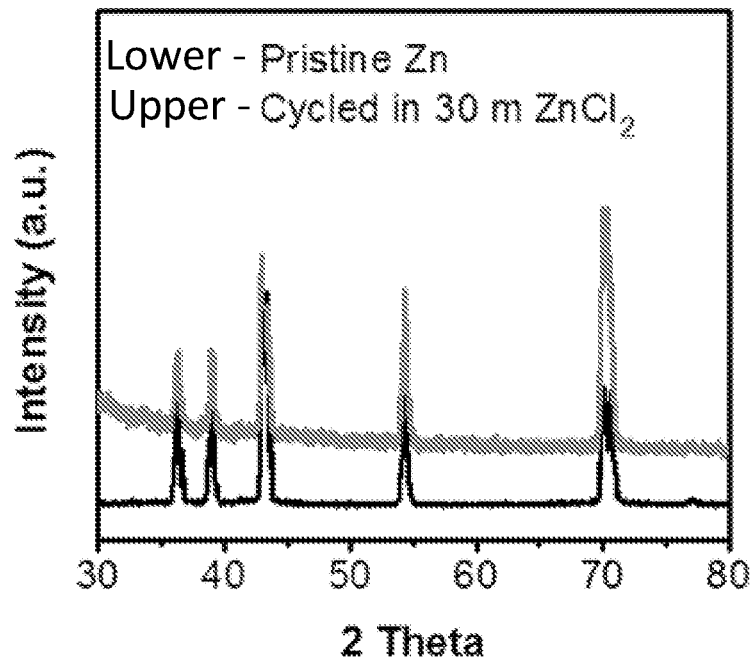
FIG. 14 shows the XRD patterns of the Zn anode of FIG. 12 after 600 hours of cycling and pristine Zn.
Figure 15:
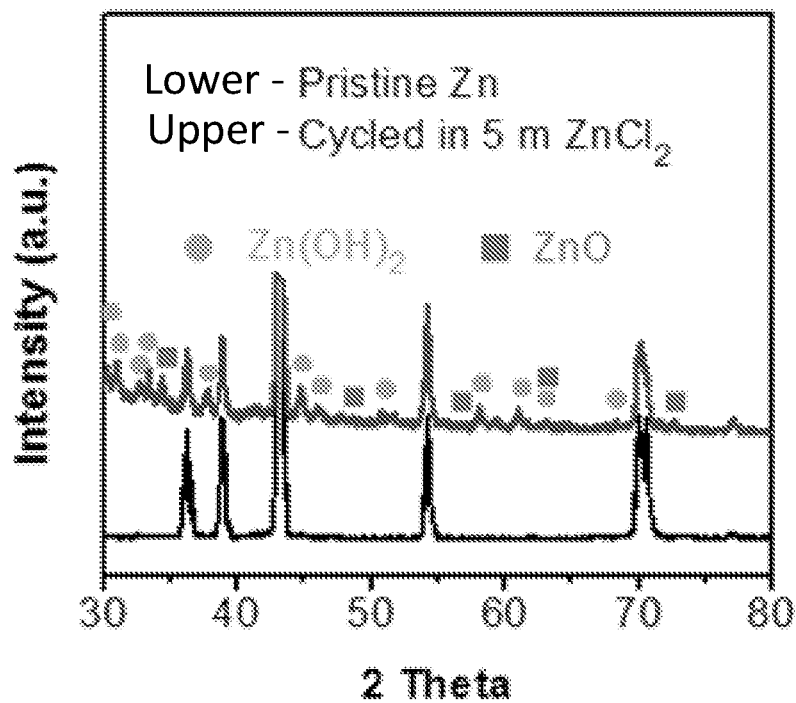
FIG. 15 shows the XRD patterns of the Zn anode of FIG. 13 after 580 hours of cycling and pristine Zn.

X-ray diffraction (XRD) of the Zn anode after 600 hours of cycling with the 30 m ZnCl$_2$ electrolyte exhibited almost the same XRD pattern as the pristine Zn metal (FIG. 14). However, the XRD pattern of the Zn anode cycled in 5 m ZnCl$_2$ reveals the formation of electrochemically inactive Zn(OH)$_2$ and ZnO on zinc metal anode, which suggests the poor reversibility for the Zn plating/stripping of zinc metal anode in this electrolyte (FIG. 15).

Figure 16:
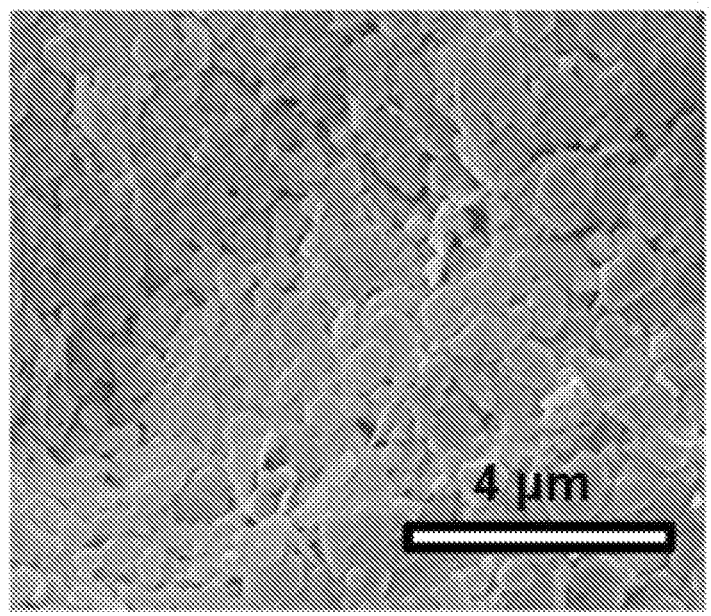
FIG. 16 is an SEM image of a Zn anode cycled in a symmetric cell with 30 m $ZnCl_2$ WiSE after 75 cycles at 1 mA/cm$^2$.
Figure 17:
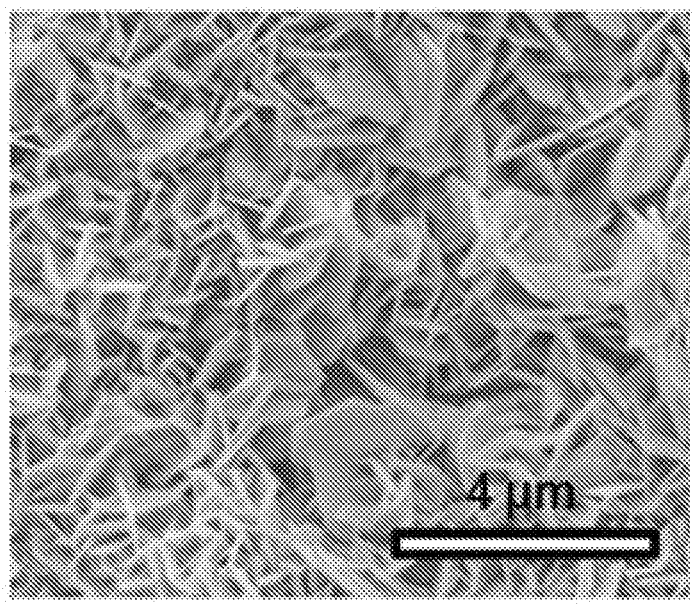
FIG. 17 is an SEM image of a Zn anode cycled in a symmetric cell with 5 m $ZnCl_2$ electrolyte after 75 cycles at 1 mA/cm$^2$.

A symmetric beaker cell was assembled to show the morphology of Zn anode during the GCD process in order to avoid the effects of the separator and the pressure applied during assembling the conventional coin-cells on the surface of the Zn electrode. As shown in FIG. 16, a dense and dendrite-free surface morphology can be observed on the Zn anode after 75 cycles in 30 m ZnCl$_2$ over 150 hours. However, in 5 m ZnCl$_2$, the Zn anode shows a fluffy morphology after 75 cycles under the same conditions (FIG. 17).

The reversibility of Zn plating/stripping in 30 m ZnCl$_2$ and 5 m ZnCl$_2$ was evaluated in a beaker cell with titanium foil as a working electrode, zinc as the anode, and Ag/AgCl as a reference electrode. A certain amount ($Q_T$, 4 mAh/cm$^2$) of Zn was plated on the titanium foil at 1 mA/cm$^2$ followed by 100 cycles with stripping and plating from and to the initially plated Zn with capacity of 0.4 mAh/cm$^2$ ($Q_c$) at 1 mA/cm$^2$. The remaining Zn was exhaustively stripped to the cut-off voltage with capacity of $Q_s$. The average CE can be calculated by the following equation:

$$CE = \frac{100*Q_c + Q_s}{100*Q_c + Q_T}$$

Figure 18:
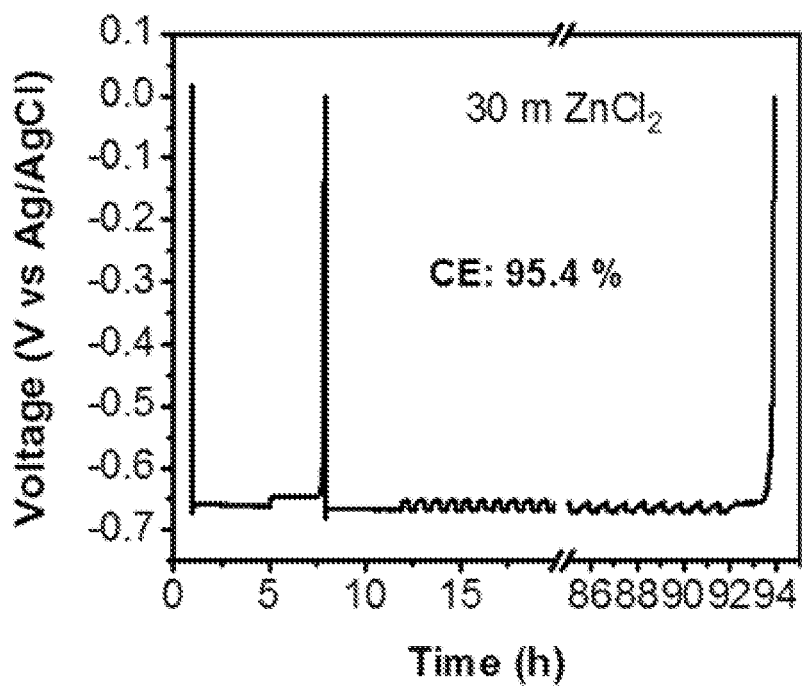
FIG. 18 shows the Coulombic efficiency of Zn plating/stripping in a three-electrode cell including a titanium foil working electrode, zinc anode, and Ag/AgCl reference electrode with 30 m $ZnCl_2$ WiSE.
Figure 19:
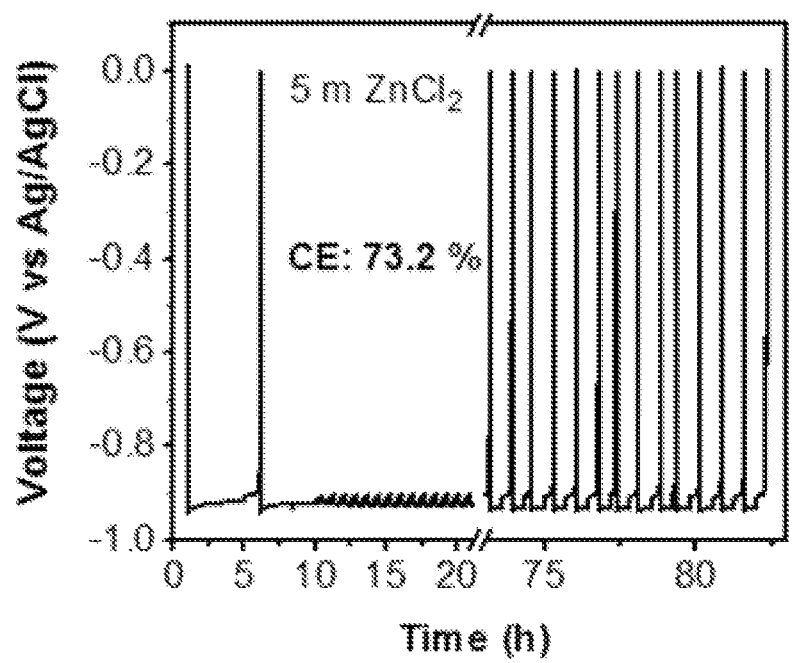
FIG. 19 shows the Coulombic efficiency of Zn plating/stripping in a three-electrode cell including a titanium foil working electrode, zinc anode, and Ag/AgCl reference electrode with 5 m $ZnCl_2$ electrolyte.

The results are shown in FIGS. 18 and 19. A high average CE of 95.4% was obtained, indicating the high reversibility for Zn plating/stripping in 30 m ZnCl$_2$ WiSE (FIG. 18). In contrast, much lower average CE of only 73.2% was obtained for Zn plating/stripping in 5 m ZnCl$_2$, indicating very poor reversibility (FIG. 19).

The stability of the Zn anode in 30 m ZnCl$_2$/10 m LiCl and 15 m ZnCl$_2$/20 m LiCl hybrid WiSEs was evaluated in asymmetric cells as described for FIG. 18 above. As shown in FIG. 20, in 30 m ZnCl$_2$/10 m LiCl the Zn anode exhibited stable GCD curves with a low overpotential of 13 mV, which is similar to that in 30 m ZnCl$_2$. The electrolytes delivered high average CE of 98.5% and 98.7%, respectively (FIGS. 21A-21B). These results demonstrate that the introduction of LiCl can effectively increase the CE of Zn plating/stripping in the ZnCl$_2$/LiCl hybrid electrolytes. The reversibility of Zn plating/stripping is higher than that of Zn plating/stripping in most electrolytes.

Example 4

Hybrid WiSEs Including LiCl, NaCl, KCl, or NH$_4$Cl

Hybrid WiSEs were prepared by the following method: 30 mol ZnCl$_2$ was mixed with 5 mol LiCl, 6 mol NaCl, 6 mol KCl, and 6 mol NH$_4$Cl respectively, to get four mixed chloride salts. Then 1 L water was added into each of the four mixed chloride salts to provide the hybrid WiSEs: 30 m ZnCl$_2$+5 m LiCl, 30 m ZnCl$_2$+6 m NaCl, 30 m ZnCl$_2$+6 m KCl, and 30 m ZnCl$_2$+6 m NH$_4$Cl.

The reversibility of Zn plating/stripping in each of the electrolytes was evaluated in a three-electrode cell with titanium foil as the working electrode, Zn as the counter electrode and Ag/AgCl as the reference electrode. A certain amount ($Q_T$, 4 mAh/cm$^2$) of Zn was plated on titanium foil followed by 100 cycles with stripping and plating from and to the initially plated Zn with a capacity of 0.4 mAh/cm$^2$ ($Q_c$). The remaining Zn was exhaustively stripped to the cut-off voltage with a capacity of $Q_s$. The average CE was calculated by the following equation:

$$CE = \frac{100*Q_c + Q_s}{100*Q_c + Q_T}$$

Figure 22A:
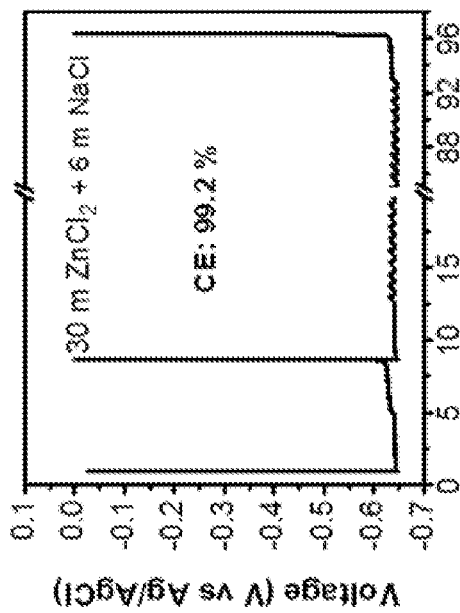
FIGS. 22A-22D show the Coulombic efficiency of Zn plating/stripping in a three-electrode cell including a titanium foil working electrode, zinc anode, and Ag/AgCl reference electrode with 30 m $ZnCl_2$/5 m LiCl, 30 m $ZnCl_2$/6 m NaCl, 30 m $ZnCl_2$/6 m KCl, and 30 m $ZnCl_2$/6 m $NH_4Cl$ hybrid WiSEs, respectively.
Figure 22B:
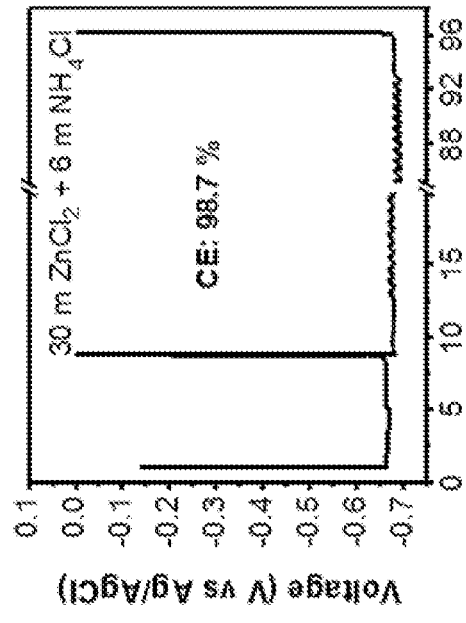
Figure 22C:
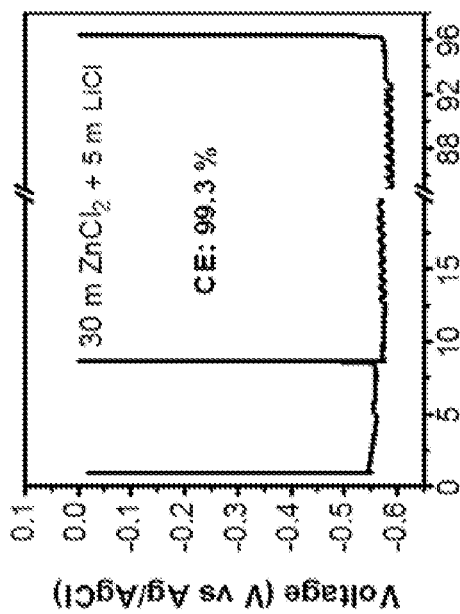
Figure 22D:
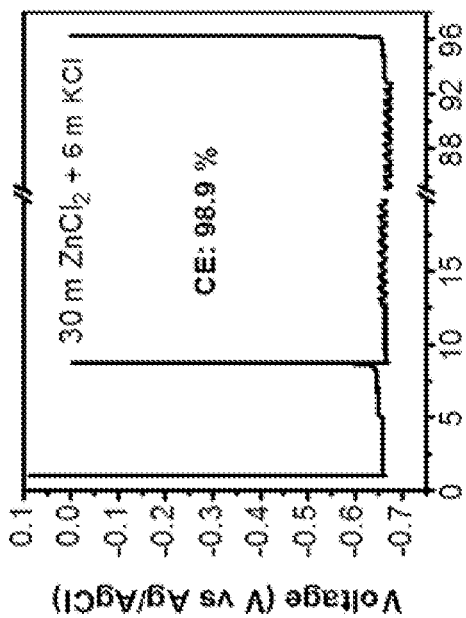
Figure 23E:
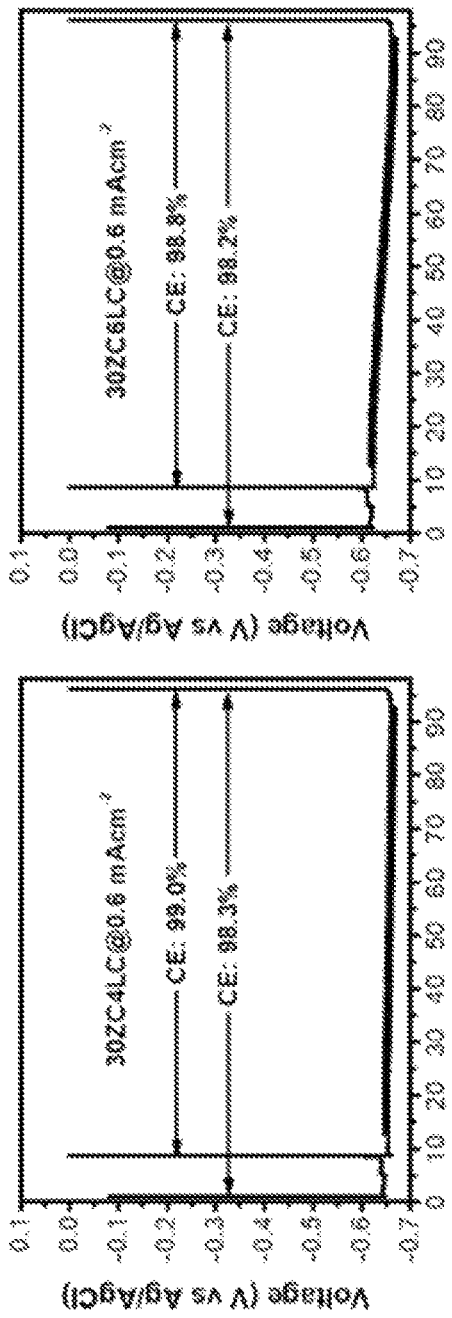
Figure 23F:
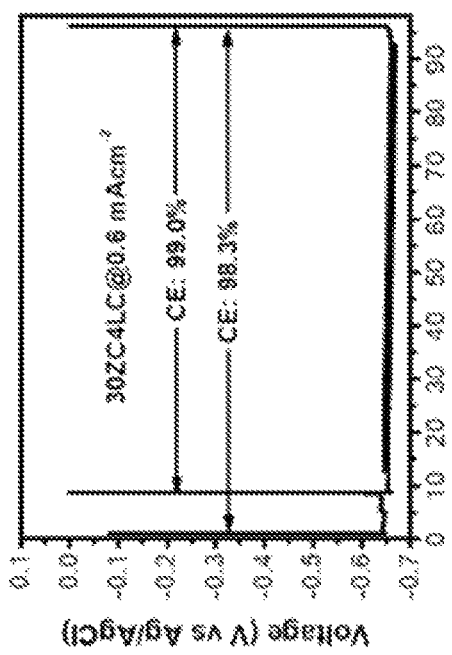
Figure 23G:
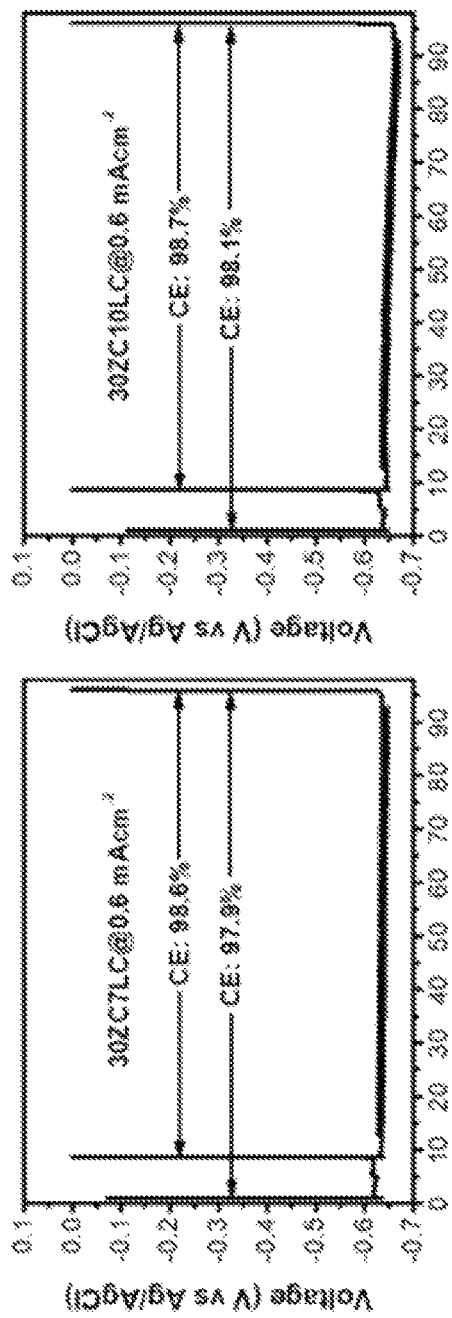
Figure 23H:
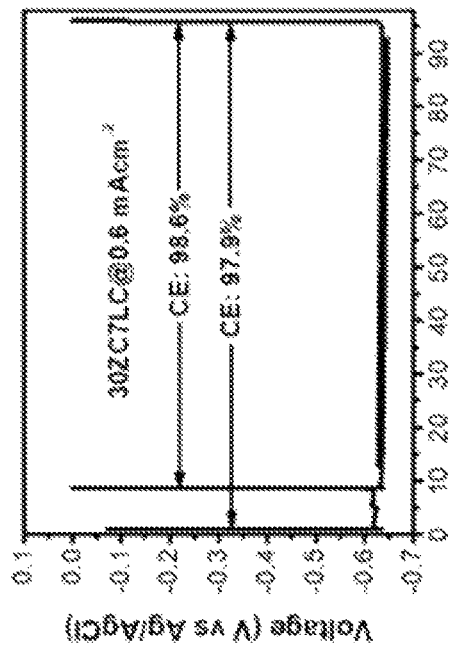

The results are shown in FIGS. 22A-22D. The 30 m ZnCl$_2$+5 m LiCl (FIG. 22A) provided the highest Coulombic efficiency of 99.3% for Zn plating/stripping, followed by the mixture of 30 m ZnCl$_2$+6 m NaCl with a CE of 99.2% (FIG. 22B), 30 m ZnCl$_2$+6 m KCl with a CE of 98.9% (FIG. 22C), and ZnCl$_2$+6 m NH$_4$Cl with a CE of 98.7% (FIG. 22D). For the four water-in-salt electrolytes, the Coulombic efficiency increased with decreasing size of the alkali metal ions, which are 0.76 Å, 1.02 Å, 1.38 Å and 1.48 Å in radius for Li$^+$, Na$^+$, K$^+$, and NH$_4^+$ respectively. It is known that the smaller the size of these alkali metal ions, the higher their charge densities. Without wishing to be bound by a particular theory of operation, the high charge density enables alkali metal ions to bond with water molecules tightly, which leads to fewer water molecules to coordinate with Zn$^{2+}$ ions. Therefore, the hydration shell for Zn$^{2+}$ is incomplete, which suppresses the hydrolysis of Zn$^{2+}$. As a result, the high CE can be obtained.

Example 5

Effect of LiCl on Plating Reversibility in Hybrid WiSEs

The average CE for Zn plating/stripping was investigated by galvanostatic charge/discharge (GCD) measurements in asymmetrical Ti‖Zn cells with Ag/AgCl with a saturated KCl solution as the reference electrode. The CE measurements for ZMA followed the reported method by Zhang et al. (*Adv. energy Mater.* 2018, 8:1702097), which has been widely applied for the Li-metal anode. Ti‖Zn cells with electrolytes including 30 m ZnCl$_2$ and varying amounts of LiCl were evaluated at 0.6 mA/cm$^2$ with a one-hour sweep duration. The electrolytes are designated as xZCyLC where xZC refers to the molality of ZnCl$_2$, e.g., 30ZC=30 m ZnCl$_2$, and yLC refers to the molality of LiCl, e.g., 5LC=5 m LiCl. The results are shown in FIGS. 23A-23H. The plating/stripping process of the zinc metal anode (ZMA) in the $ZnCl_2$—LiCl mixture electrolytes showed much higher CE than that in the pure 30 m $ZnCl_2$ electrolyte, which suggests that the presence of LiCl, indeed, helps suppress the $H_2$ evolution. Interestingly, the CE of Zn plating/stripping in $ZnCl_2$—LiCl hybrid WiSE increased first and then slightly decreased upon increasing the LiCl concentration. The value of CE reached a maximum of 99.3% when adding 5 m LiCl into the 30 m $ZnCl_2$ electrolyte (30ZC5LC), which was much higher than that (94.5%) in 30 m $ZnCl_2$ electrolyte.

Figure 24A:
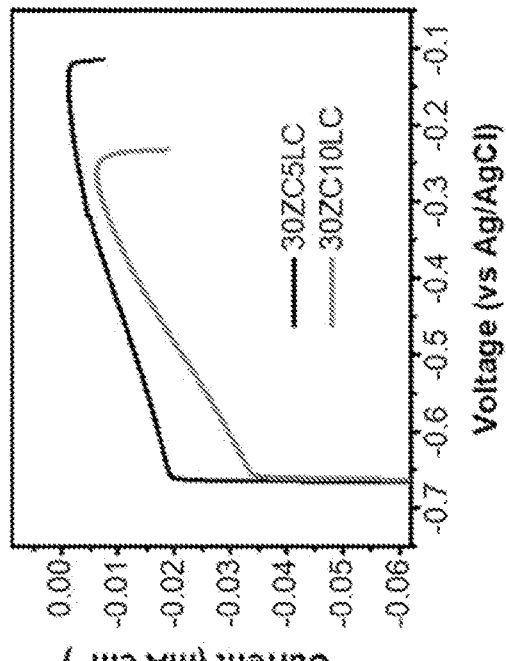
FIGS. 24A and 24B show linear sweep voltammetry profiles at 0.1 mV/s and 1.5 mV/s, respectively, of a Ti current collector in 30 m $ZnCl_2$ electrolytes including 0.5 m or 10 m LiCl.
Figure 24B:
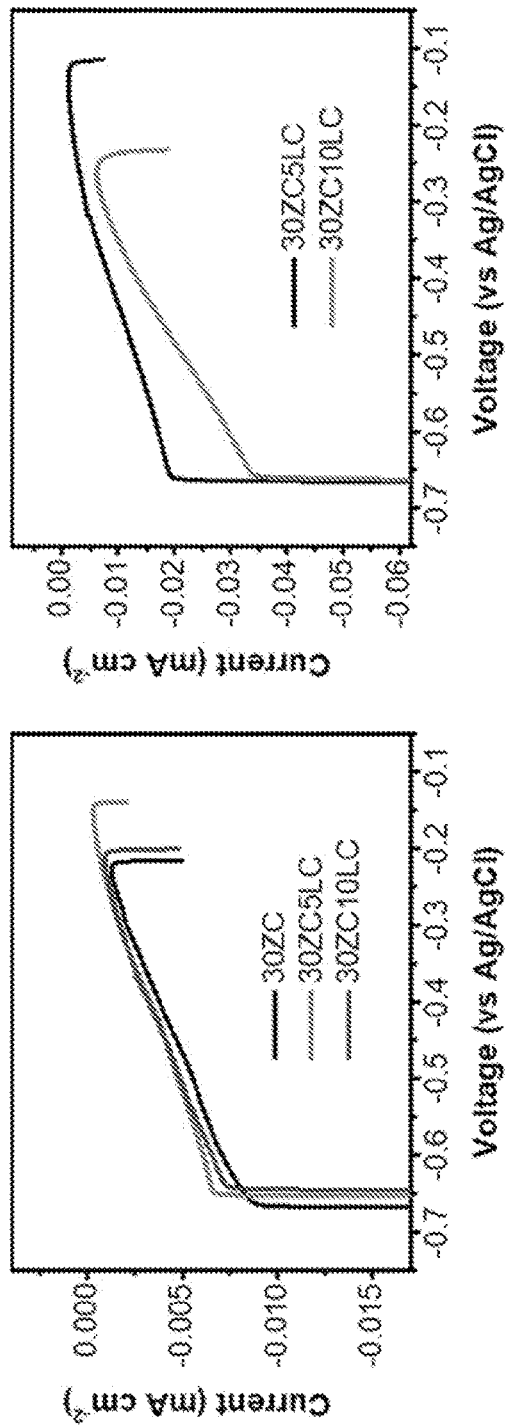
Figure 25:
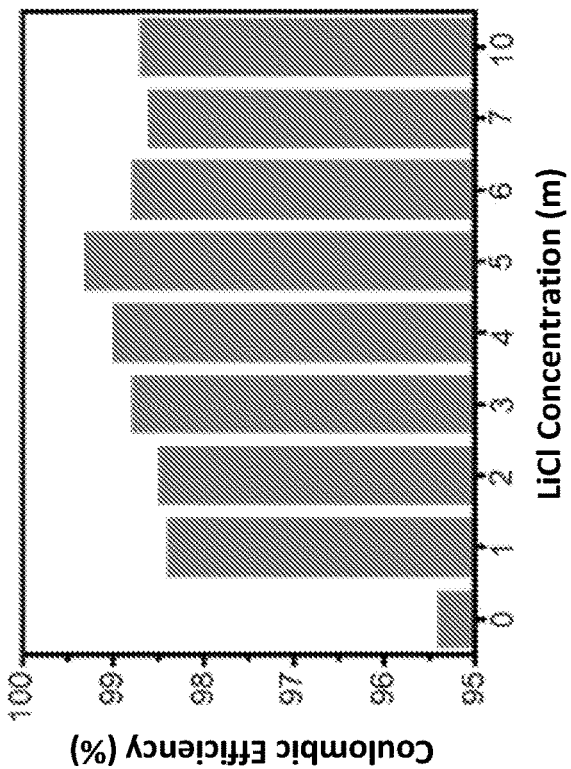
FIG. 25 is a graph showing Coulombic efficiency of Zn plating/stripping at 0.6 mA cm$^{-2}$ on a Ti current collector in $ZnCl_2$—LiCl hybrid WiSEs with different LiCl concentrations.

To examine the effect of the addition of LiCl on the H2 evolution, the linear sweep voltammetry measurements were conducted on a Ti current collector in the different electrolytes. The higher current response before the plating of Zn in 30 ZC than in 30ZC/LiCl mixture demonstrates the depressed $H_2$ evolution (FIG. 24A). At the scan rate of 0.1 mV $s^{-1}$, the difference in the current responses on the Ti current collector in 30ZC5LC and 30ZC10LC WiSEs were negligible, but became more apparent when increasing the scan rate to 1.5 mV $^{-1}$. Therefore, the decreased reversibility from 5 m to 10 m LiCl in the hybrid WiSEs (FIG. 25) can be ascribed to the decreased conductivity of $Zn^{2+}$.

It was discovered that the applied current density affects the CE of the Zn anode as shown in FIGS. 26A-26D. The CE increased from 93.4% to 100.3% with the current density increasing from 0.1 to 1 mA $cm^{-2}$. This phenomenon indicates that kinetics of hydrogen evolution reaction (HER) in these WiSEs become relatively more significant compared to Zn plating-stripping at low current densities.

Figure 26A:
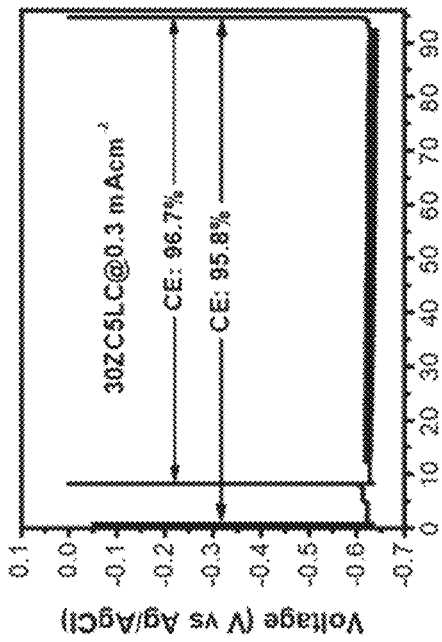
FIGS. 26A-26D show the GCD curves for Coulombic efficiency measurements in 30 m $ZnCl_2$/5 m LiCl at different current densities.
Figure 26B:
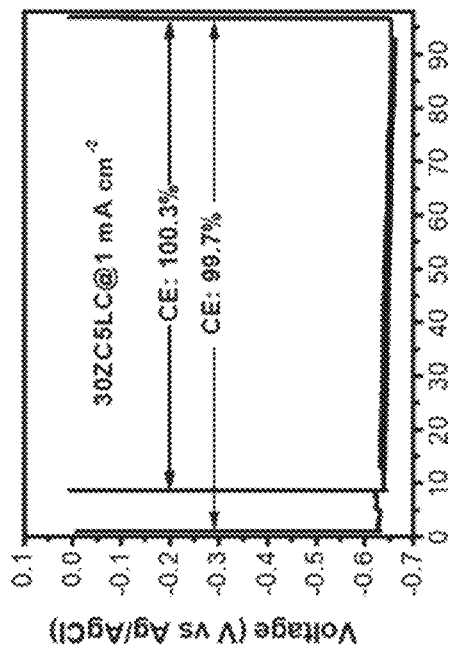
Figure 26C:
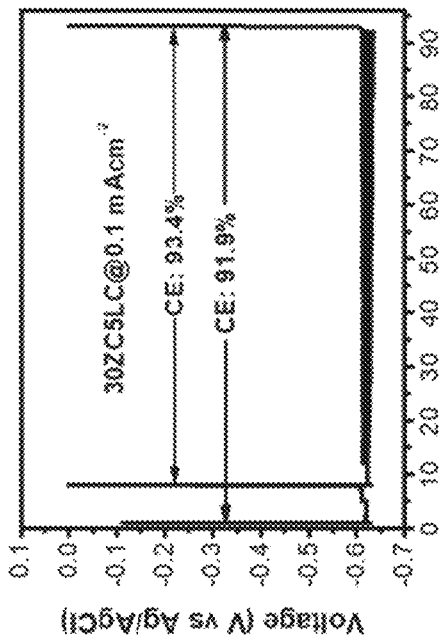
Figure 26D:
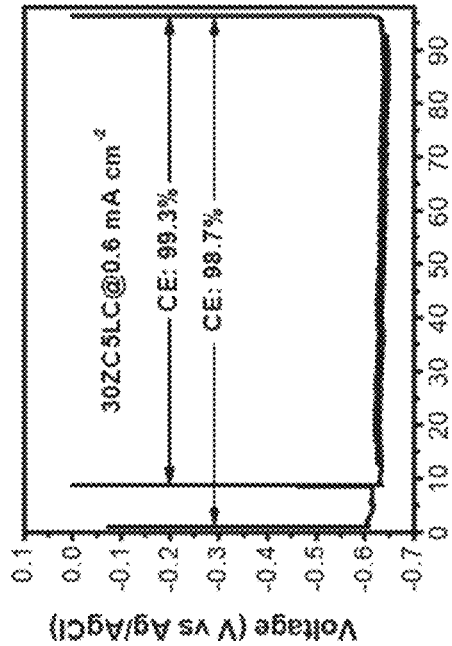

In some studies of metal anodes, the initial cycle(s) with low reversibility of plating/stripping is not taken into account when calculating CE, where this cycle is considered as a "cleaning" process. However, such cleaning cycles might leave some stranded metal anode mass that is unstripped in the initial cycle, but gradually extracted in later cycles, which would leave the CE of metal-anode overestimated. In FIG. 26D, the CE more than 100% at 1 mA $cm^{-2}$ is perhaps an example of such a scenario. However, this CE around 100% demonstrates that 30ZC5LC has pushed the reversibility of ZMA to the limits at this current rate. By having the first cleaning cycle with a CE of 93.2% in the calculation, the average CE of ZMA still reached an ultra-high value of 99.7% at 1 mA $cm^{-2}$ in 30ZC5LC, which is the highest CE. As the state-of-the-art ZMA performance, the CE measured in the hybrid WiSE of 21 m LiTFSI/1 m $Zn(TFSI)_2$ is less than 75% in the first cycle, which quickly rises to 99.2% in the second cycle. In the following cycles, it was stabilized to 99.7%. The ZMA's reversibility in 30ZC5LC is also superior to that (99%) in the ionic liquid electrolytes with the formation of a solid-state interphase on the surface of Zn anode (Liu et al., Angew. Chem. Int. Ed. 2016, 55:2889-2893). Table 1 below compares the reversibility of the Zn anode in various electrolytes.

TABLE 1

| Electrolyte | Current Density (mA $cm^{-2}$) | Areal Capacity (mAh $cm^{-2}$) | Coulombic Efficiency | Reference |
|---|---|---|---|---|
| 30 m $ZnCl_2$ + 5 m LiCl aqueous | 1 | 4 | 99.7% | this work |
| 30 m $ZnCl_2$ aqueous | 1 | 4 | 97.2% (95.4%)$^a$ | this work; 1 |
| 20 m LiTFSI + 1 m $Zn(TFSI)_2$ aqueous | 1 | 0.17 | 99.7% | 2 |
| 2M $ZnSO_4$ aqueous$^b$ | 0.4 | 0.4 | 95.12% | 3 |
| 2M $ZnSO_4$ + 1M LiCl + 0.14 wt % thiourea aqueous$^c$ | 1.5 | 0.375 | 68.65 | 4 |
| 2M $ZnSO_4$ + 0.1M $MnSO_4$ aqueous | 1 | 1 | ~90% | 5 |
| 23.6 m $ZnCl_2$ aqueous | — | 1 | 98.7% | 6 |
| 2M $ZnSO_4$ aqueous | 1 | 1 | 98.4% | 7 |
| 0.5M $Zn(CF_3SO_3)_2$ aqueous | 0.5 | 0.5 | 79.62% | 8 |
| 0.5M $Zn(CF_3SO_3)_2$ in $H_2O$/triethyl phosphate | 0.5 | 0.5 | 93.71% | 8 |
| 0.5M $Zn(CF_3SO_3)_2$ in triethyl phosphate (organic) | 0.5 | 0.5 | 99.68% | 8 |
| 0.1M $Zn(CF_3SO_3)_2$ + 0.015M $Ni(CF_3SO_3)_2$ in 1-butyl-1-methylpyrrolidinium trifluoromethylsulfonate (ionic liquid) | 0.2 | 0.2 | 99% | 9 |

$^a$The higher Coulombic efficiency for Zn plating/stripping in this work (97.2%) than that in previous work (95.4%) is attributed to the higher purity of $ZnCl_2$ used in this work.
$^b$The Ti foil current collector was coated by a polyamide layer.
$^c$A rotating disk electrode was employed as the working electrode with a controlled rotating speed of 150 rpm.

1. Zhang et al., Chem. Commun. 2018, 54:14097-14099. 2. Wang et al., Nat. Mater. 2018, 17:543-549. 3. Zhao et al., Energy Environ Sci. 2019, 12:1938-1949. 4. Wu et al., J. Power Sources 2015, 300:453-459. 5. Huang et al., Nat. Commun. 2018, 9:2906. 6. Chen et al., Adv. Energy Mater. 2019, 9:1900196. 7. Wang et al., Joule 2019, 3:1-12. 8. Naveed et al., Angew. Chem. Int. Ed. 2019, 58:2760-2764. 9. Liu et al., Angew. Chem. Int. Ed. 2016, 55:2889-2893.

Example 6

Atomic Structure of $ZnCl_2$—LiCl WiSE

To understand the effect of the addition of LiCl on the reversibility of Zn anode, the emergent femtosecond stimulated Raman spectroscopy (FSRS) and Fourier transform infrared spectra (FTIR) as well as pair distribution function (PDF) studies associated with neutron total scattering were utilized to analyze the atomic structures of the $ZnCl_2$—LiCl WiSE. FSRS reveals the chemical bonds in $ZnCl_2$ WiSEs by studying the interactions around the $Zn^{2+}$ ions and the O—H stretch vibration of water from the low-frequency region and high-frequency region, respectively. FIGS. 27-28 show peaks located at around 380, 337, 293, and 240 $cm^{-2}$ in low-frequency-region stimulated Raman (ground state FSRS) spectra, which are attributed to the Zn—O vibrations in $[Zn(OH_2)_6]^{2+}$, Zn—Cl vibrations in $[ZnCl_3]^-$, $[ZnCl_4]^{2-}$, and polynuclear aggregates of $[ZnCl_4]^{2-}$ bridged by Cl atoms, respectively. By increasing the LiCl concentration, the peak intensities of Zn—O in $[Zn(OH_2)_6]^{2+}$ and Zn—Cl vibrations in $[ZnCl_3]^-$ decreased whereas the intensity of Zn—Cl vibrations in the $[ZnCl_4]^{2-}$ aggregates increased. Therefore, LiCl in the WiSE plays dual roles, where on one hand Li-ions compete against $Zn^{2+}$ to solicit $H_2O$ as ligands, and on the other hand the additional chloride ions from LiCl further shield $Zn^{2+}$ from water molecules. As a result, the interaction between Zn and water was effectively weakened by the addition of LiCl; thus increasing the reversibility of Zn anode.

Figure 29:
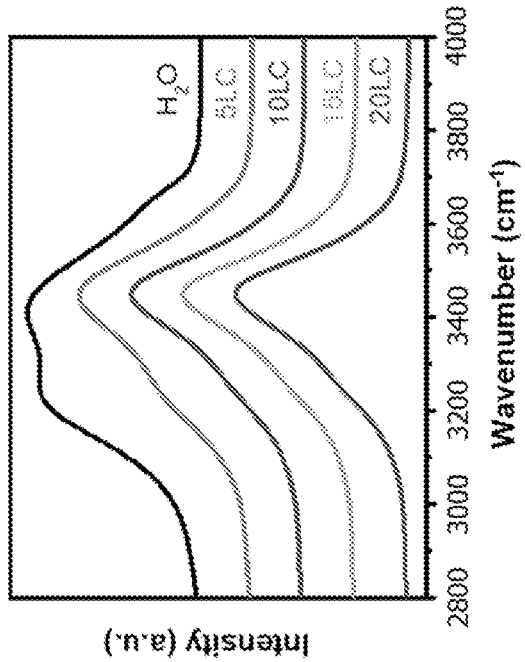
FIG. 29 shows FSRS spectra of $ZnCl_2$/LiCl WiSEs and pure water in the high-frequency region.
Figure 30:
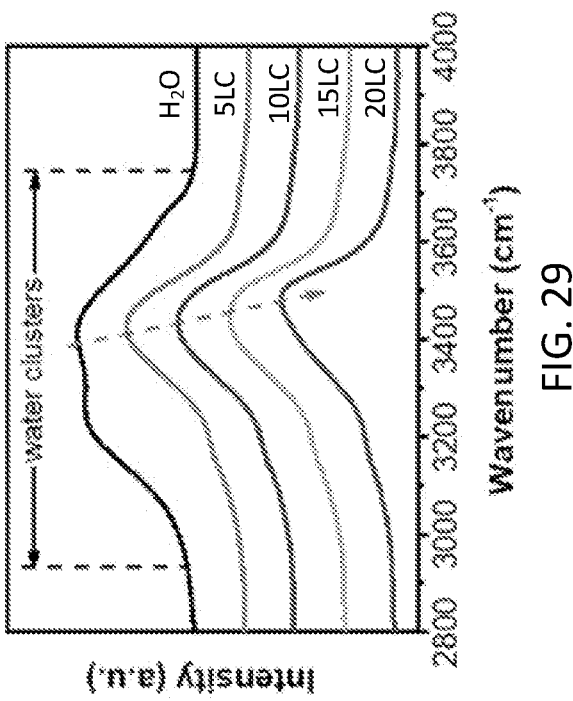
FIG. 30 shows FSRS spectra of LiCl aqueous solutions in the high-frequency region.

FIG. 29 shows stimulated Raman spectra for the $ZnCl_2$-based WiSEs and pure water in the high-frequency region. For pure water, the water network consists of mainly two O—H environments, more H-bonded and less H-bonded, attributed to the O—H stretch vibration at 3230 and 3420 $cm^{-1}$, respectively. Nevertheless, in the 30 m $ZnCl_2$ WiSE, the O—H stretch only exhibits a bluer peak at 3454 $cm^{-1}$ without the redder peak, indicating that the chemical environment of water molecules is homogenized in the presence of concentrated $ZnCl_2$, and very few water molecules can meet to form H-bonds. Counterintuitively, the O—H bond of water is apparently strengthened also in the presence of 30 m $ZnCl_2$, where it had been usually expected that the binding between a strong Lewis acid of $Zn^{2+}$ and the oxygen-end of water would weaken the O—H bond, thus causing the O—H vibration to red shift. Grimaud et al. measured FTIR for water vibrations and NMR shift of H in the LiTFSI-based WiSE, and attributed their similar observation of consolidated O—H bonds to the strong anion-proton interaction (*Energy Environ Sci* 2018, 11:3491-3499). Along this line, with the addition of LiCl co-salt, O—H stretch vibration further blue-shifts from 3454 $cm^{-1}$ of 30ZC to 3481 $cm^{-1}$ for 30ZC10LC electrolyte due to the increased concentration of anions, demonstrating the enhanced water stability. The influence of LiCl concentration on the O—H band in aqueous LiCl solution was also evaluated by FSRS, in which the O—H stretch vibration only slightly blue-shifts from 3447 to 3450 $cm^{-1}$ with increasing the concentration from 5 to 20 m (FIG. 30). The more obvious blue-shift for O—H stretch vibration in $ZnCl_2$/LiCl mixture solution than in pure LiCl solution may be attributed to fewer free water molecules in the hybrid electrolytes due to the ultrahigh concentration of $ZnCl_2$.

Figure 31:
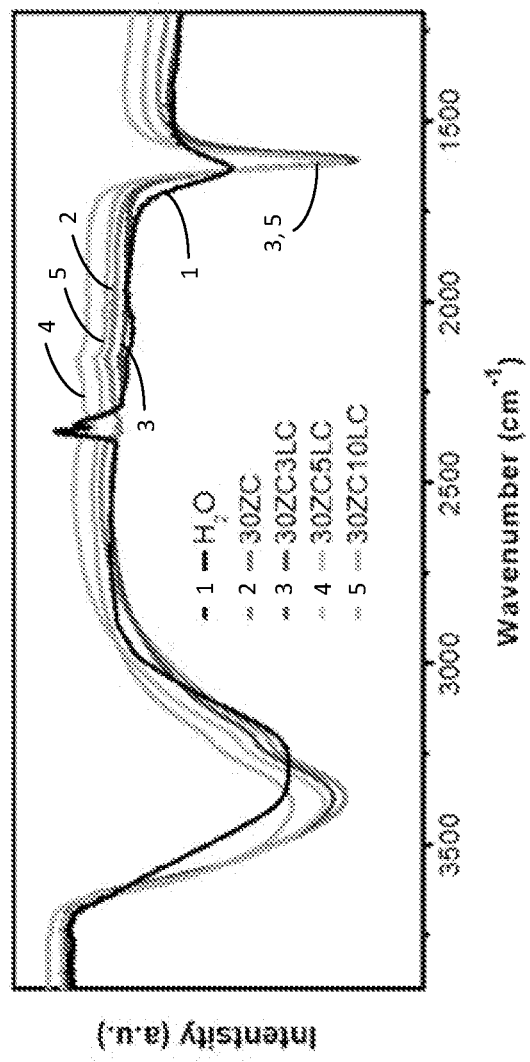
FIG. 31 shows Fourier transform infrared (FTIR) spectra of $ZnCl_2$/LiCl WiSEs.

FTIR spectra also reveal the influence of LiCl on the O—H bond in the mixed electrolytes (FIG. 31). A high concentration of $ZnCl_2$ in 30ZC solution changes the characteristic O—H stretch vibration from a broad band at 3242-3353 $cm^{-1}$ in pure water to a relatively sharp peak centered around 3375 $cm^{-1}$ in 30ZC. By adding LiCl, the O—H stretch vibration further blue-shifts with the concentration increase of LiCl, e.g., ~3393 $cm^{-1}$ in 30ZC10LC. Notably, the FSRS and FTIR results agree well and demonstrate enhancement of O—H bond by adding LiCl as the co-salt in this hybrid WiSE, also revealed in pure LiCl aqueous solution (FIG. 32).

Moreover, the PDF study also can be employed to reveal the interaction between different species in WiSEs. Pan et al. observed that the distance between water molecules increased with increasing the $LiNO_3$ concentration due to the interaction between $Li^+$ and water molecules, demonstrating the structure breaking effect on the hydrogen bond network (*Chem* 2018, 4:2872-2882). The PDF investigation associated with neutron total scattering was obtained to further confirm the diminishing interaction between $Zn^{2+}$ and water molecules. FIGS. 33A-33C show the PDF profiles for 30ZC, 30ZC1LC, 30ZC5LC and 30ZC10LC mixture electrolytes. The weak peak located around 2 Å in the PDF profiles represents the superposition of the distance between Zn and O (d(Zn—O)) and the distance between Li and O (d(Li—O)) in the mixture $ZnCl_2$/LiCl electrolytes. The addition of LiCl results in consecutive blue-shifts for this peak with increasing the LiCl concentration because of the further incomplete hydration-shell of $Zn^{2+}$. Moreover, the peak centered at 2.3 Å can be assigned to the distance between Zn and Cl ($d_{Zn-Cl}$). With the LiCl concentration increase, the peak of $d_{Zn-Cl}$ intensified at the expense of superposition of $d_{Zn-O}$ and $d_{Li-O}$, demonstrating the increased interaction between $Zn^{2+}$ and $Cl^-$ but mitigated interaction between $Zn^{2+}$ and water molecules. Therefore, the Raman spectra, FTIR and PDF results agree well with each other and demonstrate that the introduction of LiCl effectively weakens the interaction between $Zn^{2+}$ and water and enhances the water stability. As a result, the HER was suppressed during the plating process, which are responsible for the enhanced reversibility of Zn anode in $ZnCl_2$/LiCl mixture electrolytes.

Figure 36A:
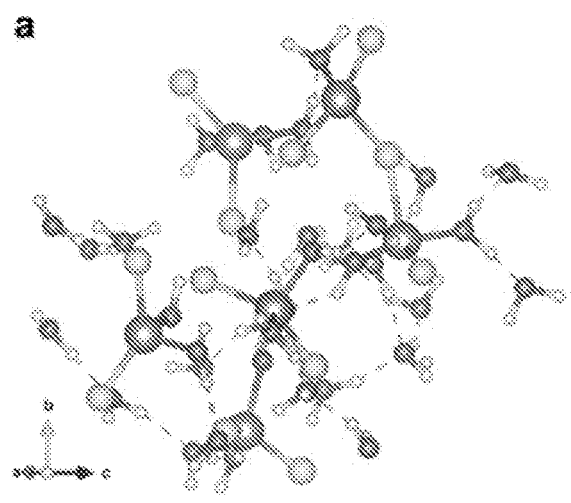
FIGS. 36A and 36B show the simulated structure of 10 m $ZnCl_2$ (35A) and 30 m $ZnCl_2$ (35B) after 20 ps.
Figure 36B:
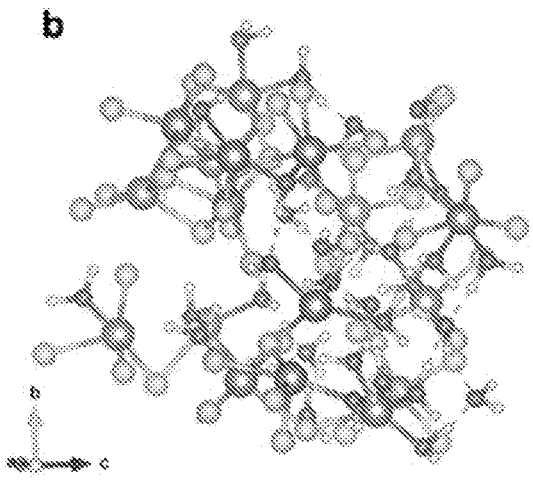
Figure 37:
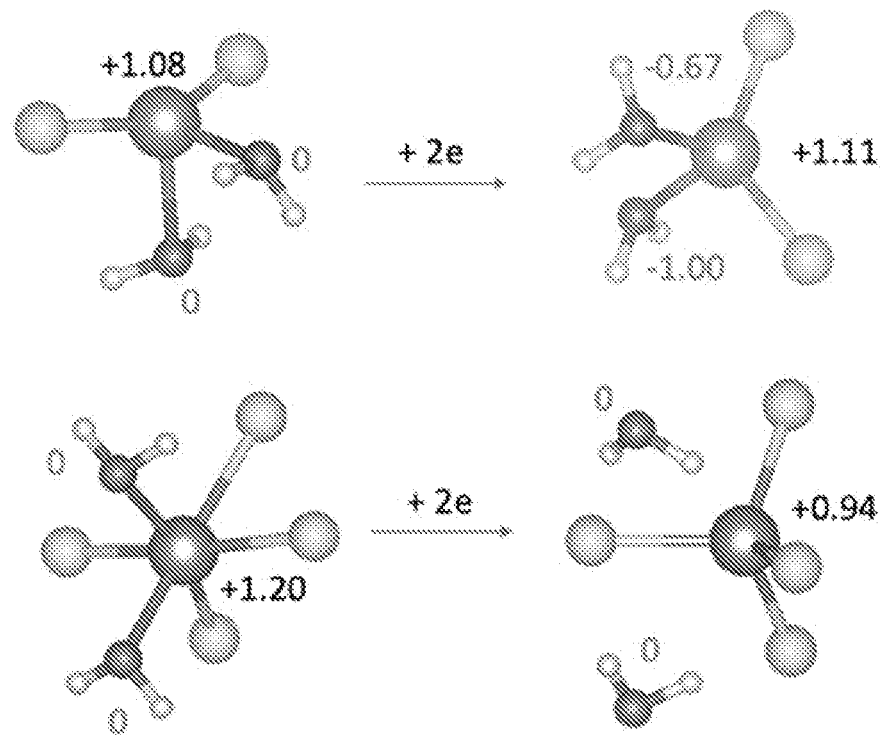
FIG. 37 shows the Bader charge analysis before adding 2 extra electrons to $ZnCl_2(H_2O)_2$ (upper panel) and after adding 2 extra electrons to give $ZnCl_4(H_2O)_2$ (lower panel).

Ab initio molecular dynamics (MD) simulation was conducted to understand the influence of LiCl addition into the 30 m $ZnCl_2$ WiSE in the atomistic scale. The baseline was set by relaxing the geometry of 30ZC for 20 ps with a time step of 1 fs. As shown in FIG. 34A, it exhibited an octahedral Zn complex configuration with $H_2O$ and Cl, where it connects with the neighboring Zn by sharing Cl in between, thus forming polynuclear aggregates. Free water molecules acted as a part of a ligand to form various Zn-complex, from $[ZnCl(H_2O)_5]^+$ to $[ZnCl_5(H_2O)]^{3-}$, and similar agglomerates were also observed when LiCl salts were added to the 30ZC (FIGS. 34B, 34C). In order to understand the root cause of CE disparity between a single and bi-salts, the arrangement of waters in different salt concentrations by purposely removing Cl was compared (FIGS. 35A-35C). Initially, 30 unbound water molecules were employed to the simulation box and it was observed that hydrogen bonds between waters, regardless of free- and ligand-, decreased from 20 for 30ZC to 14 for 30ZC10LC and 7 free waters resided in 30ZC while that of 4 and 3 found in 30ZC5LC and 30ZC10LC, respectively. This clearly corroborates that mixture systems show higher CE than a single-salt 30ZC electrolyte by allowing fewer free waters in a system, which can be translated into the smaller chance of HER at the anode surface. The conventional salt-in-water system (10ZC) was studied in the same fashion (FIGS. 36A, 36B). Interestingly, the majority of Zn ions were forming $ZnCl_2$ $(H_2O)_2$ tetrahedral structures with 19 free waters floating inside a virtual box in 10 m $ZnCl_2$ (36A), while 7 waters were free in 30 m $ZnCl_2$ (36B). Apparently, salt concentration was not high enough to prohibit the universal action of waters where electrochemical stability window may fall into the 1.23 V range. That being said, two extra electrons were added to the system and Bader charge analysis (BCA) was conducted to illuminate how 30ZC outperforms 10ZC in terms of protecting waters. FIG. 37 shows the Bader charge analysis before adding two extra electrons to $ZnCl_2(H_2O)_2$ (upper panel) and after adding two extra electrons to give $ZnCl_4(H_2O)_2$ (lower panel). For tetrahedral Zn complex, waters were reduced by extra electrons while the octahedral complex shared electrons with Zn and Cl only. Not only the higher chance of free water touches the anode surface to be reduced in the 10ZC but it was also observed that the Zn-tetrahedral species transfers electrons to the binding waters that would cause the water reduction. In a sharp contrast, the 30ZC octahedral model displayed that waters remained neutral, which clearly reflects the reason of higher CE of 30ZC and widened water stability window (Zhang et al., Chem. Commun 2018, 54:14097-14099).

When LiCl was added to the 30ZC, it was observed that the Zn complex contains relatively less hydration shells in the 30ZC5LC due to the interaction between Li and water molecules. Apparently, Li in 30ZC5LC addition preferentially binds with 8 waters (Li:$H_2O$=1:2.67) in total while 30ZC10LC captures 15 waters, which corresponds to the Li and $H_2O$ ratio (1:1.5) slightly higher than a half of 30ZC5LC ratio. As a result, the hydration shells of $Zn^{2+}$-containing species have a further incomplete hydration shell by adding the co-salt of LiCl, depressing the $H_2$ evolution (Wang et al., Nat. Mater. 2018, 17:543-549).

Figure 38B:
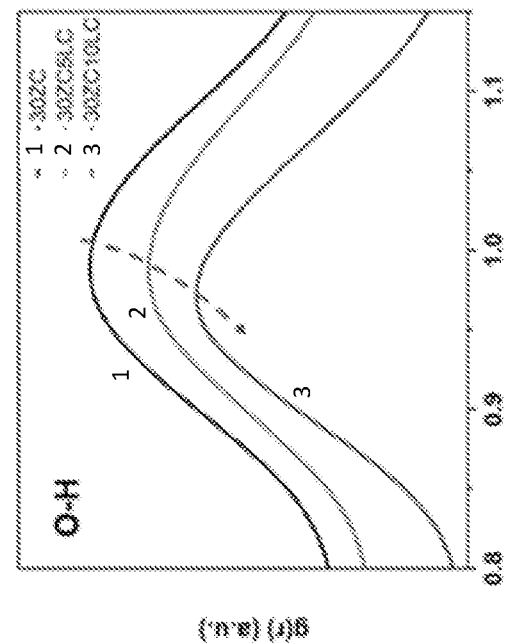
FIGS. 38A and 38B show charge density difference plots of extracted $ZnCl_4(H_2O)_2$ (38A) and $LiCl_4(H_2O)_2$ (38B) when 10 electrons were introduced.
Figure 38A:
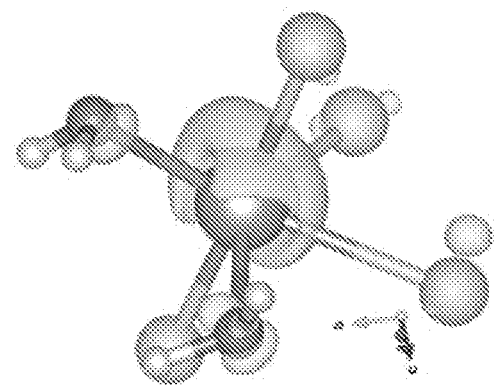

The charge density difference was also mapped after adding 10 electrons to the entire 30ZC5LC model and extracted representative Zn and Li octahedral complex (FIGS. 38A and 38B. respectively). The isosurface was set to 0.005 eV/Å. Yellow isosurfaces represent the electron accumulated regions compared to the pristine state. Thus, it is evident that extra electrons are concentrated to Zn where ligand is Cl, but it is empty when water is a ligand, where electrons rather migrate to oxygen. In addition, Li accepts significantly fewer electrons with no isosurface and the ligand water is not taking as many electrons as Zn, meaning that waters binding with Li can be protected from reduction, which is parallel to the enhanced CE test result upon LiCl addition.

Figure 40:
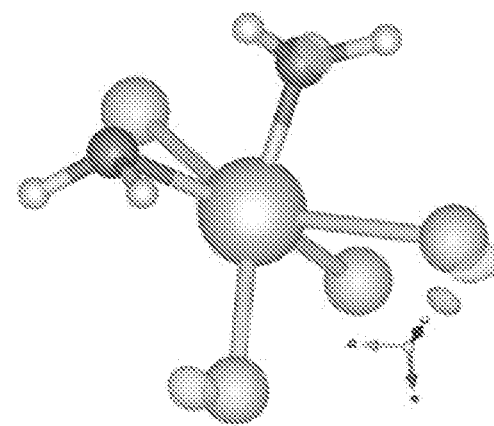
FIG. 40 is an RDF plot of O—H in 30 m $ZnCl_2$, 30 m $ZnCl_2$/5 m LiCl, and 30 m $ZnCl_2$/10 m LiCl. The arrow indicates a shift of the strongest peak.
Figure 39:
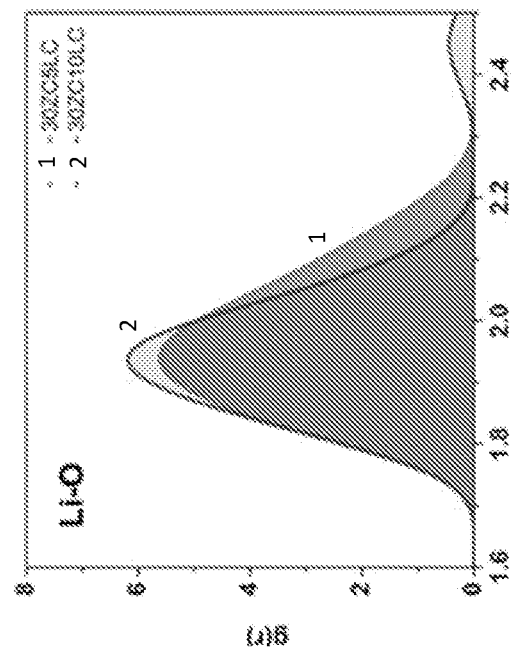
FIG. 39 is a radial distribution function (RDF) plot of Li—O in 330 m $ZnCl_2$/5 m LiCl and 30 m $ZnCl_2$/10 m LiCl.
Figure 41:
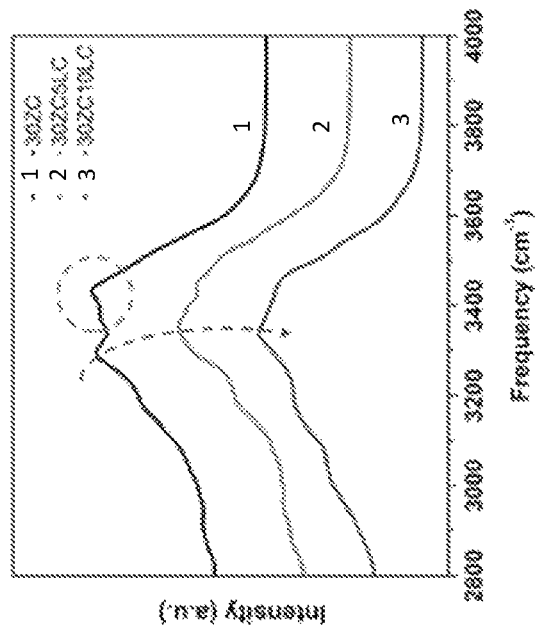
FIG. 41 shows computed O—H frequency spectra based on collected bond length data for 60 O—H pairs in 30 m $ZnCl_2$, 30 m $ZnCl_2$/5 m LiCl, and 30 m $ZnCl_2$/10 m LiCl. The arrow indicates a shift of the strongest peak; the circle represents a weakened water vibration mode.

Radial distribution function (RDF) plots were generated to quantitatively compare the chemical environment of water and neighbors. Li—O RDF (FIG. 39) clearly shows that Li atoms are binding with most of waters in a distance range from 1.7 Å to 2.2 Å for both concentrations. For O—H RDF (FIG. 40; the arrow indicates a shift of the strongest peak), however, it is observed that the O—H bond length at the highest peak slightly decreased from 0.99 Å to 0.96 Å upon LiCl addition as indicated by the arrow, which implies surrounding water environment is changed. To further dig into the discovered phenomenon, the O—H stretch frequency was calculated by collecting bond length of 60 O—H pairs inside the simulation box from the last 5 ps trajectories, followed by transforming them to the frequencies (FIG. 41; the arrow indicates a shift of the strongest peak; the circle represents a weakened water vibration mode.). The strongest peak of 30ZC corresponds to 3300 $cm^{-1}$, which is close to the FSRS, as well as the strongest peak slightly shifts to the higher frequency of 3360 $cm^{-1}$ as 5 m LiCl and 10 m LiCl is added respectively. This trend corroborates the FSRS data that blue shift reveals the influence of LiCl on the 30ZC by having a different environment of water, especially adjusted O—H bond length.

Figure 42:
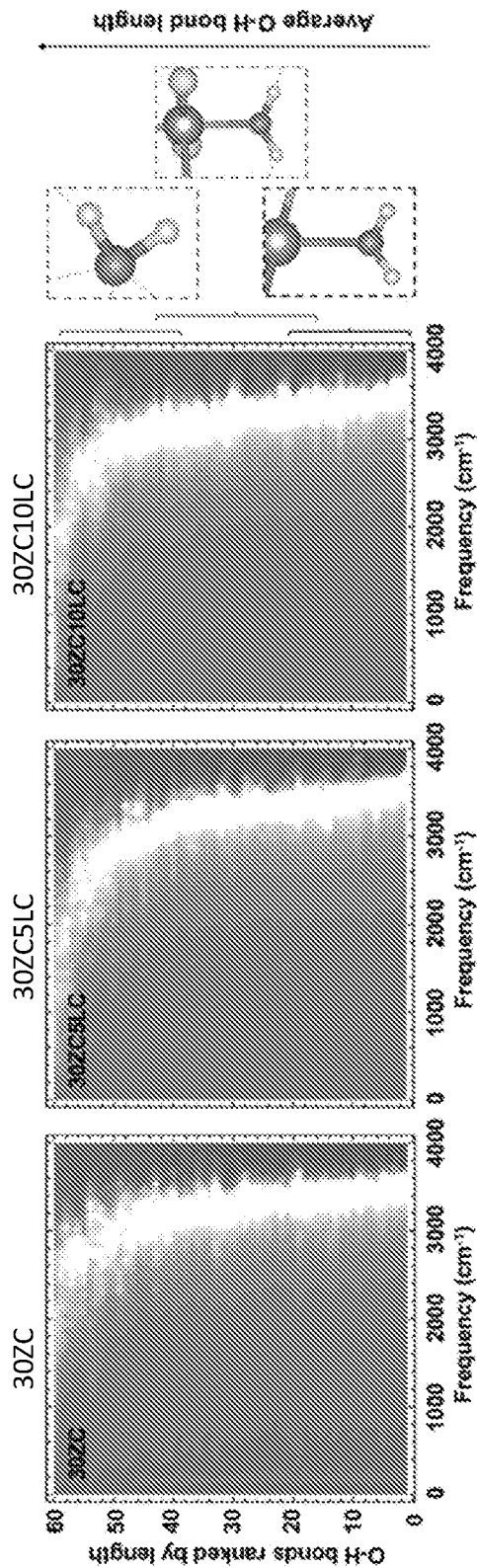
FIG. 42 shows frequency spectra maps for 30 m $ZnCl_2$, 30 m $ZnCl_2$/5 m LiCl, and 30 m $ZnCl_2$/10 m LiCl where 30 water molecules are ranked by the length in ascending order and corresponding frequency is indicated as the white area.

To elucidate the aforementioned environment, frequency maps were generated for different salt concentrations (FIG. 42). As 30 waters were simulated in all cases, 60 O—H bond lengths were ranked in ascending order and each of them was transformed into the stretching frequency, displaying redder shift as bond length increases (upwards). Subsequently, the frequency spectra were matched with manually measured O—H bond length in order to classify the water environment into three categories as shown in the right panel of FIG. 42. The shortest O—H bonds are recognized as water bound on Zn/Li center without any hydrogen bond around (black box) and hydrogen bond makes the bond length slightly longer, which lowers the frequency (red box). Lastly, the lowest frequency stems from the O—H of free waters with hydrogen bonds (blue box) that pulls the bonds out to all directions. This implies that few free waters and few hydrogen bonds are the descriptive factors to understand the correlations between FSRS spectra and water environment in atomistic scale and this inability of water by breaking the hydration shell directly influences the electrochemical performance, especially Zn plating/stripping.

Example 7

Zn Anode Stability in WISE and Hybrid WiSEs

For zinc metal anodes (ZMA), cycling stability has remained a challenge in aqueous electrolytes. The use of 3D current collectors or Zn-powder anode lowers local current density, which decreases the operation overpotential of ZMA and promotes cycling stability; however, the larger surface area renders ZMA more reactive to water, which results in a lower CE. Thus, this approach is limited by a tradeoff between reversibility and cycling stability. Moreover, the areal capacity of cathodes in practical application is in the range from 2 to 4 mAh $cm^{-2}$, as thus the areal capacity for metal-anode should be at the same level. However, the high areal capacity accelerates the formation of dendrites shortening the cycling life of ZMB, especially when cycling at high current density. In most previous studies on the stability of ZMA in symmetrical cells with aqueous electrolytes, the reported areal capacity (≤1 mAh $cm^{-2}$) and the cycling time cannot meet the demand of practical application (Table 2).

TABLE 2

| Electrolytes | Current density (mA $cm^{-2}$) | Areal capacity (mAh $cm^{-2}$) | Cycling time (hours) | Over potential (mV) | Ref. |
|---|---|---|---|---|---|
| 30 m $ZnCl_2$ + 5 m LiCl | 2 | 4 | 4000 | 19 | This work |
| 30 m $ZnCl_2$ | 0.2 | 0.03 | 700 | 12 | 1 |
| 20 m LiTFSI + 1 m Zn(TFSI)$_2$ | 0.2 | 0.03 | 170 | 150 | 2 |
| 2M $ZnSO_4$ [a] | 0.5 | 0.25 | 8000 | ~120 | 3[3] |
| 23.6 m $ZnCl_2$ | 2 | 1 | 1000 | ~25 in average | 4 |

TABLE 2-continued

| Electrolytes | Current density (mA cm$^{-2}$) | Areal capacity (mAh cm$^{-2}$) | Cycling time (hours) | Over potential (mV) | Ref. |
|---|---|---|---|---|---|
| 2M ZnSO$_4$ | 1 | 1 | 50 | ~30 | 5 |
| 0.5M Zn(CF$_3$SO$_3$)$_2$ | 0.5 | 0.5 | 25 | 50 | 6 |
| 0.5M Zn(CF$_3$SO$_3$)$_2$ in the mixture of H$_2$O and triethyl phosphate | 0.5 | 0.5 | 1000 | ~150 | 6 |
| 0.5M Zn(CF$_3$SO$_3$)$_2$ in triethyl phosphate (organic electrolyte) | 1 | 1 | 220 | 200 | 6 |
| 3M Zn(CF$_3$SO$_3$)$_2$ | 0.1 | 0.1 | 800 | ~50 | 7 |
| 1M KOH | 0.1 | 0.1 | ~28 | 2000 | 7 |
| 3M Zn(CF$_3$SO$_3$)$_2$ [b] | 0.05 | 0.1 | 800 | 25-50 | 8 |
| 3M ZnSO$_4$ + 0.1M MnSO$_4$ [c] | 2 | 0.1 | 80 | 100 | 9 |
| 8M NaClO$_4$ + 0.4M Zn(CF$_3$SO$_3$)$_2$ | 2.5 | 1 | 25 | ~70 | 10 |
| 8M NaClO$_4$ + 0.4M Zn(CF$_3$SO$_3$)$_2$ [d] | 2.5 | 1 | 250 | ~25 | 10 |
| 2M ZnSO$_4$ + 0.2M CoSO$_4$ | 0.2 | 0.2 | 280 | — | 11 |
| 2M ZnSO$_4$ + 0.1M MnSO$_4$ [e] | 1 | 1 | 160 | 25 | 12 |
| 2M ZnSO$_4$ [f] | 0.5 | 0.25 | 350 | 25 | 13 |
| 2M ZnSO$_4$ [g] | 0.5 | 0.5 | 350 | 20-40 | 14 |

[a] The current collector (Ti foil) was coated by a polyamide layer.
[b] Nafion™ polymer (Chemours) was employed as the separator.
[c] Zn foil was coated by a nano-CaCO$_3$ layer.
[d] Zn foil was coated by a graphite layer.
[e] 3D zinc@carbon fiber composite was employed as the Zn electrode.
[f] Cross-linked polyacrylonitrile-based cation exchange membrane was employed as the separator.
[g] 3D porous copper skeleton supported zinc metal was employed as the electrode 1. Zhang et al., *Chem. Commun.* 2018, 54:14097-14099. 2. Wang et al., *Nat. Mater.* 2018, 17:543-549. 3. Zhao et al., *Energy Environ Sci.* 2019, 12:1938-1949. 4. Chen et al., *Adv. Energy Mater.* 2019, 9:1900196. 5. Wang et al., *Joule* 2019, 3:1-12. 6. Naveed et al., *Angew. Chem. Int. Ed.* 2019, 58:2760-2764. 7. Zhang et al., *J Am. Chem. Soc.* 2016, 138:12894-12901. 8. Zhao et al., *Sci. Adv.* 2018, 4:eaao1761. 9. Kang et al., *Adv. Energy Mater.* 2018, 8:18101090. 10. Li et al., *ACS Appl. Mater. Interfaces* 2018, 10:22059-22066. 11. Ma et al., *Energy Environ. Sci.* 2018, 11:2521-2530. 12. Dong et al., *RSC Advances* 2018, 8:19157-19163. 13. Lee et al., *ACS Appl. Mater. Interfaces* 2018, 10:38928-38935. 14. Kang et al., *ACS Sustainable Chem. Eng.* 2019, 7:3364-3371.

Figure 43A:
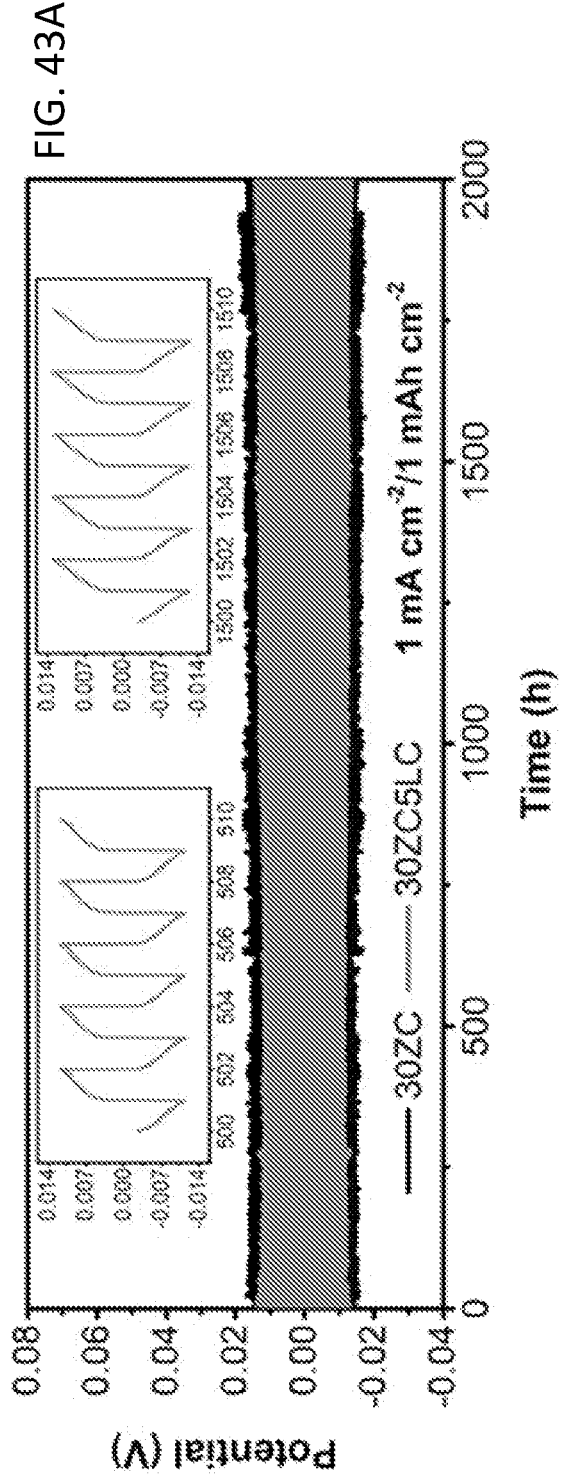
FIGS. 43A-43B show the GCD profiles of Zn plating/stripping in 30 m $ZnCl_2$ and 30 m $ZnCl_2$/5 m LiCl in Zn∥Zn symmetrical cells at 1 mA cm$^{-2}$ for 1 hour (43A) and 2 mA cm$^{-2}$ for 2 hours (43B).
Figure 43B:
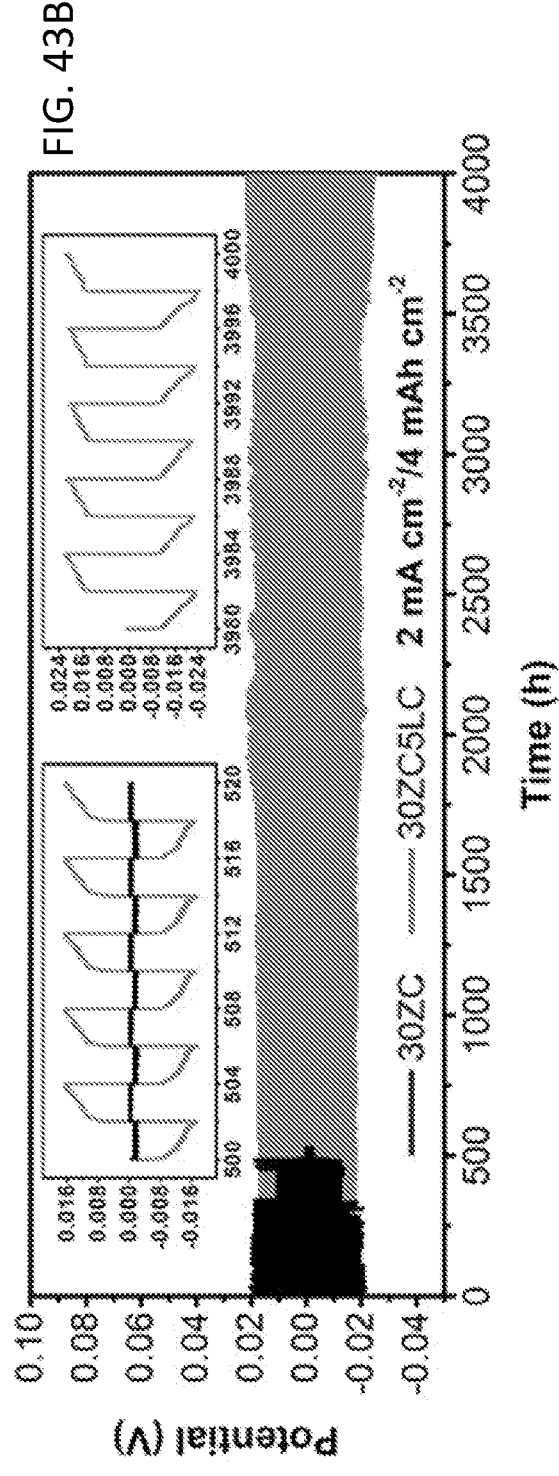
Figure 44A:
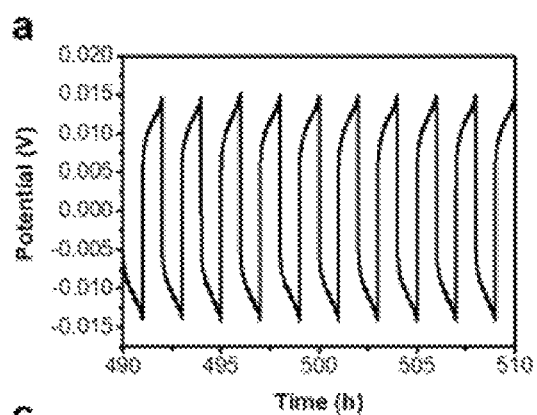
FIGS. 44A-44D show the GCD profiles of Zn plating/stripping in 30 m $ZnCl_2$ in Zn∥Zn symmetrical cells at 1 mA cm$^{-2}$ (44A, 44B) and 2 mA cm$^{-2}$ (44C, 44D).
Figure 44B:
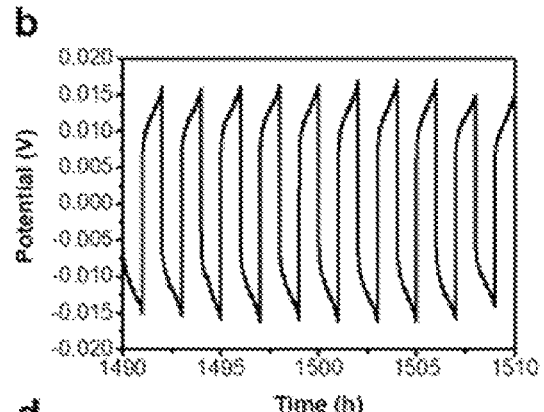
Figure 44C:
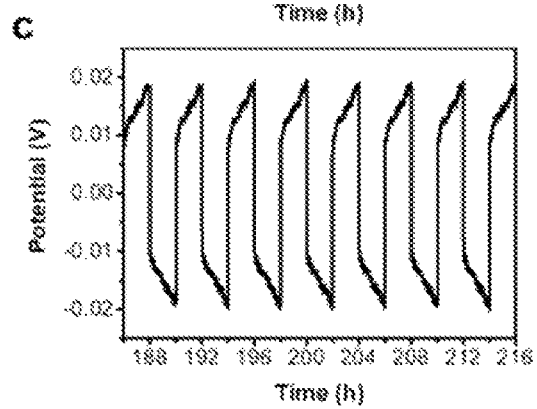
Figure 44D:
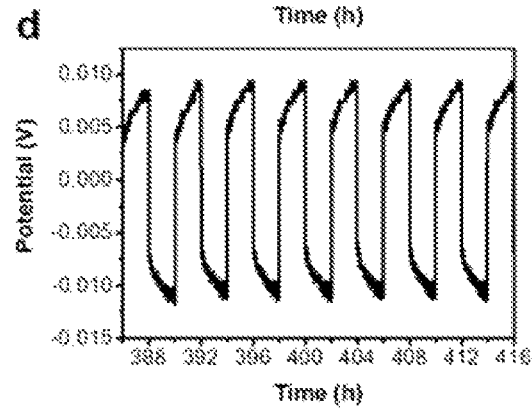

The ZnCl$_2$—LiCl mixture electrolytes address the reversibility to a great extent, and this electrolyte also facilitates the cycling stability due to the high concentration of ZnCl$_2$ and the existence of Li$^+$. In symmetrical cells with Zn working and counter electrodes, the cells supported by both 30ZC and 30ZC5LC electrolytes exhibit long-term cycling of 2000 hours with low overpotential of 16 and 13 mV, respectively, at 1 mA cm$^{-2}$ and a moderate areal capacity of 1 mAh cm$^{-2}$ (FIG. 43A). This good cycling stability is better than many previously reported results with aqueous electrolytes (Table 2), which should be ascribed to the high concentration of Zn$^{2+}$. To evaluate the stability of Zn anode at the level of practical application, the areal capacity was increased to 4 mAh cm$^{-2}$ at 2 mA cm$^{-2}$ for each cycle. The cell containing 30ZC5LC still displayed excellent stability, where the GCD profile showed no obvious potential fluctuation over 4000 hours, demonstrating unprecedented stability (FIGS. 43A, 43B). In contrast, the symmetrical Zn cells with 30ZC electrolyte short-circuited after cycling for 500 hours (FIG. 43B and FIGS. 44A-44D). The performance disparity between 30ZC5LC and 30ZC electrolytes can be attributed to the Li$^+$ electrostatic shielding layer, where Li$^+$ does not get reduced before Zn. Although the electrostatic shielding effect of Li$^+$ can depress the formation of Zn dendrites, the function of the high Zn$^{2+}$ concentration on the excellent stability of Zn anode in this 30ZC5LC electrolyte has a major role.

Figures 45A, 45B, 45C:
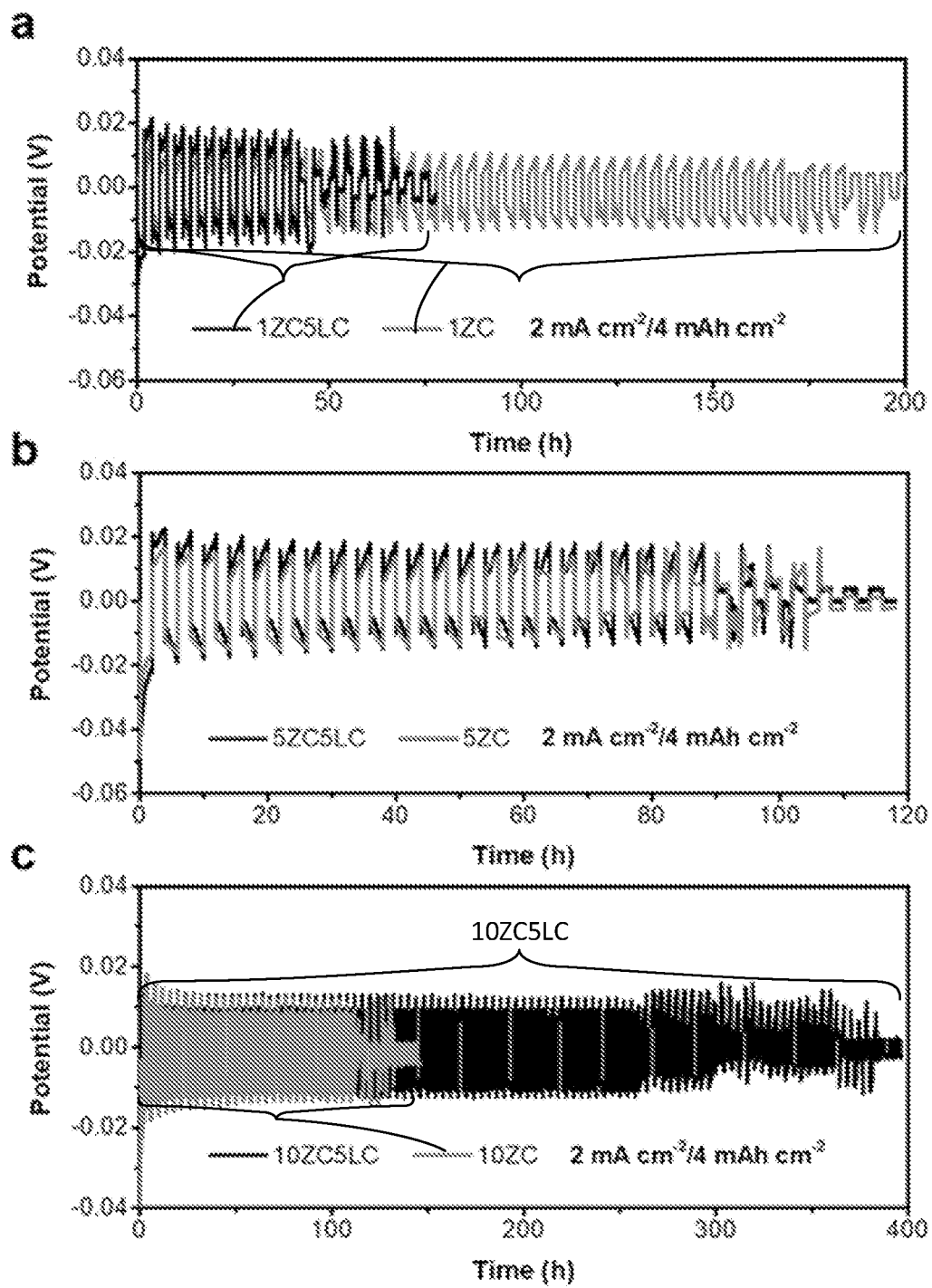
FIGS. 45A-45C show the GCD profiles of Zn plating/stripping in 30 m $ZnCl_2$ in Zn∥Zn symmetrical cells at 2 mA cm$^{-2}$ for 2 hours in: 1 m $ZnCl_2$ and 1 m $ZnCl_2$+5 m LiCl (45A), 5 m $ZnCl_2$ and 5 m $ZnCl_2$+5 m LiCl (45B), and 10 m $ZnCl_2$ and 10 m $ZnCl_2$+5 m LiCl (45C).
Figures 46A, 46B, 46C, 46D:
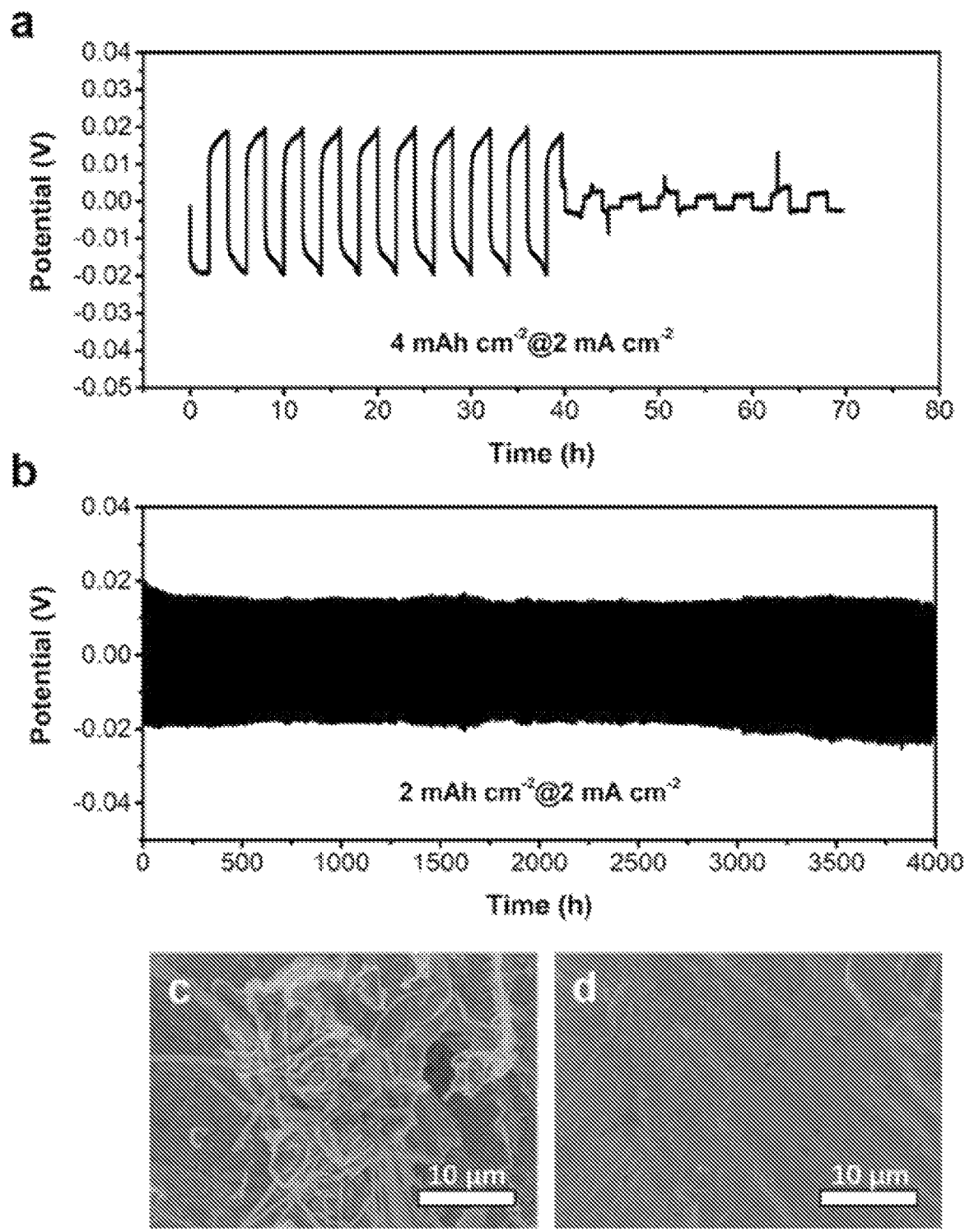
FIGS. 46A-46D show the GCD profiles of Zn plating/stripping in 30 m $ZnCl_2$, 10 m LiCl in Zn∥Zn symmetrical cells at 2 mA $cm^{-2}$ with an areal capacity of 4 mA $cm^{-2}$ (46A) or 2 mA $cm^{-2}$ (46B), and scanning electron microscopy (SEM) images of plated Zn in 30 m $ZnCl_2$ (46C) and 30 m $ZnCl_2$+10 m LiCl (46D) electrolytes.

The high concentration and conductivity of ZnCl$_2$ can promote the Zn anode stability. The Zn electrode stability was investigated in dilute ZnCl$_2$ electrolytes in the presence of 5 m LiCl (1ZC5LC, 5ZC5LC, 10ZC5LC), where the stability of Zn anodes increased with the increase in the ZnCl$_2$ concentration as expected (FIGS. 45A-45C). However, the Zn anode in 1ZC electrolyte even showed longer cycling life than in 1ZC5LC. A possible reason is that during the plating process in the ZnCl$_2$/LiCl mixture electrolyte, the Zn$^{2+}$ will be consumed but Li$^+$ will concentrate on the surface of the current collector. When the ZnCl$_2$ concentration is too low compared with LiCl (e.g. 1ZC5LC), the excess Li$^+$ can form a thick Li$^+$ layer near the surface of the current collector, which not only hinders the transfer of Zn$^{2+}$ but also diminishes the function of the electrostatic shielding layer. As the ZnCl$_2$ concentration increases, the high concentration of Zn$^{2+}$ depresses the aggregation of Li$^+$ near the surface of current collector resulting in a thinner Li$^+$ layer, since the 30ZC WiSE can only dissolve 10 m LiCl but pure water can dissolve 20 m LiCl. As thus, the blocking effect of Li$^+$ is weakened and the electrostatic shielding function of Li$^+$ also can work well for depressing the formation of Zn dendrites, which also explains the shorter cycling life of the Zn anode in 30ZC10LC than in 30ZC and 30ZC5LC WiSEs besides the inherent low conductivity (FIG. 43B, FIGS. 46A-46B). In addition, the possible blocking effect of excess Li$^+$ on the transfer of Zn$^{2+}$ may be responsible for the decreased CE from 30ZC5LC to 30ZC10LC. Hence, the excellent cycling stability of Zn metal electrode in 30ZC5LC mixture electrolyte is ascribed to the synergistic effect of a high concentration ratio of $Zn^{2+}$ to $Li^+$ and the $Li^+$ electrostatic shielding layer. Such cycling stability exceeds those of Zn anodes in aqueous electrolytes reported so far (Table 2). FIGS. 46C-46D display the scanning electronic microcopy (SEM) images of Zn electrodes in 30ZC and 30ZC5LC electrolytes, where the former grows into the glass fiber separator, thus being responsible for the short circuit, whereas the latter exhibits a dense and dendrite-free morphology.

Example 8

$ZnCl_2$—LiCl Hybrid WiSEs in Cells with Limited Zinc Metal Anodes

Full cells with a practically meaningful mass ratio between cathode and ZMA were used to demonstrate the relevance of the hybrid WiSEs to zinc metal batteries (ZMBs).

A $V_2O_5 \cdot H_2O$ cathode was evaluated, which has a bilayered structure and has been widely utilized as a cathode material with high capacity for aqueous Zn-metal batteries. The $V_2O_5 \cdot H_2O$ cathode was investigated in half cells with unlimited ZMA first, where the $V_2O_5 \cdot H_2O$ cathode delivered a high specific capacity of 394 mAh $g^{-1}$ at 0.1 A $g^{-1}$ with an average discharge voltage of 0.77 V. Its rate capability was excellent, exhibiting a capacity of 150 mAh $g^{-1}$ even at high current rate of 5 A $g^{-1}$ (FIG. 47). In such half cells, $V_2O_5 \cdot H_2O$ was cycled more than 4000 cycles at 2 A $g^{-1}$ to demonstrate its high stability in this $ZnCl_2$—LiCl WiSE, where in the full cell studies, if there is capacity fading, it cannot be attributed to the reversibility of the $V_2O_5 \cdot H_2O$ cathode (FIGS. 48A-48B).

In $V_2O_5 \cdot H_2O$||30ZC5LC||Zn full cells, where the Zn—$V_2O_5 \cdot H_2O$ mass ratio was set to 1.2, the $V_2O_5 \cdot H_2O$ cathode delivered a stable capacity around 200 mAh/g at 2 A $g^{-1}$ for more than 500 cycles (FIG. 49A). The 30ZC electrolyte was also employed as a control electrolyte, where the full cell started to lose capacity after 280 cycles at 2 A $g^{-1}$ (FIG. 49A). The results demonstrate that 30ZC5LC improves reversibility and stability of ZMAs, and promotes the cycle life of full cells. Indeed, the $V_2O_5 \cdot H_2O$||30ZC5LC||Zn full cell delivered a long cycling life of 2500 cycles at 5 A $g^{-1}$ (FIG. 49B).

Figure 50:
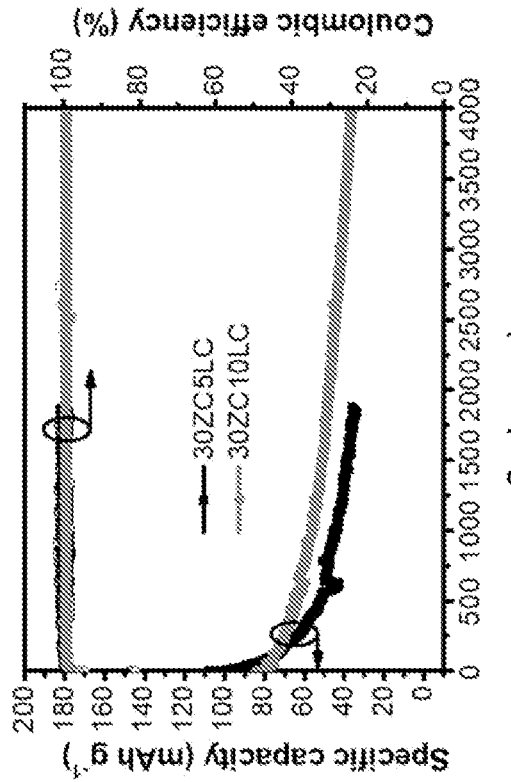
FIG. 50 shows the cycling performance of $LiMn_2O_4$ in 30 m $ZnCl_2$+5 m LiCl and 30 m $ZnCl_2$+10 m LiCl electrolytes at 0.48 A $g^{-1}$.
Figure 51:
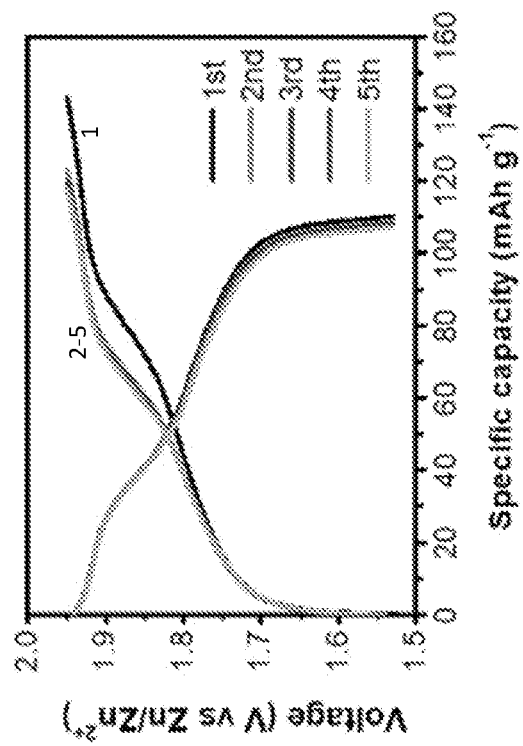
FIG. 51 shows the GCD curves of $LiMn_2O_4$∥Zn with 30 m $ZnCl_2$+10 m LiCl electrolyte at 0.06 A $g^{-1}$.
Figure 52A:
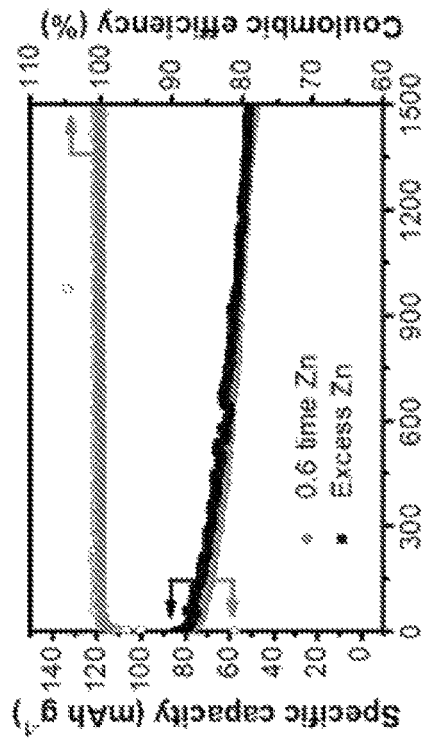
FIGS. 52A-52B show the cycling performance of $LiMn_2O_4$∥Zn with 30 m $ZnCl_2$+10 m LiCl electrolyte at 0.06 A $g^{-1}$ (52A) and 0.48 A $g^{-1}$ (52B), where the mass ratio of $LiMn_2O_4$ to Zn was set to 1:0.6.
Figure 52B:
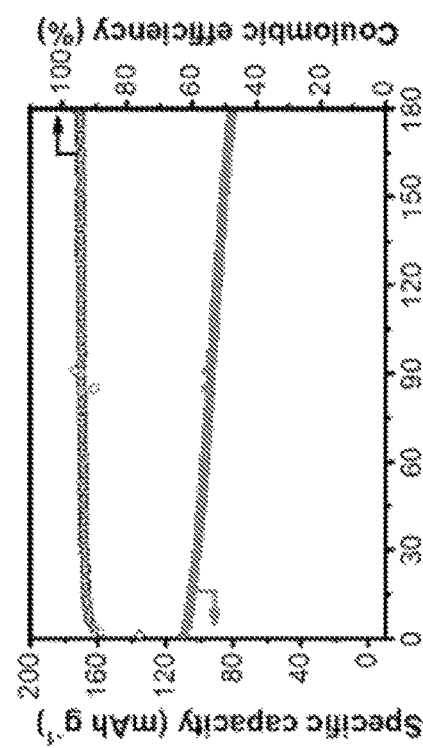

The hybrid WiSE also makes it possible to pair a commercial $LiMn_2O_4$ cathode with a ZMA in a hybrid ZMB. 30ZC10LC WiSE was selected as the electrolyte, since $LiMn_2O_4$ showed better cycling stability in 30ZC10LC WiSE than 30ZC5LC WiSE (FIG. 50). FIG. 51 shows the typical GCD profiles of $LiMn_2O_4$ at 60 mA $g^{-1}$, which delivered a high specific capacity of 110 mAh $g^{-1}$ with an average voltage around 1.82 V, corresponding to an energy density of 125 Wh $kg^{-1}$ based on the mass of the both electrodes. The $LiMn_2O_4$ cathode also delivered 80 mAh $g^{-1}$ at a high current rate of 480 mA $g^{-1}$. The $LiMn_2O_4$||30ZC10LC||Zn full cells, where the mass ratio of Zn to $LiMn_2O_4$ was only 0.6, exhibited stable cycling for 180 and 1500 cycles at 60 mA $g^{-1}$ and 480 mA $g^{-1}$, respectively (FIGS. 52A and 52B, respectively). The full cells demonstrate the applicability of $ZnCl_2$—LiCl mixture electrolytes, which enable production of low-cost and high-performance aqueous ZMBs.

Example 9

Zn||30 m $ZnCl_2$/7 m $NH_4Cl$||$Mn_3O_4$ Battery

Figure 53A:
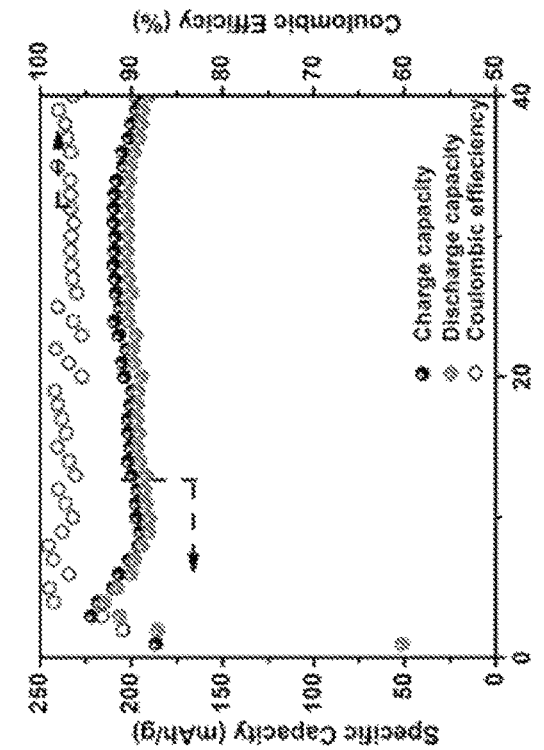

Dual-ion batteries have long employed carbonaceous cathode materials. A cell comprising a Zn anode, $Mn_3O_4$ cathode, and a hybrid WiSE comprising 30 m $ZnCl_2$/7 m $NH_4Cl$ was constructed. The performance of $Mn_3O_4$ was evaluated with a current rate of 100 mA $g^{-1}$ and cutoff potentials from 0.15 to 1.85 V vs $Zn^{2+}$/Zn. As FIG. 53A shows, during the first discharge of GCD cycling, $Mn_3O_4$ exhibited a capacity of 55 mAh $g^{-1}$ at very low potentials ranging from 0.6 to 0.1 V vs. $Zn^{2+}$/Zn, which corresponds to the formation of $Zn_{0.5}Mn_3O_4$. In the following charge process, the $Mn_3O_4$ electrode did not exhibit a GCD profile, which was reversible to that of the discharge process. Instead, the first charge profile was at high potentials from 1.5 to 1.8 V vs. $Zn^{2+}$/Zn, and the charge capacity was about 200 mAh $g^{-1}$, four times that of the first discharge capacity. The results indicate that the formed $Zn_{0.5}Mn_3O_4$ is not converted to $Mn_3O_4$ during the charge process, and the inserted $Zn^{2+}$ ions are trapped inside the structure of $Mn_3O_4$.

Figure 53B:
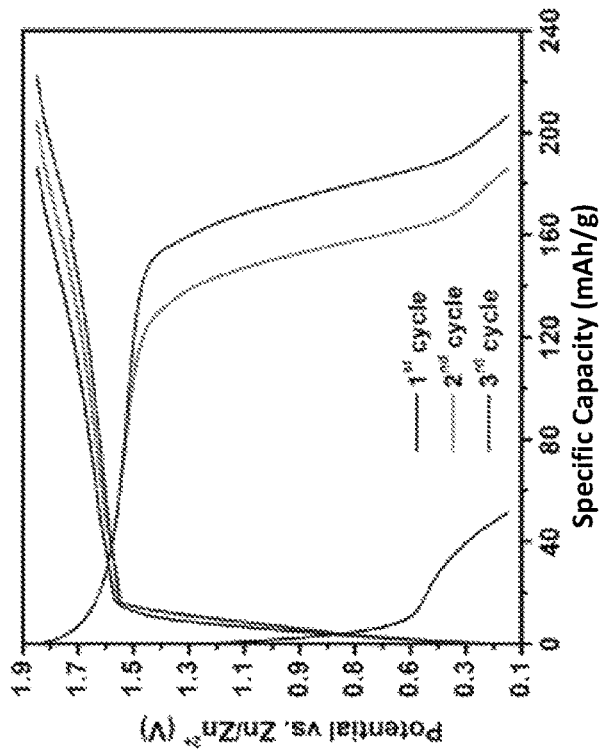

In the following discharge and charge processes, the GCD potential profile observed in the first discharge was no longer observed. Instead, the electrode exhibited a highly reversible profile at high potentials ranging from 1.5 to 1.8 V vs. $Zn^{2+}$/Zn. The capacity was stable at 200 mAh $g^{-1}$. The $Mn_3O_4$ delivered stable cycling performance at a current rate of 100 mA $g^{-1}$ for 40 cycles (FIG. 53B).

The operation mechanism of the $Mn_3O_4$ electrode was evaluated by electrochemical quartz crystal microbalance (EQCM), where the characteristic mass change of 35 g per mole of electron transfer suggests that the operational charge carrier into and out of the $Zn_{0.5}Mn_3O_4$ electrode is atomic chloride (FIG. 53C).

A capacity of 220 mAh $g^{-1}$ of chloride storage is indicative of a formula of $Zn_{0.5}Mn_3O_4Cl_4$. or $Mn_3O_4[ZnCl_4]$, where $Zn^{2+}$ ions serve as the anchors to bind with the inserted chloride ions.

When the $Mn_3O_4$ electrode was charged first such that anions from the WiSE are inserted into the electrode, the first charge capacity was only about 100 mAh $g^{-1}$ (FIG. 53D) If the cutoff potentials were set to be 1.2 to 1.8 V vs. $Zn^{2+}$, where the irreversible $Zn^{2+}$ insertion into $Mn_3O_4$ does not take place, the capacity of $Mn_3O_4$ was only around 100 mAh $g^{-1}$ (FIG. 53E). The results demonstrate that the capacity of $Mn_3O_4$ electrode is increased to above 200 mAh $g^{-1}$ only after the low-potential (0.6 to 0.1 V vs. $Zn^{2+}$/Zn) discharge process, where $Zn^{2+}$ ions are irreversibly inserted and trapped inside the $Mn_3O_4$ structure. These $Zn^{2+}$ ions bind the inserted chloride ions in the following charge process. If the following first discharge did not go below 0.6 V vs. $Zn^{2+}$/Zn, the capacity of the $Mn_3O_4$ remains around 100 mAh $g^{-1}$ in the following cycles, as shown in FIG. 53E.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. An electrolyte for a zinc metal battery including a cathode comprising a metal ion insertion material, the electrolyte comprising:
   a zinc halide;
   a metal halide or nonmetal halide comprising a metal or a nonmetal cation $Q^{x+}$ where x is an integer from 1 to 4, and Q is an alkali metal, an alkaline earth metal, a Group IIIA metal, a transition metal other than Zn, a nonmetal cation, or any combination thereof; and water, the electrolyte having a $[ZnX_2] \geq 10$ m and $[ZnX_2]+[Q^{x+}] \geq 10.5$ m, where X is Cl, F, I, Br, or any combination thereof.

2. The electrolyte of claim 1 where:
10 m$\leq[ZnX_2]\leq$30 m and 0.5 m$\leq[Q^{x+}]\leq$150 m, or
15 m$\leq[ZnX_2]+[Q^{x+}]\leq$40 m.

3. The electrolyte of claim 1 where $[ZnX_2]\geq$15 m.

4. The electrolyte of claim 1 where the metal halide or nonmetal halide is a metal chloride or nonmetal chloride.

5. The electrolyte of claim 1 where Q is Li, Na, K, Rb, Cs, Mg, Ca, Sr, Ba, Sc, Al, Mn, Ce, Cr, ammonium, alkyl ammonium, choline ion, or a combination thereof.

6. The electrolyte of claim 1 where:
(i) the zinc halide is $ZnCl_2$; or
(ii) Q is Li and the metal halide is LiCl; or
(iii) both (i) and (ii).

7. The electrolyte of claim 1 where a molal concentration ratio of Zn to Q is within a range of from 60:1 to 1:5.

8. The electrolyte of claim 1, comprising:
10-30 m $ZnCl_2$;
0.5-20 m LiCl; and
water.

9. The electrolyte of claim 1, consisting essentially of:
the zinc halide;
the metal halide or nonmetal halide; and
water.

10. A zinc metal battery, comprising:
an electrolyte comprising
(a) water and a zinc halide, the zinc halide having a concentration>10 m, or
(b) water, a zinc halide, and a metal halide or nonmetal halide comprising a metal or nonmetal cation $Q^{x+}$ where x is an integer from 1 to 4, and Q is an alkali metal, an alkaline earth metal, a Group IIIA metal, a transition metal other than Zn, a nonmetal cation, or a combination thereof, where $[ZnX_2]\geq10$ m and $[ZnX_2]+[Q^{x+}]\geq10.5$ m, where X is a halogen;
a cathode comprising a zinc-containing anion insertion material or a $Q^{x+}$ ion insertion material; and
(i) a zinc anode or (ii) a non-zinc current collector in the absence of an anode prior to a first charge process of the battery after assembly.

11. The zinc metal battery of claim 10 where:
the electrolyte comprises $ZnCl_2$ and a metal or nonmetal chloride comprising a metal or nonmetal cation $Q^{x+}$ where $[ZnCl_2]\geq10$ m and $[ZnCl_2][Q^{x+}]\geq10.5$ m; and
the cathode comprises a $Q^{x+}$ ion insertion material.

12. The zinc metal battery of claim 11 where:
the electrolyte comprises water, $ZnCl_2$, and LiCl; and the cathode comprises $LiMn_2O_4$ or $LiFePO_4$; or
the electrolyte comprises (i) water, (ii) $ZnCl_2$, and (iii) NaCl or KCl or $NH_4Cl$ or alkyl ammonium chloride, or choline chloride, or any combination thereof; and the cathode comprises Prussian blue, a Prussian blue analog, $Na_3V_2(PO_4)_2F_3$, $Na_3V_2(PO_4)_3$, or $Mn_3O_4$.

13. The zinc metal battery of claim 10 where:
(i) the battery has an average Coulombic efficiency of at least 98% over 100 cycles; or
(ii) the battery has an overpotential that changes by less than 10% relative to the average overpotential over a time period of at least 500 hours; or
(iii) both (i) and (ii).

14. The zinc metal battery of claim 10 where:
the electrolyte comprises water and $ZnCl_2$ having a concentration$\geq$18.5 m; and
the cathode comprises a radical polymer or a conductive polymer capable of reversibly hosting $[ZnCl_4]^{2-}$ ions.

15. The zinc metal battery of claim 14 where the cathode comprises polypyrene.

16. The zinc metal battery of claim 14 where the battery has an average Coulombic efficiency of at least 95% over 100 cycles.

17. The zinc metal battery of claim 10 where:
(i) the battery does not comprise an anode prior to a first charge process of the battery after assembly, and the non-zinc current collector comprises carbon paper, carbon cloth, carbon foam, graphite, glassy carbon, or a metal foil, mesh or foam, where the metal is other than aluminum; or
(ii) the battery comprises a limited Zn anode including an initial amount of zinc prior to an initial charge process of the battery, where the initial amount is less than a zinc amount stripped during a full discharge process of the battery; or
(iii) the battery comprises an excess Zn anode including an initial amount of zinc prior to an initial charge process of the battery, where the initial amount is at least 1.5× a zinc amount of stripped during a full discharge process of the battery.

18. A device, comprising a zinc metal battery according to claim 10.

19. A method of making a zinc metal battery according to claim 10, comprising:
providing an electrolyte comprising
(a) water and a zinc halide having a concentration>10 M, or
(b) water, a zinc halide, and a metal halide or nonmetal halide comprising a cation $Q^{x+}$ where x is an integer from 1 to 4, and Q is an alkali metal, an alkaline earth metal, a Group IIIA metal, a transition metal other than Zn, a nonmetal cation, or a combination thereof, where $[ZnX_2]\geq10$ m and $[ZnX_2]+[Q^{x+}]\geq10.5$ m, where X is a halogen;
assembling a battery comprising the electrolyte, a cathode comprising a zinc-containing anion insertion material or a $Q^{x+}$ ion insertion material, and (i) a zinc anode or (ii) a non-zinc current collector in the absence of an anode.

20. The method of claim 19 where:
the electrolyte comprises $ZnCl_2$, LiCl, and water; and the cathode comprises $LiMn_2O_4$ or $LiFePO_4$; or
the electrolyte consists essentially of $ZnCl_2$ and water; and the cathode comprises polypyrene; or
the electrolyte consists essentially of $ZnCl_2$ and water; and the cathode comprises $Mn_3O_4$; or
the electrolyte consists essentially of (i) water, (ii) $ZnCl_2$, and (iii) NaCl or KCl or $NH_4Cl$ or alkyl ammonium chloride or choline chloride, or a combination thereof; and the cathode comprises $Mn_3O_4$; or
the electrolyte comprises (i) water, (ii) $ZnCl_2$, and (iii) NaCl or KCl or $NH_4Cl$ or alkyl ammonium chloride or choline chloride, or a combination thereof; and the cathode comprises Prussian blue, a Prussian blue analog, $Na_3V_2(PO_4)_2F_3$ or $Na_3V_2(PO_4)_3$.

* * * * *